(12) United States Patent
Tyson, II

(10) Patent No.: US 11,132,479 B1
(45) Date of Patent: Sep. 28, 2021

(54) AUGMENTED REALITY SYSTEM FOR COMPONENT ASSEMBLY AND ARCHIVAL BASELINE CLONE

(71) Applicant: John Tyson, II, King of Prussia, PA (US)

(72) Inventor: John Tyson, II, King of Prussia, PA (US)

( * ) Notice: Subject to any disclaimer, the term of this patent is extended or adjusted under 35 U.S.C. 154(b) by 116 days.

(21) Appl. No.: 16/236,072

(22) Filed: Dec. 28, 2018

Related U.S. Application Data

(60) Provisional application No. 62/750,012, filed on Oct. 24, 2018, provisional application No. 62/612,181, filed on Dec. 29, 2017.

(51) Int. Cl.
*G05B 19/4097* (2006.01)
*G06F 30/20* (2020.01)
(Continued)

(52) U.S. Cl.
CPC ......... *G06F 30/20* (2020.01); *G05B 19/4068* (2013.01); *G05B 19/4097* (2013.01);
(Continued)

(58) Field of Classification Search
USPC ........................................................ 700/95
See application file for complete search history.

(56) References Cited

U.S. PATENT DOCUMENTS

| | | |
|---|---|---|
| 5,729,471 A | 3/1998 | Jain et al. |
| 5,841,098 A | 11/1998 | Gedrat et al. |

(Continued)

FOREIGN PATENT DOCUMENTS

| | | |
|---|---|---|
| EP | 2748800 B1 | 7/2014 |
| WO | 2011073428 A2 | 6/2011 |

(Continued)

OTHER PUBLICATIONS

Hadley, "Drill Guide For Canard Install" Home Shop Machinist, Feb. 18, 2016, 10 Pg. Print-out, accessed at https://www.kitplanes.com/home-shop-machinist-29/ (Year: 2016).*

(Continued)

*Primary Examiner* — Emilio J Saavedra
(74) *Attorney, Agent, or Firm* — Bonini IP Law, LLC; Frank J. Bonini, Jr.

(57) ABSTRACT

Methods, systems and devices for assembling components to form an assembled structure, using virtual or augmented assembly tooling, in real time, real-time virtual assembly tooling (or RVAT). Structures such as vehicles, aircrafts, or other products are produced from assembling a plurality of component parts together, with virtual assembly tooling of the system, method and devices that provides real-time capability for directing and guiding operations and for generating feedback. The structure is built from the CAD, transforming the CAD to imaging representations whose transformations are generated with one or more component scans, projected on a display. The method, system and devices are constructed to build a product from a CAD through transformations of CAD information in conjunction with the real-time imaging and tracking of assembly components and tooling precise positioning of components, and controlling assembly operations, such as, for example, assembly, drilling, riveting, bonding, and welding, a product is constructed.

34 Claims, 13 Drawing Sheets

(51) Int. Cl.
 *G05B 19/4068* (2006.01)
 *G05B 19/4069* (2006.01)
 *G06T 19/00* (2011.01)

(52) U.S. Cl.
 CPC .................. *G05B 19/4069* (2013.01); *G05B 2219/32014* (2013.01); *G06T 19/006* (2013.01)

(56) References Cited

U.S. PATENT DOCUMENTS

| | | | |
|---|---|---|---|
| 5,910,894 | A | 6/1999 | Pryor |
| 6,094,625 | A | 7/2000 | Ralston |
| 6,195,104 | B1 | 2/2001 | Lyons |
| 6,400,374 | B2 | 6/2002 | Lanier |
| 7,054,793 | B2 | 5/2006 | Moritz et al. |
| 7,110,909 | B2 | 9/2006 | Friedrich et al. |
| 7,532,332 | B2 | 5/2009 | Gomercic |
| 8,413,878 | B2 | 4/2013 | Hackius et al. |
| 8,610,761 | B2 | 12/2013 | Haisty et al. |
| 8,749,396 | B2 | 6/2014 | Maggiore |
| 8,982,156 | B2 | 3/2015 | Maggiore |
| 9,037,297 | B2 | 5/2015 | Hosek |
| 9,530,244 | B2 | 12/2016 | Acree |
| 2005/0121422 | A1* | 6/2005 | Morden .................. B25H 7/00 219/121.6 |
| 2005/0172470 | A1* | 8/2005 | Cobb ........................ B64F 5/10 29/407.1 |
| 2007/0165245 | A1 | 7/2007 | Gomercic et al. |
| 2012/0007852 | A1* | 1/2012 | Morale ................. G06T 19/006 345/419 |
| 2012/0303336 | A1* | 11/2012 | Becker ................... G01B 11/03 703/1 |
| 2015/0012171 | A1* | 1/2015 | Richter .................... B64F 5/60 701/32.9 |
| 2015/0338287 | A1 | 11/2015 | Chen et al. |
| 2016/0154926 | A1* | 6/2016 | Szigeti ..................... G06T 7/32 703/8 |
| 2016/0202689 | A1* | 7/2016 | Szarski .............. G05B 19/4097 700/98 |
| 2016/0328883 | A1* | 11/2016 | Parfenov ................ G06T 13/00 |
| 2017/0023505 | A1* | 1/2017 | Maione .................. G01N 25/72 |
| 2017/0038195 | A1* | 2/2017 | Kaufman ............. G01B 11/002 |
| 2017/0210489 | A1* | 7/2017 | Bode ........................ B64C 1/26 |
| 2017/0212066 | A1* | 7/2017 | Thompson ........... H04N 5/2256 |
| 2017/0216981 | A1* | 8/2017 | Lee ........................... B25J 13/08 |
| 2018/0164775 | A1* | 6/2018 | Crivella ................. B25J 9/1666 |
| 2019/0052851 | A1* | 2/2019 | Korl ...................... G01C 11/025 |

FOREIGN PATENT DOCUMENTS

| | | |
|---|---|---|
| WO | 2011073428 A3 | 6/2011 |
| WO | 2016198678 A1 | 12/2016 |

OTHER PUBLICATIONS

Bullen, Workshop: Assembly & Joining of Composite Materials AERODEF Manufacturing, Mar. 8, 2017, 210 pg. Print-out (Year: 2017).*

"Design for Manufacturing: Jigs & Fixtures in Aircraft Industries", Aircraft Design Project AER814, Ryerson University, Feb. 19, 2014.

Barranger, John P., "Two-dimensional Surface Strain Measurement Based on a Variation of Yamaguchi's Laser-Speckle Strain Gauge," Conference on Optical Testing and Metrology III, Society of Photo-Optical Instrumentation Engineers, San Diego, CA Jul. 8-13, 1990, NASA Technical Memorandum 103162.

Wontae Kim, Ranjit Shrestha, and Manyong Choi, "Defect detection with thermal imaging and phase shifting methods in lock-in thermography", 10.21611/qirt.2016.057, Department of Mechanical & Automotive Engineering, Kongju National University, Cheonan, Republic of Korea, pp. 391-396, 13th International Conference on Quantitative Infrared Thermography 2016, Jul. 4-8, Gdańsk, Poland.

Bojan Milovanovic and Ivana Banjad Pecur, "Review of Active IR Thermography for Detection and Characterization of Defects in Reinforced Concrete", J. Imaging 2016, 2, 11, pp. 1-27, Apr. 7, 2016.

Tzuyang Yu, et al., "Structural Health Monitoring of Bridge Abutments using Imaging Radar and Digital Image Correlation," Collection of SHM Case Studies by ASCE SEI Methods of Monitoring Committee, Feb. 12, 2016.

Jovan Jovicic et al., "Argus Formability Solution", AN1709-AN1710, Jun. 2018, https://www.researchgate.net/publication/325907960.

Dr. R. Uday Kumar, "Analysis of Major Strains and Minor Strains in Sheet Metal Forming", International Journal of Application or Innovation in Engineering & Management (IJAIEM), vol. 2, Issue 2, Feb. 2013, ISSN 2319-4847.

Richard Gedney, ADMET Inc., Norwood, Massachusetts, "Sheet Metal Formability", Advanced Materials & Processes, Aug. 2002.

* cited by examiner

RVAT

| Define Reference | Program | | | Operation | | | | Review |
|---|---|---|---|---|---|---|---|---|
| | Define Location(s) | Define Present Element | Define Order Guidance | Choose Job | Follow Steps and Guidance | Doc. Step Done - Capture as Built | (Optional) Comment on Step - Mark Warnings | Quality Ratings Warnings Comments |
| Clip Bonds | x – y (z) | Element | ✓ | | Same → | | | |
| Drill Marking | x – y | ⊕ | ✓ | | Current Point Highlighted All Points Displayed | Doc Quality Doc. Component | | Choose Coordinate System |
| Component Positioning | 6-DOF | Component Shadow z Shape | ✓ | | Full Color Overlay | Doc Point | | |
| Rivets | | | | | | Doc Component 6-DOF | | |
| Click Bonds | | | | | | | | |

FIG. 1

AUGMENTED REALITY SYSTEM FOR COMPONENT ASSEMBLY AND ARCHIVAL BASELINE CLONE

CROSS-REFERENCE TO RELATED APPLICATIONS

This application claims the benefit to U.S. Provisional Application 62/750,012, filed on Oct. 24, 2018, and U.S. Provisional Application 62/612,181, filed on Dec. 29, 2017, the entire contents of which are incorporated herein by reference.

BACKGROUND OF THE INVENTION

1. Field of the Invention

The invention relates to methods, systems and devices for assembling components.

2. Brief Description of the Related Art

Currently assembly of components may utilize structures commonly referred to, hard tooling, which may include jigs and fixtures, or other tooling. Some of the hard tooling is designed to provide a framework or pattern for aligning one or more components to be assembled in a desired position and orientation relative to one or more other components. For example, hard tooling, such as jigs and fixtures, may be placed on a structure temporarily, and may be mounted to the structure to remain there while the components that use the tooling as a reference are installed or manipulated to a desired position. Other tooling, including jigs and fixtures, may support components during an assembly operation. Once the components are installed to produce a product, the tooling (e.g., jigs, fixtures, and the like) may then be removed or separated from the product. Often the use of hard tooling is costly and time-consuming. For example, a jig must be specially created for an application, such as, an assembly of a multi-component structure, and the jig must be aligned and positioned, and fixed in a position so that the reference provided by the jig will suitably enable other components of the structure to be situated in their desired location.

Often jigs may be used with fixtures, which are another type of hard tooling for locating, holding, clamping, or supporting one or more components together. Fixtures may be used to hold components of an assembly together as a unit during the construction of the assembled structure. Jigs often are employed to guide assembly tools or component parts, and may support a tool or component during an assembly process. Often the design and production of the hard tooling, including jigs and fixtures, involves considerable time and expense. Typically, a preliminary model of each tooling structure or tooling component is produced. The mockup may be made from a material other than that of the final product, but is provided to replicate the same configuration, curves and profiles, allowing the tooling (e.g., jigs and fixtures) to be constructed to correspond with the structure to be produced. The production of the hard tooling based off of a replica or mockup of the component parts, therefore, must precisely be produced to align with the product structure to be assembled and completed. Often the replicas or mockups are full-size products. In the production of hard tooling, such as fixtures and jigs, tolerances are important. Since hard tooling devices themselves are subject to tolerance ranges, when the structural components are assembled, each component has its own tolerance, and when the component tolerance is compounded with the tolerance of the hard tooling, the tolerances may be cumulative, in many instances making the range of accuracy less precise as a result of the additive tolerance ranges.

It is often the practice to construct not only a jig or fixture, but other hard tooling, such as a master jig from which checks on the other jigs or fixtures may be made. For example, reference points, jig and pin points may be provided on the master jig. In addition, the jigs and fixtures typically are constructed from material that is subject to thermal effects, such as, thermal expansion. Therefore, jigs and fixtures, when used, may be required to take into account the thermal expansion properties of the materials from which they are constructed, since the expansion or contraction thereof could affect the positioning of adjacent components that are to be aligned using the fixture or jig.

There is a need for structures that are produced to ensure that the component parts that form the structure contain the correct features and overall shapes, and that they are in a suitable position to be secured (such as by being welded, riveted, or the like), that they have been clamped together correctly for securing together via welding or other joining mechanism, and that they are in the correct configuration and shape when attached.

In order to complete an assembly of a structure, such as, for example, the assembly of a vehicle, a number of devices may be used in the assembly process, among which may include robots or other machines that clamp, rivet, weld, drill or carry out another application on a component or on structures to which another component will be attached. These assembly devices need to be in a proper location and orientation in order to properly provide their designated function. Typically, the operation of these assembly devices may use a limit switch to confirm that a device, such as a robotic arm that may be holding a clamped component, has moved from its position. While this may be sufficient to signify that movement has taken place, it does not confirm the end result, such as clamping of a component, has actually occurred. Rather, this arrangement relies on the completion of the task by the device, e.g., the robotic arm, after it triggered the limit switch. If the task has not been completed, or has not been accurately completed in the designated manner, then when subsequent operations are carried out, the damage to the structure or one of its parts may result.

Once the desired completed product structure is assembled, or a sub-assembly of a group of components forming a portion of a structure, has been assembled, there must be checks on the accuracy of the assembled structure. This may be carried out manually using fixtures that may be placed on or in engagement with the structural parts to determine whether attributes, such as, spacing, orientation, and location, are accurate. In some instances, a fixture may provide for an acceptable tolerance, taking into account component locations relative to the structure (or relative to other components of the structure). Freer-form composite material designs add greatly to the complexity of fixturing and the traditional measurements confirming accuracy of assembly.

Costs associated with designing and producing the hard tooling needed to carry out the assembly of the components into the desired structure, such as, for example, a vehicle or other product, typically are very expensive, and for a large production structure, such as, for example, an aircraft, rail car or truck, may be several million dollars or more. The costs for the creation and production of the hard tooling, jig and fixture costs is in addition to the costs for other types of tooling typically required to build the structure, such as, for example, material (typically steel), robots, drills, clamps, and other mechanisms. In addition, when changes to a product design are made, the costs may increase further, as fixtures and jigs may need to be recreated, involving further design and construction costs. In most cases, only a small fraction of the fixtures may be reusable, for example, from a prior model or closely related structure, or for a future model.

A need exists for a system, method and devices that provide an accurate way to align and assemble components to form a structure and to minimize or eliminate expenses and drawbacks encountered with the use of hard tooling, such as jigs, fixtures and other implements, traditionally created and produced for assembling components.

SUMMARY OF THE INVENTION

Methods, systems and devices for assembling components to form an assembled structure. Preferred embodiments of the methods, systems and devices by implement virtual or augmented assembly tooling, which preferably is in real time. Embodiments of the invention may be referred to as real-time virtual assembly tooling (or RVAT). An assembled structure may comprise a vehicle, aircraft, or other product that is produced from assembling a plurality of component parts together. The virtual assembly tooling of the system, method and devices provide real-time capability for directing and guiding operations, as well as for generating accuracy measurements and feedback. According to preferred embodiments, product assembly is carried out by implementing the method along with the system and devices to precisely position components, and control precise assembly operations, such as, for example, assembly, drilling, riveting, bonding, and welding.

The method, system and devices provide improved manufacturing capability for assembly, including in an aerospace factory, for aerospace vehicle construction.

The method, system and devices provide improved manufacturing set-up and operational feedback, including in the automotive factory, for automotive factory assembly configuration, and operational confirmation.

According to preferred embodiments, the method, system and devices provide real-time feedback to operators and robots, for precisely positioning components in 6-DOF (6 degrees of freedom) and controlling precise operations, such as assembly, drilling, riveting, bonding and welding.

The RVAT method and system provides Digital Manufacturing which has particular focus on composites, but is broadly applicable. Manual assembly of aircraft, etc., guiding assembly personnel to build vehicles from CAD (engineering design), may be carried out without tooling. The RVAT system and method include the display of critical data to the operator in-situ, projecting the location of a component on surface, like interface shape of component, or mark point for drill/rivet operation; using a Display Plate, placed anywhere in the operator's field-of-view, to display information effectively and safely to the operator, without having to turn around a look at a monitor, and alternatively, may be implemented with Augmented Reality (AR) googles for displaying operator information. AR Safety may use operator forward motion to disable or minimize potentially distracting displays.

RVAT assembly operations may include: component assembly, like bulkhead alignment, utilizing multiple points, like four corners, to guide component to into correct alignment; drill point marking, on 3D part, precise tracking of drill point marking tool; drill alignment, with 6-DOF on 3D part, providing precise location and orientation, as well as depth; rivet gun alignment, with 6-DOF on 3D part, providing precise location and orientation, as well as recording pull strength; Click-Bond® fastener (or other) tool alignment, object shape projected for rough alignment and orientation, and precise tracking to desired location.

The RVAT system also provides in-situ NDE for checking dimensional conformance of manufacturing to design. Examples, include, documenting assembly accuracy and quality, and providing the assembly Digital Thread to document the as-built dimensions for the Digital-Twin, flagging quality issues for rapid Quality Assurance (QA) engineering review, e.g., automatic green if positioned within tolerance, automatic red, if not positioned within tolerance, comment required, switchable to green by QA engineering, optional yellow, with comment for engineering review.

The RVAT system provides RVAT robotics—digital robotic manufacturing—focused on composites, but broadly applicable. The RVAT system provides robotic assembly of aircraft, etc., directly guiding assembly robots to build vehicles from CAD (engineering design), without tooling. Assembly operations may include: component assembly, like bulkhead alignment, utilizing multiple points, like four corners, to guide component to into correct alignment; drill alignment, with 6-DOF on 3D part, providing precise location and orientation, as well as depth; rivet gun alignment, with 6-DOF on 3D part, providing precise location and orientation, as well as recording pull strength; Click-Bond fastener® (or other) sub-component alignment, with precise tracking of robot "hand" to desired location. The RVAT system may provide in-situ NDE for checking dimensional conformance of manufacturing to design, which may include photogrammetry scan, an/or digital image correlation with dot projection. The RVAT system also provides documenting assembly accuracy and quality, and providing the assembly Digital Thread to document the as-built dimensions for the Digital-Twin; as well as flagging quality issues for rapid Quality Assurance (QA) engineering review.

The RVAT system provides an RVAT manufacturing server—digital RVAT manufacturing database (RVAT-DMD) housing all collected Digital Threads for the Digital-Twin. The RVAT-DMD collects all Digital Threads from CAD design, component scans and manufacturing data from dimensional measurements, nondestructive testing (NDT), composite mixtures, operator efforts and other collected data. The RVAT system implements RVAT data analytics to provide engineering with manufacturing analysis and quality parameters.

The RVAT Digital-Twin Production is part of the system and provides Publication of Digital-Twin information for various uses. The RVAT may export Digital-Twin data and analytics separately for one or more of the following: Engineering, Manufacturing, Quality Assurance (QA), Field Repair and Structural Health Monitoring (SHM), Final Manufacturing Documentation (Company complete Digital-Twin), Government Customer Digital-Twin dataset, ITAR Customer Digital-Twin dataset (USA friendly customers), and/or Non-ITAR Customer Digital-Twin dataset (other customers).

The RVAT system provides Real-time Manufacturing Non-Destructive Testing (NDT/NDI/NDE) [Testing/Inspection/Evaluation], which for example, may be implemented utilizing Pulsed Thermography NDI, or Pulsed ARAMIS Thermography NDE (spatially documented) [New/Old: new capability for an old method]. For example, rapid, low temperature thermal pulse (e.g., with flash lamp or other)

may be used to provide a small temporary temperature rise in the surface of the material, which is wicked away by the internal structure, unless there is a defect, such as void or backing ply. If there is a defect, such as void or backing ply, the area above this defect remains warm for a few moments. The RVAT system detects the defect. With Pulsed ARAMIS thermography NDE the precise location is known of the defect, for automated defect recognition and documentation. With Pulsed Thermography NDI, the operator needs to locate the defect from the data.

The RVAT system also provides In-situ Thermal NDE for Thermal Plastic Continuous Assembly (also applicable to Thermal Set). In-situ Thermal NDE of Thermal Plastic Continuous Assembly uses concentrated high temperature to melt the thermal plastic (typically a continuous tape laying head with imbedded fibers), to build components. [New/New: new capability for a new method]. In-situ Thermal NDE may determine the real-time quality of the composite assembly from the tape laying head. Thermography provides temperature profile during cool-down of composite tape lay, indicting defects and porosity in the build. The RVAT also provides in-situ repair. In-situ Thermal NDE allows immediate repair of that layer, by reheating and recompacting the defective region.

The RVAT provides information during an assembly operation or build. RVAT Manufacturing Strain Measurement Digital-Thread—to review manufacturing stresses during build. During manufacturing, composite panels can be stressed in position, and during assembly, without any indication, until failure. ARAMIS may be used to measure strains during the manufacturing process. Using invisible UV fluorescing pattern, the component can be tracked with thousands of measurement points. RVAT NDI Digital-Thread may record the component reference condition and anytime throughout manufacturing the part can be checked for accumulated strain.

The RVAT system also provides RVAT Structural Health Monitoring (RVAT SHM). RVAT Structural Health Monitoring uses precision scans at forward bases to detect damage to the vehicle or structures, without relying on on-board devices, with associated weight, power requirements or added vehicle cost. Using invisible UV fluorescing pattern the component can be tracked with thousands of measurement points. Documenting every measurement within the RVAT Database (the Digital-Twin), RVAT Analytics can see slight variations in response, exposing structural defects. RVAT Dimensional NDE Structural Health Monitoring provides: Detection of Local Shape (3D Deformation) Change for detection of Barely Visible Damage to substantial internal damage, and Detection Local Strain Change for detection of structural damage to substantial internal damage. RVAT Thermal Response NDE Structural Health Monitoring provides early detection of delaminations, water intrusion and other defects or conditions. Continuous RVAT Structural Health Monitoring allows designers to reduce design safety factors reducing cost and increasing performance.

According to some embodiments, the method may be carried out by guiding operators with a projection apparatus, such as a projector, and one or more displays, which may be a monitor, or, according to some preferred embodiments, includes AR (augmented reality) displays (e.g., headset or goggles). The system preferably is configured to build straight from the engineering design or CAD, and the implementation of the projected displays and AR displays provides the capability to build straight from the CAD with the CAD information utilized in conjunction with the projections and assembly operations. The implementation of the method in the assembly of structures has the benefit of saving the cost of tooling (design, manufacture, storage, and tracking), since a number of intermediate tooling apparatus that may otherwise be required, is not needed. The capability to build a structure straight from the CAD design is carried out by utilizing the structural information of the CAD for components to be assembled relative to the vehicle reference coordinates, as well as for the assembled structure, and transforming the CAD data with the RVAT system.

An object of the invention to build a structure from a CAD drawing file. The CAD data (drawings) are in the vehicle coordinate system. According to preferred embodiments, the present method may be carried out by scanning the real component to measure its true dimensions, and relating it to the CAD coordinate system. The components to be assembled are then tracked with an imaging arrangement, preferably, with stereo photogrammetry with reference to the "reference component" and tracked in both reference coordinates (actual coordinates) and camera coordinates (for projection). A key feature of the present system and method comprises the ability to track the parts completely in 3D space and in 6-DOF, in real-time, even if the reference component (which defines the current coordinate system and all measurements) is moving.

The method may be carried out by imaging one or more components of the structure prior to assembly and projecting a transformation of the component image with reference to a camera and projection coordinate system. The transformation of the CAD information undergoes a calibration to represent on displays the component and structure in the RVAT system representation for assembly implemented with the RVAT system. The real component is related to the CAD. Real-time tracking of the assembly build is carried out by projecting information and component calibrated image indicia, in RVAT representation, to align and install components in the designated location and orientation. According to embodiments, the system and method may be implemented wherein the CAD data (drawings) are in the vehicle coordinate system. One or more, or in some embodiments all, of the real components are scanned to measure the true dimensions of the component and relate it to the CAD coordinate system. A reference component is assigned and from the assignment a master reference coordinate system is generated. Components to be assembled are tracked with stereo photogrammetry with reference to the "reference component" and tracked in both reference coordinates (actual coordinates) and camera coordinates (for projection).

A feature of the system and method is the capability to track the parts completely in 3D space and in 6-DOF, in real-time, even if the reference component (which defines the current coordinate system and all measurements) is moving. The arrangement of the system imaging components and obtaining and manipulating the imaging information facilitates assembling a structure from components using projected indicia as guidance. Indicia may be displayed on a display monitor, virtual reality glasses, components, or the structure, a display plate, tooling, or combinations of one or more these.

According to embodiments, the system, method and devices provide the position and orientation direction for placement and installation of components. The system also may determine and control positioning of tools, such as robots that are computer directed or manually directed, as well as tools used by personnel assembling the components. Assembly of components may be carried out using the actual CAD to provide direction for placement of components. The engineers who typically design the components and the structure to be produced may be better connected with the manufacturing personnel through the system integration of the design, such as CAD drawings, with the actual assembly operation, as well as deep data like the material properties, test data, etc. The system, method and devices allow for the generation of feedback and alerts. Manufacturing information therefore may flow back to the quality and design engineering personnel or systems, so that even while the component assembly process is taking place, or thereafter, the engineers may be provided with the in process structure, as well as measurements as-built, quality information, manufacturing notes and engineering concerns (flags), for management action, as it is being built, which preferably includes real-time access. For example, an alert may be generated during an assembly step or even during an attempted component assembly step, and that alert may be provided to engineering. The engineering personnel may receive feedback as the structure is being assembled, or even as a component is being installed or manipulated. In the case of some deviations, the system may be configured to limit further assembly of the structure or a component until an engineer has approved the continuation. Alternatively, the engineer may make a design modification or change before the assembly operation continues. For example, a change may be made to the design, which may change the build relative to the CAD design file. The system therefore, may continue to provide instructions for positioning of components based on the design change, which, for example, may be a change for assembly of this component, or a number of other components. The system may continue the assembly using the CAD file, which includes the change made to the CAD file. The CAD file therefore will contain an update made by engineering, and the assembly operation and structure will be in conformance with the CAD file and change.

The system also provides that during the assembly, operations may be captured and the precise location of the assembled components and the operations carried out to install or assemble them are documented. The system therefore obtains data, actual measurements, from the assembly process as the structure is being constructed, and therefore generates information for an as-built digital-twin of the structure. For example, the vehicle, such as an aircraft, may be assembled. The vehicle components and assembly operations may be carried out in accordance with a plan, such as, for example, a blueprint or drawing. The method and system monitor the placement of components and operations that install and connect the components of the structure, as the structure is being built. The location and orientation of the components of the completed structure are stored, and the captured location and assembly information may be transformed to generate a digital twin of the structure. The digital twin may be utilized to recreate the structure itself, as well as any point along the assembly of the structure, which would have been in real-time, as the assembled structure was being constructed. For example, where the same product is being assembled, and shifts of personnel change for products produced, or where the product is assembled at different locations, the products themselves may be constructed from the same assembly drawings or blue prints. The digital twin of each respective product provides the assembly for that particular product, which may be similar as another product, or may be quite different.

The present system and method also facilitate production by improving consistency of the completed product or structure. The structure may be assembled directly from the CAD drawings. According to some preferred embodiments, the components are represented in the CAD and component indicia representing the image of the component, which may include a shadow, texturing and other attributes, as if the component were actually present, is displayed at the assembly area. The component image preferably is generated from a projection source. The component image may be viewed from a projection source that projects the component image with reference to the assembly structure, or one or more other components of the assembly structure. The system and method further image the structure in process as it is being built and the component location, as the component is being moved into position. According to preferred embodiments, the process may be carried out where the structure or other component to which a component is being installed, may be static or may move. In some instances the movement may be intended, such as, movement of the structure along a rotational or axial path to expose an area for assembly or attachment. However, in other instances, the movement may be undesired or unanticipated (both in degree and direction). The system preferably is configured to capture movements of the structure as well as movements of the component, so that the component may continue to be installed in the desired location and orientation with respect to the structure, even where the structure, or a portion of the structure, and the component have moved.

According to some embodiments, the projection of the component image may include guide indicia, which may identify when the component is aligned in the desired position and/or orientation. The guide indicia preferably indicates the alignment relative to the structure, and may include text or a change in an indicator graphic when the component is in the desired alignment.

Preferred embodiments also generate information about the position of the component, which may be a relative position based on a reference position or structure, and may comprise a spatial coordinate (X,Y,Z) position. The position data for the component preferably is displayed on a display screen, or projected on a display plate, or viewed with an augmented reality method, all in real-time, as the component is within the assembly field of view. In addition, preferred embodiments also may be configured to depict a tolerance via an actual number or range, as well as a graphic. The tolerance may be the designated assembly location or position of the component being installed, and may be depicted with or as part of a projected image as well as on a display screen to provide guidance for the installation of the component.

Assembly tools, such as, for example, drills, clamps, robots, may be configured to operate based on movements of an attaching component to be assembled onto a structure and/or other component, and that of the structure or other component. According to preferred embodiments, in addition to components and the structure, the tools preferably are captured and tracked by the system. Preferably, the system obtains the tool location and orientation, in real-time, as components are being assembled. The tool movement may be carried out manually by personnel involved in the assembly of the structure (e.g., personnel using the tool), or where a tool is guided by personnel. Alternatively, tool movement may be carried out robotically, unassisted by personnel, or, in other instances, may be carried out using a combination of techniques (manual and robotic). The system may align, drive, and/or control assembly operations robotically, including drilling, riveting, layup head, or assembly operations, in which the system may specifically monitor and drive one or more robots on the correct path and to the precise location, and, then document as-built. The system may document the robotic operations as part of the as-built information. Tool guide indicia may be used to position the tool in the proper location for carrying out the tool operation. Tool guide indicia may be generated and displayed similar to the component, and also may provide the desired location as well as tolerances.

For example, according to preferred embodiments, the RVAT system may utilize the CAD file, and in particular, the information about the component, to carry out the assembly, so that subsurface features, which are not visible to personnel operating devices, and which may not be locatable on the surface of an object, such as a concealed component or structure surface, are known through the CAD design or physical scan and the component's real-time measured location in 6-DOF. The CAD may provide location coordinates for objects, which, through a transformative implementation carried out by the RVAT system, may provide the indication of the location of subsurface structures which are involved in assembly operations. The CAD coordinates preferably are actual position coordinates. In the case of the as being built assembly, the real-time position of the structure being assembled, and the components being assembled thereon, preferably are being directed from the CAD for assembly using the RVAT system. Preferred embodiments also obtain and generate a real-time digital copy of the as-built structure (including, the CAD and data of the true structure). For example, the data may include location and position data as well as data that comprises material data/tests, assembly data (temp/operator), and the like.

Data may be material data/tests, assembly data (temp/operator), etc. The digital copy may be replicated, for example, in a number of forms, actual, model, data structure, as the structure is being assembled. The system may be configured to provide an indication that maps one component to the location of another component. For example, where a substructural component is installed, but not visible, and another component is required to be installed to or engage with that substructural component, the system, method and devices carrying out the assembly, may be referred to the digital copy, in real-time as it is being built or generated, to assemble the one component to the substructural component based on the actual location of the substructural component. This procedure minimizes or eliminates the potential for misalignment of engagement locations, which, for example, may be crucial to securing a component, or to prevent its failure during use, as well as to conserve resources by not having to re-assemble or retrofit the component at a later time.

The RVAT system preferably is configured to coordinate the CAD file with the imaging of the assembly by transforming CAD information to produce a Reference Component designation. The reference component designation preferably is constructed from a manipulation of the CAD file information and the image frustum of the assembly imaging area. Preferably, the CAD transformation includes RVAT calibrations that take place at multiple frustum locations, which in a preferred embodiment may comprise the front of the assembly imaging area, the end of the assembly imaging area, and a location therebetween.

According to preferred embodiments, the component indicia and structure indicia may be displayed on an augmented reality headset, which may be viewed by personnel, such as assembly workers, technicians, engineers, and others. Assembly personnel may view the images as well as the alignment indicia of the components and tool indicia, and may utilize the indicia to position the tool in the proper location and orientation. When the alignment indicia corresponds with a desired alignment for the tool, by showing an indication of alignment (e.g., graphic, color, flashing, text, or combinations of these), the personnel may operate the tool to assemble the component, or carry out another operation, such as, for example, installing an item, cutting, drilling, or fastening an item. The personnel may view the indicia that is projected onto the assembly structure and components, and which also provides indicia of a component where the component is to be installed. The system monitors the location of the component when it is moved into the field of view of the monitoring mechanism. Preferably, a library of component structures are provided, and the system is configured to process components within the field being monitored, and identify them based on a relationship of the processed component data in the library with the component data obtained by the monitoring mechanism. The monitoring mechanism preferably includes imaging components. The library of components may be generated by the RVAT by imaging the component.

Alternatively, the monitoring and assembly alignment may be implemented to have assembly devices, such as robots and other autonomous tools operate to position and align themselves for carrying out an assembly step, such as delivering a rivet to components, or drilling. According to some embodiments, the system and method may be utilized to carry out clamping operations, holding of components, as well as adhesive curing. The system tracks the components being held, as well as tooling used in assembly operations (e.g., such as an adhesive tool) to align and secure the component to its proper location (e.g., to the structure or other component), even where movement of tooling heads or the structure has taken place. The system tracks the component as wells as the tools and structure to facilitate assembly. For example, the system and method may be employed to track and assemble components including a tape laying or assembly head, and other assembly tasks. According to some alternate embodiments, a method and system for tracking structural development and completion employ thermography. The RVAT system may be configured to employ thermographic captures, and the CAD is generated to also include thermographic information for the as-built structure.

According to some embodiments, the RVAT system may implement combinations of manually directed user operations with robotic or autonomous actions. In addition, assembly personnel may assist or carry out a contemporaneous step, while a robotic mechanism is operating. The RVAT system tracks the devices within the assembly field of view and may be configured to control one or more operations of an assembly tool or device, such as aligning a tool, and allowing the user personnel to trigger an operation, such as delivery of a rivet, etc.

In addition, some embodiments of the system may track a tape laying head in 6-DOF to build the composite structure, precisely, one layer at a time. The build is stored by the system in a manner such that the CAD produced for the as built structure includes the actual positioning of the layers.

Another feature of the system and method is that the RVAT system may be configured to carry out non-visible monitoring of tools or components by tracking their locations with a non-visually interfering source, such as infrared illumination (radiation), that may be used to image and/or track the tool or component, but which does not interfere with the image indicia viewed by the user or the actual assembly area being viewed by the user. The monitoring system may comprise an image capture component, such as, for example, a camera with a lens, or may include an array of one or more cameras (e.g., stereo camera). Alternatively, an imaging component that captures a wide field, such as with a wide-angle lens may be used, and the field may be correlated to take into account object positions in view of the parallaxes that may be present as a result of the lens capture. These imaging components, where infrared illumination is employed, typically are to be capable of resolving infrared wavelength captures.

The system may also be used for surface measurements and NDT (non-destructive thermography) of the assembly to confirm accuracy of assembly. NDT (like Infrared NDT) can be performed during assembly to confirm good bonds or detect foreign material. The system may be configured to associate the as-built structure (and components thereof) with NDT (non-destructive thermography) to assign the thermography location coordinates with the as-built CAD file generated from the actual assembly (the as-built structure). Embodiments of the system may be used in conjunction with ARAMIS thermography to provide spatially precise thermal data critical for use by the RVAT system to compare structural information with NDT results and long-term monitoring. Thermography may be carried out using a suitable illumination source and capture components, such as, for example, infrared illumination, or illumination across one or more of several spectral bands. When a thermal image change is detected, the system may generate and store an updated (as exists) structure, saving the prior information, so that if desired, monitoring of a condition may be carried out over time for a particular component or location of a structure.

The system and method also may be used to carry out repairs, correspondences, and analyses, including failure analyses, of a structure or components thereof which have been assembled and used in a field operation or other environment where the structure, such as, a vehicle or aircraft, would be operated. The digital copy of the structure may be evaluated subsequent to the generation thereof, at any point in time during the assembly. This enables the evaluation of the assembly process and component assembly to be evaluated serially, as each component is installed, but well after the installation has taken place. In other words, at a time subsequent to the actual product assembly, real-time analysis of the assembly operations may be conducted. The analytics of the digital copy/digital-twin may be used to detect discrepancies from build to build, and long term monitoring of structures, like flight after flight.

According to embodiments, the system may be used to track repairs to a portion of the structure. For example, where as part of maintenance, or part of a repair of a failed part, the repaired part or portion of the structure may be marked with a marking arrangement that provides details of the component or structure movements from the as-built structure, or any point in time, including at the time of repair, and thereafter. For example, embodiments provide a unique marking pattern, which may be a random pattern, which is applied to the structure and/or the components, preferably on the imagable surfaces of the structure, to greatly increase the accuracy of the measurements. The pattern is imaged and recorded to record the location and orientation of the structure and components, and the pattern. The pattern is mapped and assigned correspondences with image coordinate locations allowing the pattern to be reproduced. The image coordinate locations of the structure and components also are obtained and recorded to provide their location. The random pattern therefore corresponds with the baseline for the structure, as well as components. The baseline may be an initial production baseline, a repair/reconstruction baseline, or another point in time. The baseline may be used to provide a reference so that subsequent evaluations of the repair or structure may be evaluated by imaging the pattern to determine whether it is in the same position with respect to the structure. For example, a shape change may indicate that an impact ("dent") or strain is detected, and/or an indication of damaged or weakened structure. In addition, thermal NDT (nondestructive testing) may be used simultaneously to detect subsurface defects, like composite delaminations in the structures, as well as other potential subsurface conditions. For example, where the structure includes a damaged panel, and the panel has expanded or contracted from its original position, the baseline pattern will no longer produce the same pattern. The pattern deviation will be detected and a deviation generation will be processed and reported. The detection of pattern deviation preferably is coordinated to update the digital-twin to the current condition, so that a digital-twin at that time is stored to represent that real time condition (as well as saving the original or previous update of a digital-twin). According to some embodiments, the repair tracking may be implemented with the RVAT digital duplicate, wherein the transformed CAD data representing the as-built structure, is further manipulated to include the unique markings, e.g., randomized indicia.

These method, system and devices may be configured to use one or more of these features in combination with one another, as desired by the user and application.

BRIEF DESCRIPTION OF THE DRAWING FIGURES

The patent or application file contains at least one drawing executed in color. Copies of this patent or patent application publication with color drawing(s) will be provided by the Office upon request and payment of the necessary fee.

FIG. 1 is a table, Table 1, which illustrates an exemplary implementation of an assembly operation, and operation and evaluation steps.

DETAILED DESCRIPTION OF THE INVENTION

Figure 2:
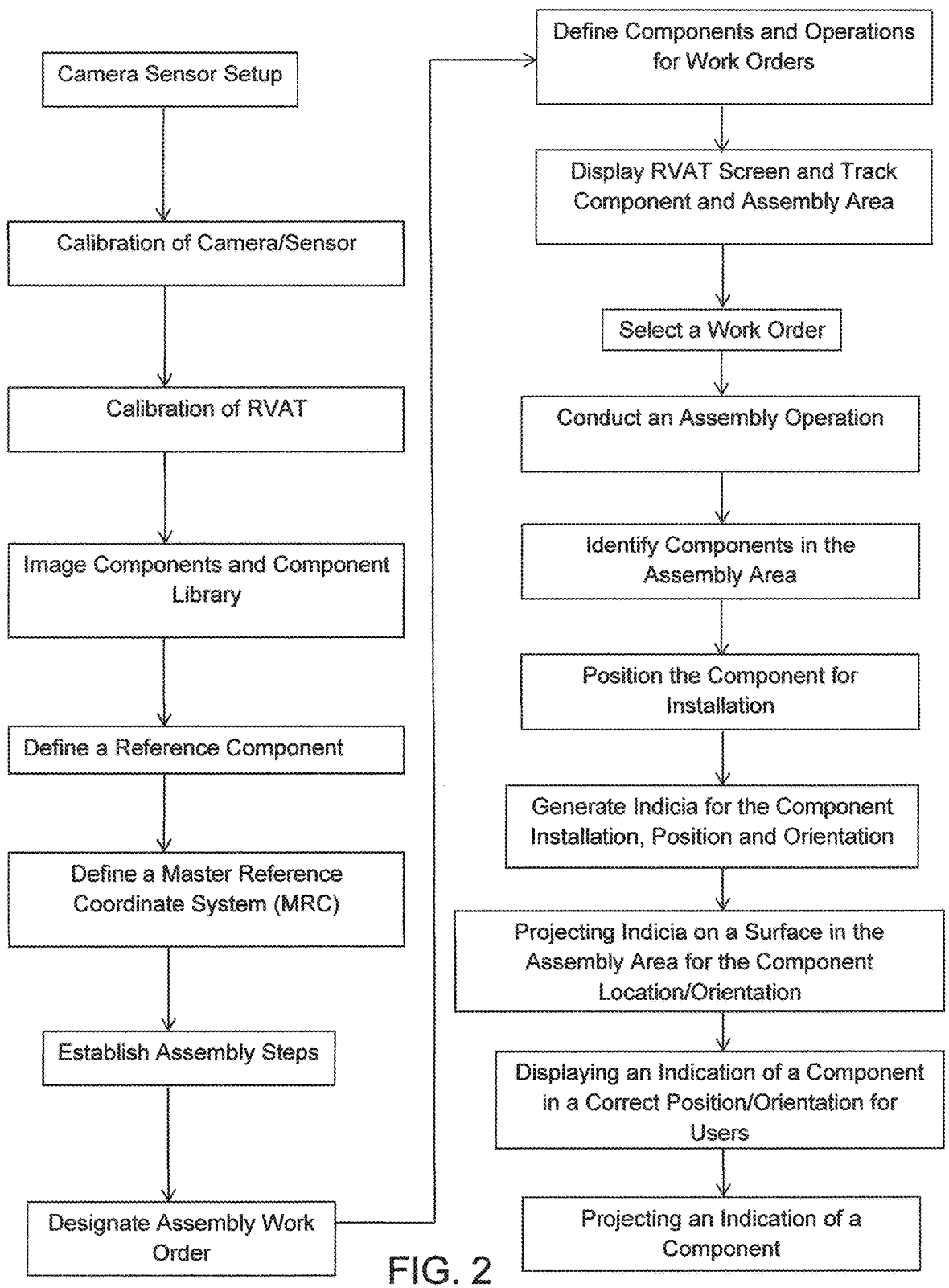
FIG. 2 is a flow diagram of an exemplary embodiment of the system and method for conducting RVAT assembly.

A system, method and devices are provided for assembling a structure from component parts, and for health and maintenance monitoring of the completed structure. The component parts may comprise components, also referred to as assembly components, that are used to construct a structure, such as, for example, a vehicle, rail car, aircraft, spacecraft, satellite, rocket, civil structures (bridges and buildings), industrial production equipment for pharma and agricultural applications, as well as for other industries. The component parts are typically three-dimensional objects that are required to be assembled to form a structure. Some of the component parts are assembled by installing them onto the structure being constructed, which in some cases may involve securing one component part to another component. In other instances, one or more components may be assembled prior to placement on a primary structure. The system includes one or more computing devices, such as, for example, a computer with a processor, communications components for communicating over a network (such as a wired or wireless network), and a storage component that is provided as part of, or that is accessible to, the computing device. The system preferably includes one or more imaging devices comprised of imaging components, which may include one or more cameras that are configured to capture the images of the work area in real-time. The work area may be the designated space within which the assembly of the structure takes place. According to some embodiments, a plurality of imaging components is provided. The imaging component (or imaging components) is situated to capture the work area in its field of view. According to a preferred embodiment, the imaging component comprises a camera with a lens, and has an image sensor that captures image data of the objects in the field of view. For example, the structure, the components that are used to assemble and construct the structure, as well as tools, are imaged by the one or more imaging devices. The RVAT system is configured with software that identifies the position and orientation of the components, tools and structure within the field. The software includes instructions for implementing a recognition process where the imaged field objects, such as for example components within the assembly field of view, are compared with an image library containing component image data for components that will be used to construct the structure being assembled. A component is identified and its movement is continuously tracked by the imaging components. This is accomplished by one or more sensors tracking the component within the assembly field of view. The sensors of the imaging devices may capture and track objects and their movement within the assembly field of view. The system may track objects, including for example, like a bulkhead being added to a fuselage, or a tool, like a drill, tracked into position. Another example of a component that may be tracked, is a fastening element, such as a Click-Bond®, or similar generic assembly component, that is tracked into position with fastener installation tool, such as a Click-Bond tool, which engages the fastener (or Click Bond®) to facilitate its alignment, and allows guidance for the assembly of each fastening element (such as a Click-Bond®). Examples of other items that may be tracked include a drill point marking tool, with which the operator may use to mark each drill location, all with the same tool. The component location information and tracking is obtained and recorded in real-time. The system also has the location information of the structure being assembled, and the location of the structure to which the components are being assembled is identified with the imaging component. The system records the position and orientation of the structure as it is being assembled, along with the components installed thereon and operations performed on the structure and components.

Figure 3:
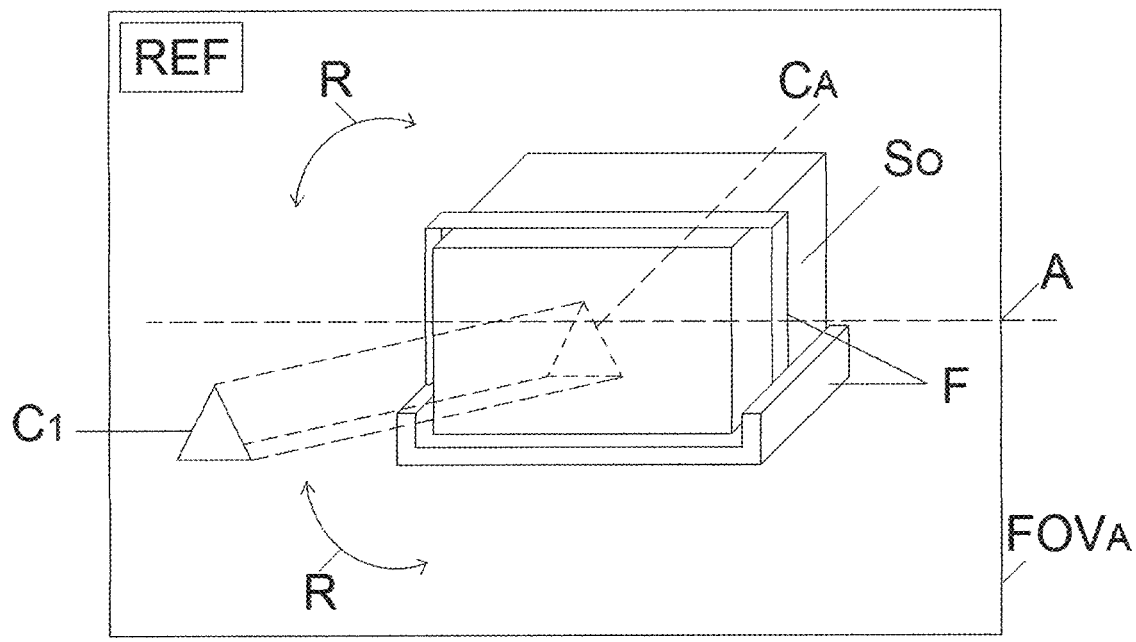
FIG. 3 is a schematic diagram illustrating an exemplary implementation of an assembly operation with the RVAT system.
Figure 4:
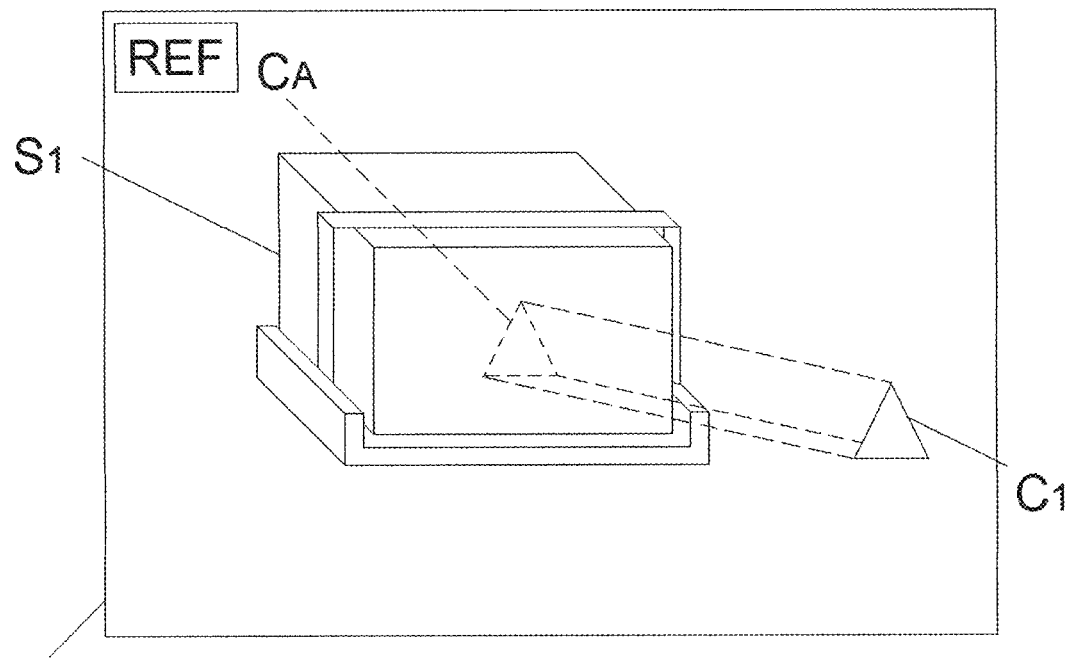
FIG. 4 is a schematic diagram showing the depiction of the objects in FIG. 3 in an alternative condition.
Figure 5:
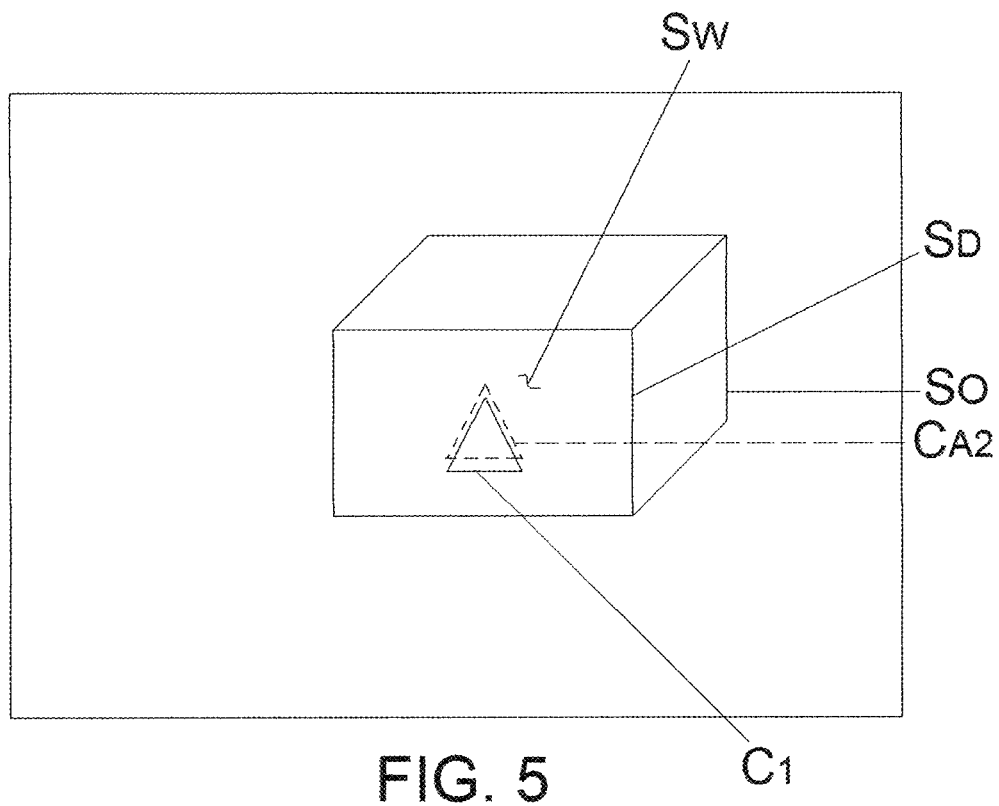
FIG. 5 is a schematic diagram showing the depiction of the objects in FIG. 3 in an alternative condition where a deflection occurs during an assembly operation.

Turning to an example, with reference to FIGS. 3-5, the structure position $S_0$ represents the structure at its initial location. For example, components are to be installed on the structure in order to produce the final product. The structure may remain in its initial location $S_0$ while one or more components are installed thereon. Alternately, the structure may move intentionally or unintentionally during the assembly process. In the case of the assembly of certain structures, such as, for example, an aircraft, the structure may be supported on a frame F, and may be rotated to provide access to different portions of the structure (e.g., top, bottom, right side, left side). This may be the case for the fuselage of an aircraft, where the fuselage is supported on a fixture or frame that rotates the fuselage to bring portions of it to an area where the assembly operation or tools may access it. In the schematic depiction in FIG. 3, the structure $S_0$ is supported on a frame F and may be rotated R about an axis A. A component $C_1$ is detected within the assembly field of view ($FOV_A$). In the schematic depiction, a projected alignment image $C_A$ of the component is shown representing the component assembly location on the structure $S_0$.

The system is configured to track the real-time location of the structure, so that movement of the structure during an assembly procedure is tracked and the component installation is managed with reference to the real-time position of the structure. For example, in some instances, a structure may change its location (position and/or orientation) as a result of the assembly operation when a component engages the structure, or is installed on the structure. The structure movement preferably is tracked in real-time to provide the position of the structure, as well as the components thereon. In the event that the structure has moved from its initial location $S_0$ (FIG. 3) to a second location $S_1$, as in FIG. 4, (compare REF position) the monitoring of the structure location is obtained to record the position and orientation of the structure at the time of assembly. This may be done to provide the structure location when a component is being installed thereto. The component location is identified, and may be positioned for a proper alignment with regard to the structure. The system also is provided to carry out the assembly of a structure where the structure or a portion of the structure changes position or orientation during an assembly operation step. For example, a wall of a structure may receive a component thereon in an assembly step. During installation, the component may engage the structure wall, and assembly of the component to the structure wall may cause the structure wall to move when engaged by the component. For example, the structure wall also may move as a result of a force being applied from a tool used in the assembly operation to attach the component to the structure. According to some embodiments, the movement of the structure wall is tracked in real-time, and the component location also is tracked in real-time. The system is configured with the assembly instruction, (such as the CAD drawing) or, according to preferred embodiments, information from the CAD drawing transformed for the RVAT assembly. The system therefore has the information as to where on the structure the component is to be installed. The movement of the component and structure wall may be tracked in real time to ensure that the component is being installed in the correct location. The system may track the structure and component, and may provide indicia in the form of a projected guide or information on a display, such as a monitor or AR display. The real-time tracking of the structure and component provide for assembly operations to take place in their designated alignments.

According to some embodiments, the installation of the component and structure wall movement are known from a prior installation, and the structure change in location, such as the structure wall deflection upon engagement with the to be installed component, may be identified, and the component installation may be carried out to install the component at the desired position on the structure even where the structure wall is not in the same position that it was when the component initially engaged it. An example is illustrated in FIG. 5, using FIGS. 3 and 4 as a reference. The structural deflected position or portion thereof ($S_D$) is tracked by the system imaging components. The location of the component $C_1$ and its alignment position on the structure $S_0$ are also tracked to provide the location on the structure $S_D$ in its presently deflected condition with the moved wall portion $S_w$. Therefore, the component installation location ($C_A$ of FIG. 3) while being the desired location for alignment of the component $C_1$ for installation, is now in alignment with regard to the structure at the location of the structure wall $S_w$ that has undergone a deflection. The deflection in this example of the structure portion $S_w$ changing its location from its initial location (see FIG. 3), and with respect to other portions of the structure $S_0$, may be configured to serially move the component $C_1$ (or direct its movement) along with the movement of the structure portion $S_w$, so that in real time, the component $C_1$ and structure (or portion or portions thereof) $S_0$ may be tracked, and assembled in a desired alignment. In addition, the position alignment for proper installation of the component $C_1$ may be at an adjusted position $C_{A2}$ (FIG. 5), so that the system instructs the alignment of the component desired to be installed at the position where $C_A$ is represented on the structure $S_0$ (of FIG. 3) to be positioned at an adjusted location $C_{A2}$ (FIG. 5) that will result in the position desired (see $C_1$, FIG. 3) when installed from the adjusted location $C_{A2}$ (FIG. 5) and when the structure deflects (see $S_D$ and $S_w$ of FIG. 5). The system identifies the structural and component movements during installation, preferably in real-time, and may be set to track a deflection (or other movement) as part of an installation before the actual installation takes place. Accordingly, further, the real-time tracking of the movement of the structure, such as the structure portion in this example, may be recorded and applied to subsequent installations where the component is to be installed on the structure. According to one embodiment, the component location position for the attachment operation (riveting, clamping, or other procedure) may be applied to the subsequent production assembly.

Figure 6:
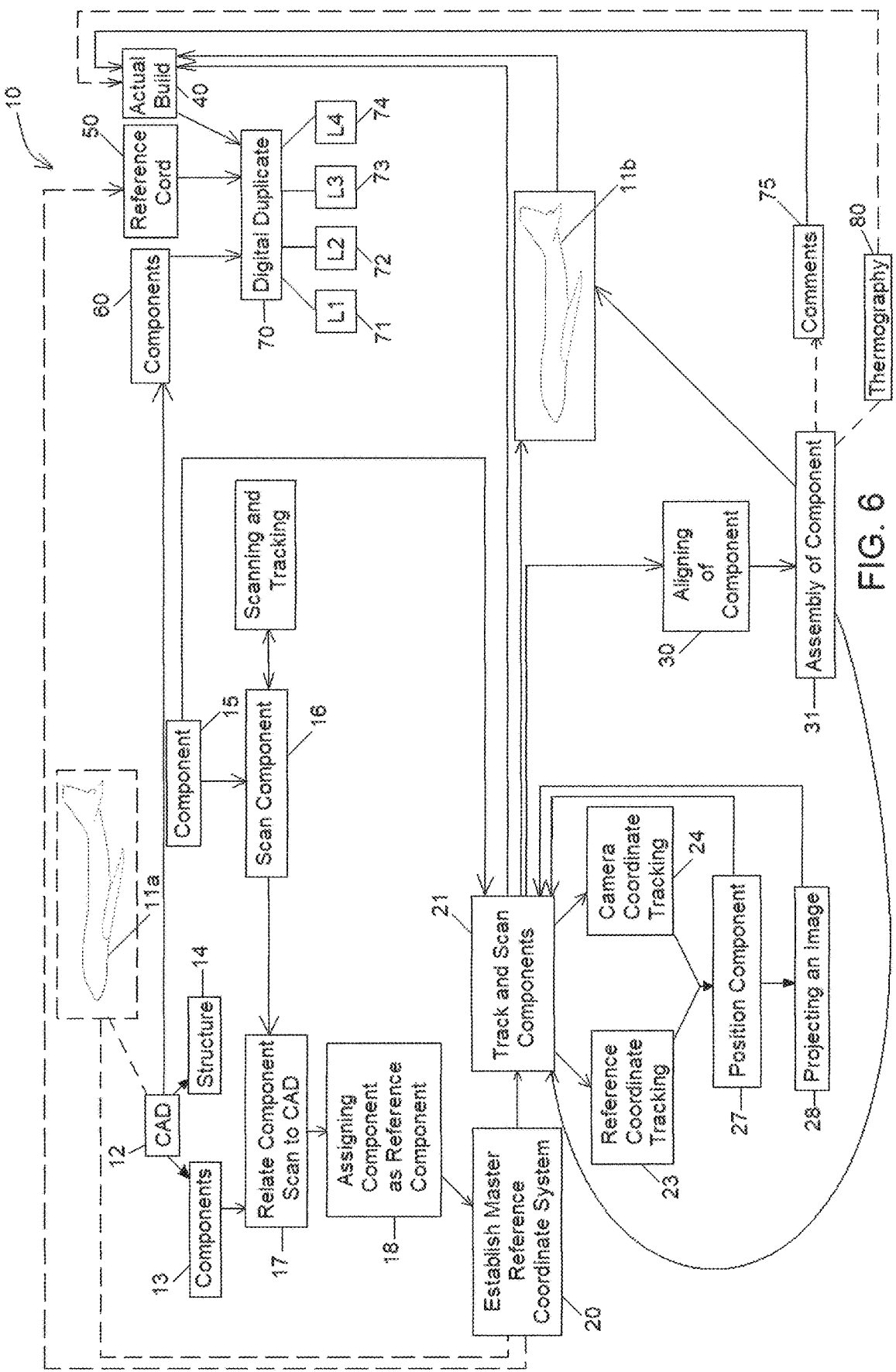
FIG. 6 is another schematic diagram depicting an implementation of the RVAT augmented reality system for component assembly and archival baseline clone according to an embodiment of the present invention.

Referring to FIG. 6, a schematic diagram 10 is illustrated depicting an implementation of the augmented reality system for component assembly and archival baseline clone according to an embodiment of the present invention. Assembly of the structure is carried out with real-time virtual or augmented tooling. A structure comprising an aircraft 11a is depicted as a design represented by one or more CAD files, block 12, which preferably comprise CAD files or information for individual components 13 (and/or component assemblies) and for the structure 14. According to an implementation, the CAD drawings files 12 represent the structure 14 and components 13 in a vehicle coordinate system. One or more actual components, block 15, are scanned, block 16. From the scan, block 16, actual dimensions of the one or more real components are determined. The one or more scanned components, blocks 15, 16, are related to the CAD vehicle coordinate system; block 17. At least one of the real components is assigned to serve as a reference component, block 18. A master reference coordinate system (MRCS) is generated, block 20. Components to be assembled (block 15) are tracked with reference to the reference component, block 21, including the one or more real components, block 15, and additional components represented by the CAD drawing files (block 13) by imaging, block 21, the components to be assembled, block 15. Tracking block 21 includes scanning the assembly area and identifying components. The components to be assembled, 15 and the structure being assembled 11b (which may be a portion of the structure as it is being assembled) are tracked, block 21. The tracking tracks the components, 15 and structure, 11b, in both reference coordinates (actual coordinates), block 23, and camera coordinates (for projection), block 24. The component, block 15, is tracked and scanned, block 21, while it is positioned (or otherwise moved within the assembly area, block 27. An image is projected, block 27, which may be on a display, on a component, or on a structure (or on any one or more combinations of these). A projection, block 28, projects an indication of the position of a component, block 15, to be assembled. A graphic image representation of a component to be assembled may be projected, block 28, and may be projected at the location where the component is to be assembled, which may comprise a projection on the structure being assembled, 11b, or on another component. The projection, 28, comprises a dynamic guide and provides an indication when the component, block 15, is in the proper position for assembly, block 30, and the component, block 15, is assembled, block 31. The assembled component is tracked and scanned, block 21, and the coordinates, blocks 23, 24, are recorded. The actual build 40 includes the location information for the assembled components. In this depiction, the master reference coordinate system, block 20, also provide a reference, block 50. The CAD, file 12 also provides information that represents the components of the structure, block 60. A digital duplicate, block 70, is generated for the as-built structure 11b, and according to the implementation depicted, includes the tracked and scanned components, block 21, as assembled, block 31, as well as the CAD information, block 12, the MRCS reference system, block 20, and the actual build, block 40. Some examples of the information that the Digital Duplicate may possess, include Engineering, Manufacturing, Quality Assurance (QA), Field Repair and Structural Health Monitoring (SHM), Final Manufacturing Documentation (Company complete Digital-Twin), Government Customer Digital-Twin dataset, ITAR Customer Digital-Twin dataset (USA friendly customers), and/or Non-ITAR Customer Digital-Twin dataset (other customers). The digital duplicate (or digital twin, as it may sometimes be referred to), block 70, includes the as-built structure in any real time reference, at a point of the assembly. The assembly may be recreated, at any point in time (e.g., digitally), or may be duplicated, as-built, from the digital twin, or an assembly step may be recreated or built. Comments, block 75 may be provided by operators, or others, prior to or during an assembly, 31, which may be made part of the actual build data, block 40. Also depicted in FIG. 6 is thermography, block 80. Thermography information is obtained for the one or more components, 31, or the structure 11b, or both of them. The thermography, block 80 may be included with the as-built structure information, block 40, and becomes part of the digital twin, block 70 providing a baseline for the structure 11b. Changes between the digital twin, block 70 and real time components or structure as represented by the real time positions of the one or more components comprising the structure 11b, or the structure itself, may be monitored. In addition, digital twin levels, represented by L1 (71), L2 (72), L3 (73), and L4 (74), may be provided so that information on the as-built structure (the build, assembly steps, techniques (e.g., if trade secrets are involved), comments, or other portions of the data for the structure, may be separately packaged. The digital duplicate, block 70 may be a Level 1, (L1) digital duplicate, with all of the information, or may be another level digital duplicate (Ln), with another level, such as without thermography information, without trade secret references, or the like. The levels, for example, may represent Digital-Twin data and analytics separately for one or more of the following: Engineering, Manufacturing, Quality Assurance (QA), Field Repair and Structural Health Monitoring (SHM), Final Manufacturing Documentation (Company complete Digital-Twin), Government Customer Digital-Twin dataset, ITAR Customer Digital-Twin dataset (USA friendly customers), and/or Non-ITAR Customer Digital-Twin dataset (other customers), or may represent one or more combinations of these.

RVAT Imaging

According to some preferred embodiments, a non-contact and material-independent measuring system is employed to image the components and the structure being assembled. The imaging mechanism preferably includes one or more imaging devices. The imaging mechanism, according to some embodiments, may comprise a single camera lens or capture element that captures images of the structure being assembled, as well as the components within the field of view. Alternately, a plurality of imaging devices are employed to image and track the structure being assembled and assembly components that are installed on the structure. According to some preferred embodiments, imaging devices may be arranged and configured to employ photogrammetry to track target dots and locations in 3D space, and digital image correlation (DIC) to track complete surfaces, and see and detect strains. In some embodiments, the imaging devices may be positioned at different locations to capture the field of view of the assembly operation from two or more directions or points of view. For example, in some instances, such as where a human worker, robot, tool, or portion of the structure itself blocks the path to the imaging sensor or lens, a second imaging device may be located to track the element that otherwise is blocked from the field of view. The system may be configured to employ cameras and projectors from different locations around the assembly area, and may actuate projectors (e.g., turning them on or off) based on the assembly step being carried out and/or the locations of the installer, tool, or robot positions during the assembly or assembly step. This facilitates providing an image that may be projected in the work space area (or on a component, structure or tool) without interference.

According to some embodiments, the imaging is carried out with imaging devices in conjunction with digital image correlation. The imaging mechanism may be configured to monitor full-field as well as point-based positions. According to some embodiments, the system may employ digital image correlation to conduct analyses of the structure and assembly components within the field of view. Preferably, the imaging is defined by an area that represents the area where assembly operations are carried out, and is an assembly field of view. For example, objects, such as assembly components, or a single element of the structure or of a component (or portion thereof) may be tracked, whether the element is just a few millimeters, or where it is up to several meters in size, or larger. The RVAT may be provided with information and instructions (which a user may designate) to focus tracking on a portion of a component or structure during a particular step of an assembly procedure. According to preferred embodiments, the imaging mechanism is configured to perform high-precision measurements with a 3D measurement resolution in the micron to the sub-micrometer range for components within the field of view being imaged. According to some embodiments, the imaging may be done without the need to specially mark or coat the components. According to some other embodiments, imaging may be carried out with visible targets or patterns, or with invisible targets or patterns (UV). For example, embodiments may employ reference targets, such as for example, barcodes or QR-codes, that can provide part numbers, locations, document numbers, file locations, and the like. According to some embodiments, the imaging mechanism is configured to image statically or dynamically loaded components.

RVAT Image Capture Software

The system includes software for receiving the image information from the image capture component (such as, for example, a lens and image sensor) and recording the information. Preferably, the software is configured with instructions for generating three dimensional coordinates (x,y,z), three dimensional displacements (x-x1,y-y1,z-z1), velocities (v), and accelerations (a). This information preferably is tracked in real-time, and the RVAT system which receives the imaging information from the imaging mechanism or imaging portion of the arrangement, transforms the data to provide direction for the assembly of components. Surface strain also may be measured using the imaging components and the software. The system monitors the components, including the structure to which a component may be assembled. Preferably, the monitoring is captured in real-time and records and generates information that provides six degrees of freedom (6DoF) for the objects and their movements. Preferably, a plurality of imaging components and projectors are arranged around the assembly area. According to an exemplary embodiment, three pair of stereo imaging cameras are employed and arranged to image the assembly area, and three projectors are disposed to project into the assembly area (with any projector being independently operable to project based on input data received and processed from any of the imaging cameras (or camera pairs).

The imaging mechanism, according to one exemplary embodiment, comprises a 3D camera configured as a stereo camera system that provides three dimensional coordinates for the objects in the field of view (which preferably may be configured to be the assembly field of view). The structure and components are tracked within the assembly field of view using a three-dimensional coordinate system.

The imaging software, such as, for example, ARAMIS, can track the components in real-time, calculating positions in both real CAD coordinates and camera coordinates (critical for projection), providing the data to the RVAT system. The RVAT system has the knowledge of historical data (CAD, ATOS scans, assembly information, programmed assembly steps, and other datas). The RVAT system may have information coming in from multiple ARAMIS imaging components and captures (each with a point of view of the assembly area), and controls each ARAMIS/RVAT Projector, which displays data as needed (possibly displaying data on one projector gathered from other ARAMIS). The RVAT system also captures the data for the future as the as-built digital-twin, as well as quality information, action items, manufacturing comments, as well as operator performance, such as speed of performance, quality of assembly, manufacturing success; RVAT scores. "I am an RVAT 368 Level operator!".

According to some embodiments, the 3D coordinate location of the objects in the field of view may be generated through triangulation and with the use of stochastic patterns or reference point markers. The system software is configured with instructions for processing the image information. One example of an imaging system that utilizes two cameras with two lenses for capturing 3D images is ARAMIS (GOM, GmbH). An imaging system such as ARAMIS may be used to image the structure and assembly components. The ARAMIS imaging devices also may be used to obtain information, which may be generated using imaging software, such as, for example, ATOS, PONTOS Live, and/or TRITOP (GOM, GmbH). Imaging software, such as for example, ATOS, may also scan a part to directly measure the components true dimensions and compare with CAD, and imaging software, such as, for example, PONTOS Live, may also track target points live, and TRITOP may directly measure component target points 3D locations and compare with CAD. The imaging information captured with the 3D imaging devices (including image information processed and obtained with ARAMIS and/or ATOS, when those products are used) is thereby made available to the RVAT system, which manipulates and transforms the image information to carry out the real-time virtual assembly method. The RVAT preferably manipulates information to generate a display of indicia representing installation parameters for assembly components and structures to facilitate an assembly operation. The RVAT projects images to direct the assembly of components or operations, and preferably also generates and provides instructions for real-time assembly operations. According to some embodiments the RVAT is configured to take the CAD and/or the scan of a component and add engineering information like fastener (e.g., Click-Bond®), drill, and rivet locations, material placement, as well as manufacturing steps, automatically to the build program. The RVAT may be provided with the knowledge of the assembly operation or step, and may associate one or more tools, components, fastening, or other build steps to generate an automatic build step or grouping of steps. The engineer or other technician may use this feature when planning and setting up the RVAT system for operators to use to build a structure. (See e.g., the exemplary depiction of the set up operation (FIGS. 10 and 11), which may be configured to auto-generate the build steps). According to some embodiments, the engineer or other technician carrying out the set up may change or modify the automatic build steps (as desired), and according to other embodiments, auto-build steps may require review and approval at set up. For example, where fasteners (such as Click-Bond® fasteners) are to be installed over a surface, and each involves a similar step, but in a different placement location, each location may be marked, and the steps may be automatically generated for each fastener (Click Bond®) to be part of that assembly job step or work order step.

According to some embodiments, the RVAT software is configured to record the location of the components and structure to which the component is being assembled. The location preferably is processed from the image sensor information to generate a three-dimensional coordinate reference. The three-dimensional coordinate reference preferably is associated with a time, so that real-time information corresponding with real-time positioning of components, whether static or in motion, is ascertained and stored by the RVAT system. Preferably, the capture of location information for assembly components and structures within the field of view, such as within the assembly field of view, may be tracked over the duration of the assembly process. The system may be configured to capture and track the three-dimensional coordinate locations for each structure and component, and, according to some embodiments, may do so without the need to store images (although storage of images, such as periodic or otherwise may be done if desired). The location of the components as well as the component movement or alignment may be generated in real-time, instantaneously, as the assembly operation is being carried out. According to preferred embodiments, the system and method may be implemented in augmented reality, and preferably on a display, such as an AR headset, monitor or both. The three-dimensional coordinates may be used to display the object being assembled, such as a component that is part of an assembly and which is to be installed on a structure. The object preferably is displayed on a display (e.g., AR headset) that a user (e.g., personnel carrying out an assembly operation) may view, even while the user is engaged in conducting an assembly operation. The viewing of the assembly operation may take place in real-time, as the real-time tracking of the component positioning is taking place. The component movement within the assembly field of view is represented on the display. For example, the component movement within the assembly field of view can be presented in color on the display, or displayed differentially across the component part and/or structure for precision alignment, or overlaid with augmented reality (AR) directly to the operator. According to some embodiments, the component is represented along with other indicia that also appear on the display. The other indicia may include alignment indicia that represents a desired position of alignment for the component. The user may view the component representation on the display and also views the alignment indicia on the display. The alignment indicia may comprise a target which may provide an indication of the desired alignment position/orientation of the component being installed. The alignment indicia also may include a path depicted on the display that represents the pathway of the component over which is used to move the component into a proper alignment on the structure (e.g., under a structure or part, within a structural wall from above or below the structure or the like). The system continues to implement the imaging mechanism and track the component and structure, as the component is maneuvered into alignment on the structure. The alignment indicia on the display preferably is generated in relation to the real-time location of the component. The RVAT system may also provide assembly instructions and comments. For example, where an alignment path is depicted on the display, and the component has begun movement, the alignment path also is generated to provide an alignment path that represents the alignment path to desired alignment position of the component relative to the then current location of the component. The RVAT system processes and tracks the three-dimensional location information for the component, as the component moves within the field of assembly. The component location information may be stored, and the maneuvering of the component from its entry into the field of assembly, or at its locations therein, may be tracked and recorded. This permits the system to handle requests, including future requests, to provide the component positions and orientations during the assembly operation. The system may track the component movement and handling, and identify relative component data.

The RVAT system also is configured to implement real-time assembly component and structural monitoring, as assembly operations are being carried out. Component data may be processed to determine whether a component being installed at the time of installation meets an alert condition. For example, detection of excessive strain, beyond a predetermined level, may trigger a process interruption or require an override to continue. Although components may be checked prior to installation, the system is configured to identify components that have changed or fallen into a condition rendering the component unfit or unsuitable for the designated installation operation. For example, in an assembly operation where the component was flexed, or subjected to strain as it was handled (e.g., during shipment or during the installation), this may be evaluated in real-time, or even during a post assembly analysis, to determine properties or characteristics that may be related to that component. For example, as an analysis tool, the system may generate comparisons of like components, and determine whether assembly conditions, based on component assembly tracking and monitoring with the coordinates and real-time coordinate tracking. According to another embodiment, the system is configured to implement long-term monitoring of components and assemblies for operational damage using RVAT's knowledge of the lifetime structural information, and to detect new variations. By tracking damage as it occurs, safety factors can be improved, removing substantial weight and cost. According to some embodiments, the RVAT may implement monitoring in conjunction with tools to verify change in shape, strain or damage detection, and in preferred embodiments, may employ NDT such as thermal camera or other, to capture and make available data (e.g., thermography data) to the RVAT for the RVAT to utilize during the RVAT monitoring process.

Tools include change in shape, strain, or damage detection The analysis also may include information for each component, such as, for example, date of manufacture, shipping/receiving date, storage conditions, personnel handling it, time of installation, as well as other pertinent data.

The present system, method and devices also include analysis tools that may utilize the three-dimensional coordinates to identify one or more conditions associated with the assembly, such as, for example, a component, or an installation operation. Where component installation identifies a position from which the component may be aligned and installed with a reduction in stress loading, the system preferably is configured with instructions to identify assembly operations and steps carried out that improve the assembly operation. For example, the improvements may be to maximize or minimize a parameter or feature. A direction may be configured so that the software receives an instruction to process component information, including during the assembly operation, so that optimization of assembly operations for one component or a group of components (whether related or unrelated), may be managed to provide a desired feature or outcome. For example, the RVAT may direct a component to be installed on a structure from a particular direction, or starting from a particular side of the component, so as to minimize flexure of the component. The RVAT therefore, is configured to determine an installation operation, such as to guide the component to a location, or for securing the component, that would mostly maintain the component in its original form (e.g., without bending it, etc.).

The system, method and devices collect and store the assembly information, including the true placement of the component parts and their installs, and the structure and relationship of the assembled components. The final product therefore is stored in the form of a digital-duplicate (or digital-twin) of the actual assembled product, as assembled during the assembly operation. The digital duplicate may be stored to allow sectional inspections and views thereof using computer assisted drawing (CAD) programs and techniques. In the event that analyses are undertaken after the assembly, at some subsequent time (such as after the product assembly has been completed, and/or even after the product has been put into use), the analyses may be done on the as assembled form of the product, as per the digital duplicate.

RVAT System and Configuration

The system and method preferably are configured to generate accurate tracking of components during an assembly operation. According to preferred embodiments, the RVAT system identifies three frustum locations from which calibrations relating to the imaging devices and beam projection are undertaken to transform the image data to produce accurate location identification and tracking of the components. The image data may be obtained using the imaging devices, and imaging software may be used to provide the imaging information. The RVAT provides a field of assembly imaging system that tracks assembly components in real-time as within the assembly field of view. The RVAT preferably defines the assembly field of view, delineating the frustum parameters and locations for the imaging. The calibrations preferably are implemented using a computer with software containing instructions to generate in a memory device a matrix that calibrates the planes of the image sensor or film plane, and the projection plane, and transform the world coordinates to camera coordinates. The computer is programmed with software containing instructions to transform the world coordinates to camera coordinates. Through assembly of a master reference coordinate (MRC) and master reference coordinate system, (MRCS), the RVAT system converts the CAD drawing to an RVAT assembly file, which preferably comprises a component mesh file for use in carrying out real-time virtual assembly production. This may be done by polygonising the scan, which, for example, may comprise executing computer program instructions to: transform the CAD file of the component designated as the master reference coordinate (component) for the assembly to a component mesh file for the real-time virtual assembly production (which component becomes the reference component); polygonise the scan of the reference component; produce an actual mesh of the reference component; duplicate the actual mesh of the reference component; and tack the duplicate actual mesh to the point component of the nominal mesh to produce a component mesh for the component assembly.

According to an exemplary embodiment, the RVAT system utilizes a CAD drawing or file and generates a file structure that includes imaged information for a particular structure and/or component. Embodiments may scan a single component or a number of components, or, in some instances, may scan all of the components. Where a component is a redundant component (such as one appearing a plurality of times, and where tolerances may be met), a scan of one of the redundant components may be suitable for use to represent each of the redundant components. The scan of the components preferably includes with the scan a plurality of tracking indicia, such as for example, target dots, placed on the component. The reference tracking dots placed on the component, for example, preferably are known in relation to the component and each other. Assembly operations are carried out by tracking the components and structures in the assembly field of view of an imaging area where the assembly is carried out. According to some preferred embodiments, the RVAT system utilizes photogrammetry target dots to track components in 3D space, with 6-Degrees of Freedom (6-DOF) for manufacturing assembly operations. Currently all aircraft and much vehicle assembly, in general, is done by hand. The present invention is designed to allow assembly of systems without the need for hard tooling, and their huge costs in time and material to design and produce hard tooling. Preferred embodiments of the system, method and devices track a component into position directly from CAD procedures and as transformed applying the RVAT method, to guide a person or a robot to build the assembly, again without hard tooling (or by minimizing the hard tooling required). In operations where fixtures or other hard tooling items have already been created, such as a fuselage frame, the tooling may be used, and the system may accommodate the presence and utilization of these assembly assisting structures.

The method preferably is carried out in real-time, and provides instructions for implementing real-time point tracking. The instructions preferably are implemented via software that is provided on a computing component, preferably on a storage media of a computer. Preferred embodiments of the system provide software containing instructions programmed in conjunction with or built onto a database structure. The real-time point tracking utilizes 3D photogrammetry sub-systems, and in some preferred embodiments, real-time point tracking may be carried out at about 20 Hz, or even higher. The system, method and devices, implement the tracking of objects using the RVAT 3D stereo photogrammetry sub-system. According to a preferred embodiment, the RVAT 3D stereo photogrammetry sub-system is calibrated for sub-pixel accuracy, and, in addition, a 2D projector is then calibrated to the 3D space tracked by the photogrammetry sub-system. A Reference Component (RC), which is the first Reference Component ($RC_1$) is defined in RVAT, and the RVAT stores the Reference Component ($RC_1$) as part of the assembly operation record. The RVAT establishes a master reference coordinate system (MRCS). According to a preferred implementation, the RVAT assigns the coordinate system of the CAD drawing of this Reference Component (RC), which is the first Reference Coordinate ($RC_1$), to become the master reference coordinate system (MRCS) for the next steps of operation. The points of the Reference Component (RC) are tracked and are the real-time coordinate transform for all the real-time point/component measurements.

The system, method and devices may be used in the production of a structure, such as an aircraft. For example, the build of an aircraft may take place, and, according to one implementation, the Reference Component (RC) may be designated to be the fuselage body, and the components being assembled from a full component like a bulkhead, a generic component like a clip-bond wireway holder, or box mount, or a drilling/riveting operation to a specific location, angle and depth. According to some other embodiments, the RVAT tracks and guides/controls the robotic manufacturing (e.g., such as a tapelaying head or other 3D manufacturing method) in 6-DOF, and documents the as-built structure, including quality and NDT. Each component that is to be assembled (or subjected to an assembly operation) is tracked. Preferably, each component is represented by a drawing file. In a preferred implementation, each component that will be tracked into position (or which is part of the RVAT assembly operation) will have a specific CAD drawing with manufacturing coordinates, allowing it to be tracked in real-time by the points on the component. The operator and/or robot will be guided to assemble the component into the correct location in 6-DOF, which is an X,Y,Z position and includes rotations. For example, the component may have a symmetrical configuration, but also may have a surface that is different from another surface, so in addition to the positioning of the component, the orientation (e.g., including rotation), is required to properly align and assemble the component. The RVAT provides the tracking of the component and structure, and preferably, is configured to direct the assembly operations, which according to preferred embodiments, includes directing the assembling from the CAD drawing or drawings of components and/or the product to be assembled. The RVAT assigns the reference component (RC), and preferably the assembly operations are guided with reference to the RC, and applying the master reference coordinate system (MRCS). The RVAT guides the component assembly step. The RVAT may generate indicia on the display, such as a monitor or VR display, and preferably tracks the structure and components in real-time, utilizing the master reference coordinate system (MRCS). In addition, according to preferred embodiments, the RVAT preferably transforms the coordinates to provide calibrated coordinates for components and structures within the assembly field of view. The transformation of the CAD to real-time component assembly configurations that are addressable to components and structures within the assembly area, provide the real-time virtual assembly tooling and guidance of assembly operations.

The component is aligned, and assembled. Real-time tracking of the component preferably takes place during the assembly operation of the component, and the RVAT system tracks the component and directs the alignment of the component throughout the assembly operation.

Once the component has been installed, and the assembly operation is completed (for that step), the RVAT system designates the status as completed. When designated or marked complete (e.g., through an operator making a designation, or the system carrying out and confirming that the required assembly steps for the component have taken place), the system will document the precise location of the component in 6-DOF in the Reference Coordinate system, the as-built dimensions. This documentation database of the actual as-built vehicle dimensions, and other captured quantities, is the digital-twin of the vehicle being assembled. With the completion of the vehicle assembly, the digital-twin preferably has information about the manufacture of that vehicle, including precise materials used, material and component testing, assembly data (forces, temperature, personnel, manufacturing notes, quality information, management action flags and the like).

According to preferred implementations, the RVAT is designed to accept user inputs and comments, so that in addition to the tracking of components, the comments may be designated, and may be coordinated with an assembly step, and even a point in time of a component position or status during an assembly operation. The RVAT system provides for a user to make a comment, and key the comment to an assembly operation step or component, generally, or alternatively, to associate the comment with a particular component position or time during the assembly procedure. In this manner, the comments are available for review, as well as with the as-built information providing the record of what took place during the assembly step. According to preferred embodiments, the RVAT system may be used to display the assembly operation events and provide a graphic and other data of the assembly operation that took place previously, including, for example, at the commented associated time or position. The RVAT system preferably may provide comment categories, so that workers/operators may designate comments by a particular type. For example, the worker/operator also has the ability to comment on each operation, and flag the operation as complete, or needing attention or quality signoff, etc. Each comment/flag can generate notifications to system or management, such as email or text. According to an alternate embodiment, the RVAT system may be configured so that when certain categories of comments are provided or designated, an action is generated. The action, for example, may involve issuing an alert to designated personnel, such as, engineering, or may even include suspending further assembly operations (until the comment or issue is addressed). For example, Table 1 of FIG. 1 illustrates a table of assembly operation and evaluation steps in accordance with a real-time generated production and analysis matrix.

The method may be carried out with a system and devices that include software for tracking the position of components and reference structures. According to a preferred embodiment, the instructions for capturing and manipulating information are provided in the RVAT software. The RVAT software may be configured to include imaging software for managing the imaging devices, and the RVAT system may employ one or more imaging devices and or sensors for imaging the assembly area. According to some alternate embodiments, the RVAT system may be configured to obtain, or be provided with, imaging data from separately provided imaging devices and/or image capturing software operated in connection with the imaging devices. According to some embodiments, the separately provided imaging devices and components may comprise commercially available imaging apparatus and/or software.

In order to implement the RVAT method, the RVAT system is configured by setting up parameters for the assembly operation. According to preferred implementations, the RVAT system is configured to implement calibration, as well as to automatically detect decalibration. An automatic calibration procedure may be generated and carried out by the RVAT. According to some other embodiments, an operator may assist in one or more calibration steps.

For example, according to some embodiments, a calibration implementation comprises the marking of dots that the RVAT is tracking. This may generate indicia on a display (AR, display screen, etc.) to show the operator instantly whether or not the system is calibrated (or in calibration). For example, where a display plate containing indicia (e.g., dots) is illuminated with a projection of indicia (such as projected dots overlaying the display plate dots), the alignment may be visibly detected, and, in addition, the imaging components capture of the out of alignment indicia (dots) of one or the other of the projection and/or display plate may be processed by the RVAT and the RVAT may generate an alert (out of alignment), either visual, audible, or other, and, according to some embodiments, the RVAT may recalibrate to align the out of calibration component. The RVAT in implementing recalibration, may process the locations of one or more or a plurality of components, the structure, reference tooling or other items, and determine a cause of the decalibration (e.g., imaging component, projector, structure frame/holder). The RVAT may then determine whether a recalibration is possible, or whether some other action is required. Where a recalibration is possible to place the elements in calibration, then the RVAT may generate the calibration required, or in the event operator input is required, the RVAT may generate and display instructions for the operator. The method preferably includes the setup of the hardware, where preferably calibration steps are carried out to calibrate the hardware. For example, an operator or user calibrates the hardware systems, which include the imaging cameras and/or sensors, as well as projection apparatus that are involved in imaging and projecting indicia at the assembly area. Preferably, the calibrations involve calibration of imaging hardware itself, which may involve calibration steps, including as provided by the imaging component supplier, where commercial imaging component is provided. The device calibration steps, for example, may involve focusing and setting lens parameters, projector focus and beam location. The calibration also includes RVAT calibration steps, which are carried out to calibrate the RVAT system operations to function in conjunction with the assembly area and the assembly field of view, and the CAD design files and information that are used to carry out an assembly operation for components and structures represented by the CAD.

Assembly operations are provided by developing a set of instructions for assembly of the components. The RVAT method also involves programming the assembly operations to be part of the RVAT assembly operation instructions and guidance, which, for example, may be carried out by an engineer or other personnel. As discussed above, a CAD file is associated with the RVAT system imaging configuration. Preferably, a Reference Component (RC) is selected and defined, and each assembly step to be carried out for the production of the vehicle is identified. Each assembly step preferably includes tolerances and guidance for each step of the specific work order. These assembly operation steps are provided with references to the structure and specific component or components that are involved in each step. Preferably, the reference to the structure and components includes the CAD information and/or scan. According to some embodiments, the CAD information is transformed, which may include setting a reference component (RC) value for the component or structure. As discussed herein, the component preferably may be imaged, in one or more previous steps, to provide an actual mesh and a nominal mesh, which provides values (including in a coordinate system) for the components of the assembly operation. The assembly operation steps, as well as the component library are generated and designated. The assembly operation therefore will have the specific step to be carried out, and which component or components and structures will be required. The components, as discussed herein, preferably are imaged and recorded to provide a library of the components that includes the coordinate representation of the component. The library preferably presents the component in an RVAT transformed coordinate configuration.

Once the assembly operations are designated, and the Reference Component (RC) has been defined, the operational steps of assembly, which preferably take place according to the work order, are carried out. According to an exemplary embodiment, the operational Reference Component (RC) is defined, and each step of the specific work order or work orders are followed to assemble the structure, such as a vehicle. During the assembly operation, as the work order steps are being carried out, feedback provided by personnel or autonomous feedback and alerting also takes place. The personnel may comment or flag issues in conjunction with an assembly step or component (see e.g., Table 1 of FIG. 1). In other instances, predesignated condition alerts may be generated in response to an assembly procedure, component, or other indication that the system had been designated to track. The method also involves reviewing of the assembly operation, as well as the components, and assembled structure, during and after the assembly operation. For example, quality control, management and programming engineers may review comments, flags and the as-built documented vehicle assembly. The assembly method preferably is carried out with computing and imaging components, including those described herein, and software configured with instructions for identifying and tracking the components and the as-built structure during the assembly operation. Referring to Table 1 of FIG. 1, the RVAT system is configured to define a reference, which in the exemplary depiction of an assembly configuration, provides Click Bond® fasteners, drill markings, component positioning, and rivets, as examples of references that are involved in the assembly operation. Locations for each of the references are defined, as illustrated in Table 1. For example, in the exemplary depiction, the Click Bond® locations are defined in terms of an x-y, and optionally z, coordinates, whereas a drill marking position location I defined by an x-y coordinate. Component positioning preferably is defined by 6 degrees of freedom. In this example, the present element is defined, such as the fasteners (e.g., the Click Bond® fasteners), which are an element, the drill marking, which is a position, and as illustrated, is a marking, which preferably may be a projection appearing on the object within the assembly area, a display on a virtual reality headset or monitor, or all or combinations of these. Component positioning may be defined by a graphic which may be projected onto the assembly area, identified on the display (VR headset or monitor), and may be generated by the RVAT to provide the location based on the imaging within the assembly area. The component positioning may involve a component shadow, as indicated by component shadow z-shape, and may be projected in the assembly area, display plate, or displayed on the VR headset, monitor, or all or combinations of these. The user such as an engineer involved in the assembly process may define an order guidance that can be followed by the instructions provided by the RVAT during an assembly operation. Table 1 also depicts the operation, which in this exemplary depiction includes choosing a job, following steps and guidance, documenting the step (as completed, when done), capturing the as built structure. The RVAT also provides the ability to comment on steps or mark warnings that may be used to generate alerts. The RVAT also includes a review feature, where evaluation of the quality, ratings, warnings, and other comments both those generated by the operations steps, and those provided by an operator using the system to carryout assembly operations. For example, steps and guidance may involve markings and highlighting of points. This may be carried out on the actual component in the assembly area, through an RVAT projection, on a VR headset, monitor or all or combinations thereof. In this example, the RVAT generates the component positioning through a projection, which may involve a full color overlay onto a screen, such as a VR headset, monitor or both. The RVAT tracks the position of the component within the assembly area and field of view being imaged.

According to a preferred embodiment, the RVAT system includes RVAT software which is configured to facilitate carrying out the RVAT assembly method. The RVAT software is provided for use in conjunction with carrying out the RVAT method steps to transform CAD developed structures and components using imaging devices and applying calibration operations to implement assembly operations that build from the CAD without the need for hard tooling. The RVAT may be configured to display representations of hard tooling objectives, to provide guidance for positioning components during assembly. The RVAT may display or provide guidance in the form of images written information and instructions, and target indicia as well as combinations of these. The RVAT method, according to an exemplary embodiment, may include four parts, which may comprise the hardware setup and calibration of the imaging devices and RVAT system, the designation of the RVAT assembly operations, operation of steps pursuant to each work order, and reviewing the information relating to the as-built assembly produced. According to preferred embodiments, the RVAT system includes a Program Mode which typically is performed by an engineer organizing the CAD, scans assembly notes (see e.g., FIG. 11), and includes an Assembly Mode which is performed by the operator on the real parts (see e.g., FIG. 12). Exemplary depictions of the RVAT system are illustrated in the screen displays of FIGS. 9-13). The RVAT software preferably is configured with instructions for receiving inputs from the imaging and projection devices and calibrating the system. The RVAT software also includes the capability to receive instructions for carrying out the assembly operations, and where a user may designate components, as well as supports and structures to be included as part of an assembly step. The software may receive inputs from engineers or personnel designated to direct the assembly operations, which include defining a Reference Component (RC), defining each assembly step and an order of steps, as well as providing tolerances and guidance for each step. The software may be configured with instructions for generating one or more display graphics on a screen, and may provide menus, drop-downs, or input boxes into which information may be entered. Instructions also may be provided so the software is configured to receive inputs, to store the inputs and to generate information and guidance for assembly operations.

The RVAT software also is configured with instructions to carry out the operational mode, which includes providing information and generating information to define an operational Reference Component and to follow the assembly operation steps in the work orders. The RVAT software preferably is configured to generate indicia on a display for receiving comments relating to assembly issues as well as to identify and flag issues. The RVAT system and software process information gathered from activity taking place within the assembly area, which is captured by the imaging devices, such as cameras and/or sensors. The presence of structures and components is detected and their positions and movements are tracked. The tracking takes place in real-time. The RVAT system also includes one or more displays, which in some embodiments may include a monitor, in other embodiments may include a VR display, and in others, both. The imaged activity and items tracked within the assembly area are recognized by the RVAT system. The tools used for assembly also may be known to the RVAT system, which may be done by imaging the tool, or providing a CAD file of the tool (which preferably is calibrated in RVAT similar to calibration of the components and other structures of the build that are expected to be used within the assembly area). The RVAT system includes assembly guidance information and indicia. The RVAT system preferably includes one or more projection devices that are configured to project indicia to the assembly area, and directly onto a structure or component to further guide and facilitate operations.

The system may include software that is configured with instructions that utilize links to information, such as engineering data, which may include links to CAD drawings and actual scans of components and related assembly data. For example, according to an exemplary implementation, the RVAT system undertakes an ATOS scan of a component (which is the real measurement of the component's shape which might vary from the design (CAD)). The scan also has the real target point locations, for the imaging software (e.g., ARAMIS) to track. The RVAT programming relates the CAD and specific part scan, instructions and engineering data, and like hole locations. The RVAT system, in operation, combines the design and current data together to provide the current part assembly information and guidance. In this manner, and in other manners as described herein, the RVAT system may manipulate or transform the linked information, for use in conjunction with an assembly operation. The RVAT software is configured to receive inputs as the assembly is being constructed, and to store the inputs. The method and system provide an as-built digital-twin from the captured information and inputs. The as-built digital-twin may be used as a reference for identification of components and their relationship, as well as troubleshooting. The as-built digital-twin may support a CAD file which may generate the as-built design, and from which further structures may be produced. For example, where a CAD file has been transformed for use with the RVAT system, the RVAT system may utilize the data from the digital twin to produce a CAD file that may be used to construct, repair and or analyze products.

In addition, embodiments of the invention may implement the method with the production of RVAT databases. A program, such as SEQUEL server, may be used to program the operations, and may be linked for communications with other information sources, such as, for example, a CAD repository or library that contains the assembly data and CAD drawings of components.

The assembly system involves defining a Reference Component (RC) and implementing a transform mechanism. The system utilizes the Reference Component (RC) to provide the real-time coordinate tracking of the components and measurements. The tracking of points of the Reference Component ($RC_1$) is carried out by implementing a transform mechanism. According to a preferred embodiment, the transform mechanism is configured to implement calibration of the data gathering components (images, devices, projectors and sensors) and to implement parameters for real-time projection to provide real-time tracking of the components and their locations.

According to some embodiments, the method, system, and devices are used to generate point markers. The point markers preferably are generated for display on a display screen (e.g., monitor, VR display and the like). The user may view the display and identify point markers associated with a component or a position for component assembly. Any suitable calibration for the imaging system and projector may be employed. Calibration parameters are utilized in the real-time presentation of point markers. Calibrations may involve a plurality of calibration data sets which are used to determine and generate the real-time position of a component. For example, the calibration may be made to align an item based on the alignment of dots points, such as projecting points back out onto points, and obtaining real-time feedback on the quality of the system calibration. This may be carried out automatically, or by a system operator.

The following represents one example of calibration, and discusses one potential calibration routine. According to preferred embodiments, a calibration step is carried out. The system is configured to read calibration data, and apply the calibration data through a transformation. According to one implementation, the input comprises 3d coordinates of a 2d pattern. The 2d pattern may be obtained using a traditional mechanism that generates the pattern for projection through a projection apparatus. One example is a 2d pattern provided by GOM (GOM GmbH, Braunschweig, Germany). In a first run or step, the method includes implementing a routine that reads calibration data. During the measurement process, the routine is then provided real-time datasets. In a preferred implementation, output is in real-time transferred to a LCD projector via a HDMI interface (such as, for example, a graphic card display). According to a preferred exemplary embodiment, the program is written in python programming language. According to preferred implementations, the projector position of the projection apparatus is fixed relative to any imaging components that will obtain information from the assembly view area, such as, for example, sensors, thermal imaging devices (e.g., a Flir® camera) and optical cameras. For depiction of an exemplary embodiment, the assembly view area comprises an optical frustum of approximately 1 ... 2m×1 ... 2m×1 ... 2m, and a distance of 3.3m to the center of the optical frustum (although these measurements may be different depending on the size of the components being assembled, and the extent of the desired assembly area). The calibration input data is accurate (in camera coordinates) to sub-µm level. According to an exemplary implementation, the projector output (e.g., from an LCD projector), for example, preferably may cover a 6 mm calibration dot with a 10 mm light spot, and a plurality of the calibration dots are generated. In addition, the system may also be configured with instructions for incorporating parameters to take into account, adjust or correct for lens distortion and skewing. The spatial movements, including orientation of components within the assembly viewing area are imaged via the RVAT calibration to provide real-time guidance and tracking. The projector output may comprise black and white, or gray scale indicia, such as dots, but also may provide for color indicia, such as color dots. According to a preferred implementation, calibration data is organized in triplets of x,y,z coordinates. Files preferably are stored in a format compatible with the software, such as, for example, a .csv format (comma separated format).

According to one example, the coordinate system is represented in expression (1) below in the following coordinate sets:

$$\begin{matrix} \text{World} & \text{Camera} \\ \text{Coords} & \text{Coords} \end{matrix} \begin{matrix} \text{Proj. Plane} & \text{Pixel} \\ \text{Coords} & \text{Coords} \end{matrix} \quad (1)$$

$$\begin{pmatrix} U \\ V \\ W \end{pmatrix} \begin{pmatrix} X \\ Y \\ Z \end{pmatrix} \begin{pmatrix} x \\ y \end{pmatrix} \begin{pmatrix} u \\ v \end{pmatrix}$$

The method preferably provides a calibrated coordinate reference, which for completeness, and for error estimation, coordinates of a calibrated optical system are denoted by U', V', W',X', Y',Z' and so on. Preferred embodiments also account for distortion of the projector lens providing the LCD output, and therefore, a distortion function preferably is introduced between "projection plane" coordinates and "pixel coordinates". The radial lens distortion function is set out below in expression (2):

$$L_{\kappa_{2,4}}(r) = 1 + \kappa_2 r^2 + \kappa_4 r^4 \quad (2)$$

where $$r=\sqrt{x^2+y^2} \quad (3)$$

The camera projection matrix is set forth in expression (4) below:

$$\begin{pmatrix} x \\ y \end{pmatrix} \rightarrow \begin{bmatrix} S_x x/f + C_x \\ S_y y/f + C_y \end{bmatrix} \quad (4)$$

where $s_x$ denotes a horizontal scaling factor, $s_y$ denotes a horizontal scaling factor, f the focus, $c_x$ and $c_y$ denotes a shift on the pixel sensor coordinates, which according to the embodiment being illustrated is the different origin for the display coordinates (otherwise (0,0) would be in the middle of the "picture"). The arrangement is represented in matrix notation, shown using an "additional" scaling column.

$$\begin{pmatrix} x \\ y \\ 1 \end{pmatrix} \rightarrow \begin{bmatrix} s'_x & & c_x \\ & s'_y & c_y \\ & & 1 \end{bmatrix} \begin{bmatrix} 1 & & 0 \\ & 1 & 0 \\ & & 1 & 0 \end{bmatrix} \begin{bmatrix} R & T \\ 0^T & 1 \end{bmatrix} \begin{pmatrix} X \\ Y \\ Z \\ 1 \end{pmatrix} \quad (5)$$

In the matrix represented above in expression (5), R represents the "rotational" submatrix and is redefined the $s_i$ to incorporate f. If R is confined to unitary matrices, then there is Euclidean "similarity" transformation (preserving angles). Just for completeness: with less constraints the number of parameters increase. With additional parameters we have "affine" transformation (preserving parallels). Taking all parameters gives us "perspective" transformation (preserving only lines property, i.e. a straight line in space is projected to a straight line in the image or picture). The T vector denotes the translational part. In literature, the sensor projection is denoted by K and is grouped together with the combined matrix [R, T] to P, the camera projection matrix.

But in our case we have a nonlinear function L (the radial lens distortion function) between the projection plane to pixel plane step. Therefore, a different determination of the calibration parameters is determined, e.g. using a simplex algorithm. But in preferred embodiments, the system is provided to extract more information from the fact that the calibration is made on a planar object.

The method implements a calibration. If the object (and trivially the picture on the sensor) are planes, according to preferred embodiments, the system undertakes to implement calibrations by making use of a "planar homography" property. In the expressions immediately below $L_K$ is not included (but appears subsequently).

World Coords → Camera Coords → Proj. Plane Coords → Pixel Coords (6)

$$\begin{pmatrix} U \\ V \\ W \end{pmatrix} \xrightarrow[\text{beamer}]{\text{Matrix camera to}} \begin{pmatrix} X \\ Y \\ Z \end{pmatrix} \xrightarrow[\text{(projection)}]{\text{Matrix}} \begin{pmatrix} x \\ y \end{pmatrix} \xrightarrow[\text{(affine transf.)}]{\text{Matrix}} \begin{pmatrix} u \\ v \end{pmatrix}$$

If the object points lie on a plane, the [R, T] transformation is applied to rotate the plane in world coordinates to camera coordinates. As all points of the plane may be addressed by two parameters, say p and q, the matrix multiplication may be restated as follows. (It is noted that the subscripts on the scaling factors are omitted.) First, the projection plane, i.e. "film plane" to pixel coordinates. A larger set of $a_{ij}$ is included to prepare for affine transformation, as represented by expressions (7) and (8).

$$\begin{pmatrix} u \\ v \\ w \end{pmatrix} = \begin{bmatrix} a_{11} & a_{12} & a_{13} \\ a_{21} & a_{22} & a_{23} \\ 0 & 0 & 1 \end{bmatrix} \begin{bmatrix} f & & 0 \\ & f & 0 \\ & & 1 & 0 \end{bmatrix} \begin{pmatrix} X \\ Y \\ Z \\ 1 \end{pmatrix} \quad (7)$$

$$u=M_{int}P_c=M_{aff}M_{proj}P_c \quad (8)$$

The projection plane is transformed to provide world coordinates. For the projection plane to world coordinates, the expressions (9) to (12) may be applied. The ≈ signifies that there is a division by Z to do.

$$\begin{pmatrix} x \\ y \\ 1 \end{pmatrix} \approx \begin{bmatrix} f & & 0 \\ & f & 0 \\ & & 1 & 0 \end{bmatrix} \begin{bmatrix} r_{11} & r_{12} & r_{13} & t_x \\ r_{21} & r_{22} & r_{23} & t_y \\ r_{31} & r_{32} & r_{33} & t_z \\ 0 & 0 & 0 & 1 \end{bmatrix} \begin{pmatrix} p \\ q \\ 0 \\ 1 \end{pmatrix} \quad (9)$$

Using the rows and columns containing zeros, the expression (9) reduces to:

$$\begin{pmatrix} x \\ y \\ 1 \end{pmatrix} \approx \begin{bmatrix} f & & \\ & f & \\ & & 1 \end{bmatrix} \begin{bmatrix} r_{11} & r_{12} & t_x \\ r_{21} & r_{22} & t_y \\ r_{31} & r_{32} & t_z \end{bmatrix} \begin{pmatrix} p \\ q \\ 1 \end{pmatrix} \quad (10)$$

$$\begin{pmatrix} x \\ y \\ 1 \end{pmatrix} \approx \begin{bmatrix} fr_{11} & fr_{12} & ft_x \\ fr_{21} & fr_{22} & ft_y \\ r_{31} & r_{32} & t_z \end{bmatrix} \begin{pmatrix} p \\ q \\ 1 \end{pmatrix} \quad (11)$$

$$\begin{pmatrix} x \\ y \\ 1 \end{pmatrix} \approx \begin{bmatrix} h_{11} & h_{12} & h_{13} \\ h_{21} & h_{22} & h_{23} \\ h_{31} & h_{32} & h_{33} \end{bmatrix} \begin{pmatrix} p \\ q \\ 1 \end{pmatrix} \quad (12)$$

The structure of the result would not be different if, for example, different factors are introduced, e.g. different factors for fx, fy. The expression provides for a scaling freedom in choosing p and q, and this degree of freedom may be used to choose one of the h coefficients to be 1. This 2d-2d projection is bijective. The parameters are generated and obtained in conjunction with the determinations set forth in the expressions. For example, according to an exemplary embodiment, 4 non-collinear points suffice for reconstruction, giving 8 values for 8 parameters. According to an exemplary embodiment, the "full" model is discussed. To extract the parameters and their estimates the following expression (13) sets forth the minimization problem:

$$\underset{f,c,\kappa,R,T}{\text{argumentmin}} \sum_{ij} \left\| \begin{bmatrix} s'_x & & c_x \\ & s'_y & c_y \\ & & 1 \end{bmatrix} L_\kappa(r) \times [RT_s]X_j - X_{ij} \right\|^2 \quad (13)$$

Although being complex, the analytic derivatives can be calculated (but perhaps error prone to implement). However, according to a preferred implementation, the gradient is programmed to allow for more options in numeric algorithms. Minimization may be performed by manipulation according to a minimization application. Examples of minimization applications that may be performed, include, for example: least-squares (which will yield bad results, if we have outlying values), simplex (comparatively slow, may not find global minimum), and ransac (faster, uses subset, refines subset and bypasses overweighting problem of least squares). For a calibration matrix that is well-conditioned, least-squares may be applied.

The RVAT system is configured to operate where the RVAT system implements tracking so that imaging software (such as ARAMIS) tracks in both real world coordinates (CAD coordinates) and camera coordinates, providing the operator with the world coordinates, with the RVAT projecting accurately in camera coordinates.

The system may be configured to obtain further calibration data and apply it in conducting the image tracking and RVAT assembly operations. For example, preferred embodiments may be configured using at least three sets of calibration data. According to an exemplary embodiment, the calibrations and calibration data correspond with one set at the front of the frustum, one or more sets at the center, and one set at the back of the optical frustum. The one or more datasets in the center are obtained by rotation of the pattern on the same projection plane. The center datasets may be generated. As we can derive from the p, q plane model, these rotated images are identical in the eight-point model, because the (U,V,W)→(X,Y,Z) "world coordinates" to "camera coordinates" transformation takes care of that. According to a preferred implementation, all rotation angles yield the same pattern with a different Euclidean transformation hidden in the first step. In the full model, they may attribute to numerical stability and may prove to be of value to determine the $K_2$ and $K_4$ parameters if translation away from the projector Z-Axis is included. The i values should be small anyway. As the angle between the projector and the cameras is fixed, these three sets preferably are generated to yield the same values for the total transformation H, consisting of inverse transformation $H^{-1}$ from camera to world coordinates, and H from world coordinates to projector coordinates. As the combined transformation is invariant, the argument remains valid, if the .csv is already in world coordinates.

When the process is carried out, the optical system, including the imaging component or component (e.g., cameras, lenses and sensors) as well as the projection device providing the LCD beam, must remain unchanged and in the same positions. This means no zoom, auto-focus or digital trapezoid rectification on the projector.

According to some alternate embodiments, where auto-focus is necessary or is otherwise implemented, it is from the technical standpoint most appropriate then to augment the calibration by applying the best fit values to calculate f from the camera projection as a function of distance Z.

The calibration mechanisms of the system are generated and obtained. After a set of parameters from the calibration steps are obtained, these parameters are used in the real-time presentation of point markers. The projection "pipeline" preferably is the same as for calibration, and may therefore be generated based on the matrix representations provided above. According to a preferred embodiment, the projection may take into account the projection beam refresh rate. For example, according to an exemplary embodiment, the LCD projector refresh rate may be 30 Hz. The number of arithmetic operations for each point given is reasonably small. So in dependency of the speed of an implementation, such as, for example, a python implementation, a number of points on the canvas object in the projector output may be generated and provided by the system.

According to an exemplary embodiment, a windows32 c++ program is prepared for operating on a P9 computer. In this example, working the whole projection pipeline in float, a pixel rate of ca. 2000 points in 0.03 sec. is obtained. Embodiments may provide enhancements, such as marking a location. For example, to enhance addressing a pixel on the projector, an interpolation scheme is provided that uses the intensity on the four neighboring pixels. In the case where the calculated pixel position lies some position a from the left and b from the top of pixel position i,j, then according to a preferred implementation, 4 pixels may be lighted up weighted by the following expression (14):

$$(1-b)((1-a)I(i,j)+a(I(i+1,j))+b((1-a)I(i,j+1)+aI(i+1,j+1)) \tag{14}$$

The system and method provide calibration for the imaging devices and projection to identify objects within the field of view of the assembly operation field, where assembly of components is to take place. The calibration mechanisms preferably are employed to generate real-time tracking of components within the assembly field of view. As discussed herein, the calibration preferably includes calibration of the cameras and/or sensors, as well as calibration of the projector. The system obtains information from the cameras and sensors, and preferably performs an RVAT calibration to calibrate the assembly field of view to track objects within the assembly field of view area and to represent the real-time location (including the position and orientation) of designated objects that are present within the field area. The system obtains the image information from the cameras and/or sensors, and preferably manipulates the information in accordance with calibration applications to generate coordinates for the designated object. The objects, such as a structure being constructed, as well as components being assembled, are tracked in real-time within the assembly field of view. This may be done by tracking a projection of points onto an object with the image sensor and comparing the point projection pattern with the imaged object reflected projection. According to preferred embodiments, real-time tracking of an object within the assembly field of view is determined and carried out based on the calibrated location represented, which preferably includes calibrations that are determined based on three or more calibration data sets, including, for example, at the front of the optical frustum, back of the optical frustum, and at least one (or more) at the center of the optical frustum.

Other implementations for calibration of the imaging components (such as the cameras and projector may be carried out using suitable calibration methods for calibrating the cameras and projectors to align with regard to each other (other cameras and projectors) as well as the assembly area (work area) within the field of view (FOV).

The RVAT system, method and devices may be implemented to conduct assembly operations and analyses. Some proposed examples of the method and system are depicted below.

Example 1

A proposed example of assembly operations carried out with the system, method and devices is provided. The assembly is an aircraft constructed having a fuselage, a tail section or empennage, and wings. The fuselage is constructed to comprise the portion of the aircraft that will be occupied by the flight crew, passengers, and cargo. The wings are formed from a framework of components that may include spars, which span lengthwise of the wing and are situated crosswise of the fuselage, and ribs which connect with the spars and provide support onto which the wing covering may be installed. The ribs also may offer further stability, and in some cases these ribs are identified as compression ribs. In some types of aircraft, stringers may be employed as part of the wing assembly. Another portion of the aircraft assembly includes the power source or propulsion components, which may include a jet engine. Typically, the jet engine includes a turbine and is installed on the wings or on the exterior of the fuselage. The landing gear also is installed on the fuselage, and typically is retractably housed within a compartment that includes doors that open and close to allow the landing gear to be deployed.

An aircraft is constructed by providing a frame on which the fuselage components are constructed. The frame also sometimes referred to as a cradle, may be movably maneuverable to position the fuselage in an orientation for assembly. The fuselage frame or support preferably may have structures or other indicators to mark the desired position of the fuselage components. According to some implementations fuselage cradle also may be rotatably movable to position the fuselage components held thereon during assembly in a desired position and/or orientation for assembly.

The system is employed to carry out the assembly of an aircraft. The system imaging mechanism devices are is positioned to obtain image data from the assembly area. The field of view of the image component includes the assembly area where the component assembly will take place. The image component in this example includes two cameras spaced apart from each other and directed to image the assembly field of view. The system includes a computer having a processor and containing storage media with software. The system computer preferably may include a memory in which matrices may be constructed. The software includes instructions for capturing the image data from the camera, and in particular from the image sensor that was provided as part of the camera to record the field of view through the camera lens. In this example, the imaging component also includes a second camera with a second image sensor that also is positioned to record the field of view of the assembly area.

The assembly field includes the main structure or wing structure of an aircraft. The wing structure is imaged and the position of the wing structure is identified by processing the image information from the image sensor and cameras. A projection of tracking points are illuminated in the assembly field area, and project onto the surfaces of objects within that area. The sensors image the projection points to detect the geometry of objects within the field of view (the assembly area). The projection points are imaged and the objects, such as an aircraft component, is identified based on its image properties including from its differently oriented positions. The system is provided with a computer aided design (CAD) file from which the aircraft wing will be assembled. The file is used to generate a template for the assembly of the final product, and preferably in a stepwise phase, where each component to be assembled, in this example, onto or in conjunction with the wing assembly, is displayed. In addition, the display also may include depictions of components that are to be assembled after another component to provide relative positioning guidance.

In this example, a wing is formed with spars which are placed on an area of a supporting structure, such as a frame. The system is configured with a library containing recognition data so that when a component is presented within the field of view, the recognition engine processes the component image information to make a recognition match with a library of components. Preferably, the component parts are imaged and the image data is transformed to show the component associated file in a library. The component library preferably includes one or more characteristics of the component that enable identification of the component. Preferably, the component identification may be made based on the position of the component, whether oriented in any of the 6 degrees of freedom that it may occupy within the imaging field of view (such as the assembly field of view). In this example, as a stringer is moved into the field of view it is identified. The stringer preferably has a shape that identifies it as a particular component within the group of components that make up the assembled product, which in this example, is an aircraft. The system upon processing the information and identifying the stringer, sets forth a display of the location where the stringer is to be positioned for installation. In this example, the stringer is placed onto a frame that supports the stringer. The position on the frame is displayed through a position graphic on a display which the user may view during the assembly. According to a preferred embodiment, the user views an augmented reality headset that displays the positioning of the structure and the stringer that is being installed. The frame also may be depicted. The stringer position is identified and displayed so that the display includes the real-time position of the component, which is the stringer here, to be installed. The graphic viewed by the user in this example is generated from the CAD drawing and identifies the location, showing the position and orientation where the stringer is to be placed. The display also displays the actual location of the stringer, and therefore, the user may move the stringer to align it. Preferably, the display provides the actual position and desired position in the way of graphics represented on the display. The user may move manually, or with the use of equipment, such as a lift or other guide, the stringer to position it in its proper location relative to the CAD design for the assembly.

The assembly may consist of one or more clamping or fastening steps as part of the assembly operation. The assembly operations preferably are provided in the RVAT system by configuring assembly steps and instructions. The RVAT system preferably images the assembly area to provide real-time graphics of the assembly components and structures during the assembly operations. The stringer may be fastened to a bulkhead, portion of a fuselage, or other structure. The fastening directive may be implemented through the system by providing a graphic on the display. The fastening graphic may include a graphic that designates the location of the fastening component, such as a rivet or screw, and the real time location of the device or tool that is being used to carry out the fastening operation, such as, a driver or riveting tool. According to the example, the display provides the location of the stringer and location of other components, including the structure to which the stringer is to be installed. The fastening graphic shows a fastener graphic that represents the location where the fastener is to be inserted. The fastening graphic may include a fastener representation (such as a dot cross or other graphic) that represents the location of the fastener. In addition, as part of or in conjunction therewith, the fastening graphic may include target indicators, such as a bullseye, or guide lines that aid in directing ones view as well as fastening tools to the exact location of the fastener representation. There may be a tool representation, for example. In this example, the assembler personnel uses a movable tool to fasten the stringer to a structure. The movable tool is depicted in a tool graphic, which displays a real-time representation of the tool on the display. The display in this example includes a monitor and a virtual reality headset. The movable tool is represented by a tool graphic, and preferably, the imaged tool is identified and processed to provide the exact location of the tool tip or operational end that is to install the fastener. The tool graphic end also may include a target area, such as a bullseye or guide lines that serve to provide a guide. The tool tip may be imaged so the tool tip real time location is identified. The CAD assembly drawing file is processed by the RVAT system so that when the tool tip is in the location that corresponds with the CAD file location of the fastener, a correspondence graphic may be generated and displayed. In some instances, the graphic may comprise an overlap of the desired graphic representing the fastener location and the tool tip location, to provide contrasting colors, or a different color graphic, so that a single graphic is melded to represent each of the tool graphic and fastener graphic when in the proper desired alignment condition. Alternatively, each graphic may remain to facilitate alignment, and then a separate additional graphic may be displayed to confirm the alignment. Audible sounds, text or other indications may signify alignment. In this example, the user may control the actuation of the fastening tool to fasten the stringer to the structure by releasing the fastener when the graphics are aligned to display a proper alignment condition. According to another example, the releasing of the fastener may be programmed to actuate automatically. When an alignment condition is sensed, the tool may deliver the fastener to secure the component, such as the stringer to the structure. The user may be provided with an actuation control, where the fastener actuation mode is triggered by the user, so that the user will know and have control as to when the fastening will occur, though the fastener will be delivered when the tool is in a proper alignment.

In this example, the user wears a headset and the display is provided as part of the headset. The VR headset display is configured to provide the display of the components and represented structure of the assembly and the process in real time. In this example, the user moves and takes a step forward. The VR display turns off so that the user's vision is not blocked by the display graphics. When the user has resumed a static position, where the user is not walking or moving in a direction, the VR display then may resume. The system preferably is configured to provide one or more sensors on the user, which preferably are accelerometers, GPS, or other motion type detection components that detect user position changes. The user may move certain portions, such as the user's hands or arms, or even sway to guide a component. The system is configured to identify translational motion where the user is attempting to or walking, changing position, as opposed to user movements that are involved in undertaking the assembly of the component.

In the proposed example, the stringer is fastened, and upon being secured to the structure, the system captures the image position of the assembly, including the stringer, structure as well as other components. The digital-twin of the product identifies the position of the components, which in this case is the stringer being attached to the structure. A second stringer is attached in a similar manner. Upon the assembly of the second stringer the digital record identifies the positions and orientations of the components, which now include the second stringer.

The stringer preferably is aligned, and fasteners, such as Click-Bond® fasteners may be installed to receive the skin of the wing or fuselage. In this example, the fasteners (Click-Bond® fasteners) are identified on the display as they are installed in locations designated by the RVAT system. In this example, additional framework of the wings may be installed, and may include components such as spars, which span lengthwise of the wing and are situated crosswise of the fuselage, as well as ribs connecting with the spars. The ribs also may support the wing covering.

The RVAT system continues to provide assembly steps as components of the aircraft are assembled. The RVAT provides options for a user to set assembly steps and provide instructions for an assembly step. The RVAT also provides the component assembly references so that installation takes place based on component positions and alignments with the structure. The RVAT system is configured to track the installation and identify components and their positions in coordination with the assembly steps and instructions.

Example 2

The following example is provided to illustrate the implementation and operation of the RVAT system.

The following terminology and abbreviations are used:

FOV—Field of View is the view from one camera or the overlap between the stereo pair of cameras, also referred to as the System FOV MV—Measurement Volume is the System FOV and the depth of measurement, typically 1×0.75×0.75, or 2m×1.5m×1.5m Calibration—Using a certified calibration standard, typically a Calibration Cross, a stereo pair of cameras is photogrammetry calibrated to triangulate within the MV (Measurement Volume)

Reference—The Reference Component is the base structure that all measurements are made reference to, such as the lower fuselage in aircraft coordinates, so everything is accurately positioned in the aircraft coordinates.

Component—A Component is a 2D or 3D object that can be targeted, and typically a CAD model provided or ATOS Scan.

RVAT Calibration—A calibration procedure that applies transformation to CAD data based on camera imaging and image data captured by imaging devices to implement real-time tracking of components.

The RVAT system preferably is configured with one or more cameras and sensors, as well as computing components that include software with instructions for obtaining the image information from the cameras and/or sensors, as well as for storing and manipulating the image information to carry out real-time tracking of objects within an assembly area. According to an exemplary embodiment, the system for imaging may comprise imaging components and a projector that are provided together as a unit, or may be separately provided. An example of components that may be used to carry out the method is an ARAMIS system (GOM GmbH), which, according to an exemplary embodiment, may comprise a fixed bar system with a fixed field-of-view (FOV). The imaging and sensor components are calibrated to provide suitable operation, and in the case where commercially obtained imaging components (e.g., ARAMIS) are utilized, imaging system calibration may be carried out in accordance with the provisions of the imaging and sensors system.

The RVAT method also involves carrying out a calibration processes as discussed herein, including for example, calibration steps at the frustum locations.

First, the imaging devices are set up and calibrated using focus and matching options for the images captured by the sensors. The imaging devices, such as cameras, sensors, and the projector preferably are installed in a fixed location directed at the assembly operation location. The cameras are arranged to image the assembly location, and preferably are calibrated using a calibration procedure provided by the camera manufacturer, or alternatively, another method for ensuring that each camera is imaging the proper location and has the desired settings. The computing component, such as, for example, the operating device and controller are actuated to project a beam from the projector and to capture images using the imaging system components. One or more projectors may be utilized and a projector may have a function of projecting a pattern on a surface (e.g., of an object within the assembly field of view) which is imaged by the imaging system components, as well as to project indicia for an assembly operation, such as, for example, guidance indicia, as generated and directed by the RVAT system. The RVAT system preferably generates indicia on a display device, such as a monitor, which includes an indication of whether the sensing components, such as the image sensors are operating. The software is configured to look for connected sensors (which preferably have been calibrated as part of the imaging system component calibration). If it locates both, it will provide a check such as indicia appearing on the display screen (a check), however, if there is an issue locating the sensor or a lack of proper operation an alert is generated on the display. For example, in accordance with this exemplary embodiment, two cameras are provided to capture images.

An example of the RVAT system is discussed in connection with a new project. Once both cameras are identified, a new project is created by a user. The sensors are actuated when the new project is selected, which may be done by a user responding to a prompt on the display screen to initiate the connected sensors. The RVAT system preferably provides options on the display screen to guide a user through the RVAT assembly operation procedures. The initiation step provides live views of the sensors, and preferably live views of each sensor. In this exemplary embodiment, where two cameras are used, adjustments of the cameras are carried out to match one another. In this implementation, the sensors include a first camera with first camera settings and a second camera with second camera settings. Each of the first camera and second camera has a lens. The apertures of each of the respective camera lenses are opened. Each lens is focused and the focus held, such as, for example, by securing a lock ring. The aperture of one lens is set (e.g., such as in the range of F8 to F11) and the aperture is maintained by securing it to the setting (e.g., locking a thumbscrew). An image appears on the display associated with the first camera, and the setting is changed to "false color". According to an exemplary embodiment, this may be carried out using an input device, such as a computer mouse, by making a right click on the image on the screen and selecting a setting change to "false color". The "false color" option preferably adjusts the image to represent a color depiction other than the actual color. The color pattern of the camera being adjusted (the second camera) is adjusted to the pattern of the first camera, which is already locked down (i.e., as to focus and aperture settings). Once the first and second camera image fields are in focus and matched, and the connections and hardware settings for the focus and aperture selections have been secured, the process continues with the calibration of the sensors. The sensor information is entered, and the sensors are calibrated by selecting the sensor device to calibrate. The sensors in this exemplary embodiment may be calibrated in accordance with known procedures for calibrating optical components.

Once the cameras have been set up and the sensors calibrated, the real-time virtual assembly process (RVAT) may proceed. First, with the image devices having undergone a first calibration step (discussed above), the RVAT calibration process is then carried out. The projector is operated with the cameras (e.g., lenses that have been focused and apertures adjusted, and sensors calibrated to captured the images from the respective cameras) which are actuated to receive image data from the field of view. The RVAT system preferably generates indicia on the display, such as, a monitor (which may be the same monitor used to obtain and display the camera images during the camera set up). The RVAT software preferably includes a user interface which may be graphically represented on the display monitor. The selection option for opening the RVAT program is made (e.g., on the display screen of a monitor), and an operation tab is selected using a suitable input (mouse, touch screen, stylus, keyboard, etc.) to make a selection of the desired indicia appearing on the display screen. An option to run RVAT is selected.

The selection to operate the RVAT preferably generates a calibration procedure. The RVAT calibration procedure involves selection of the calibration option, which may be done by selecting a calibration tab on the display screen. This may be generated in a pop-up window. The selection of the calibration tab generates a display of a dot pattern, which is projected from the projector onto the field of view, and onto objects within that field. Next, the set up continues by calibrating the RVAT sensor. This is done by the user selecting indicia on the display interface, which is an option to select the tab or icon indicating the process, such as "Calibrate RVAT Sensor." The RVAT sensor preferably generates a virtual sensor by using the information from the calibrated imaging devices to facilitate the RVAT sensor tracking operation. The RVAT sensor calibration, according to some embodiments, may comprise a four step process. First, the RVAT sensor calibration provides an indication to calibrate the cameras and image sensors (e.g., the ARAMIS set up, discussed above), if needed, and to also set the correct coordinate system. Second, the RVAT calibration procedure involves aligning the RVAT sensor with a calibration surface, i.e. something flat to project onto, like a wall. In order to carry out this step, the RVAT sensor preferably is positioned in a way such that the pattern is projected in the center of the measurement volume (MV). Third, the sensor head is moved to the back of the measurement volume (MV). A new project is created in the operating software. For example, in an exemplary set up using cameras in a fixed field of view system, such as the GOM system, where ARAMIS software is used, a new project may be created using the ARAMIS software. The imaging sensors are initialized, and a calibration check is undertaken to determine whether the sensor or sensors have remained calibrated. Upon a positive indication that the sensor has remained calibrated, the process may proceed. However, where a sensor is not calibrated or has not remained calibrated, then recalibration of the sensor is carried out.

A reference image is captured viewing the projected pattern, which in this embodiment is depicted as a dot pattern. A point component of the projected dots is renamed "RVAT". A measurement sequence (MS) is run.

According to some embodiments, the measurement sequence (MS) captures a plurality of images). For example, according to some embodiments, the MS captures 3 images. The MS may be carried out at a suitable rate. In some preferred embodiments the measurement sequence (MS), preferably includes recording at 5 Hz, with an image limit set, such as for example, to an image limit set. According to some alternate embodiments, the image limit may be set to a particular limit (e.g., 10, 100, 1000) and is expected to result in less than the limit number of images. The system is configured with software containing instructions to carry out the measurement sequence (MS). The measurement sequence (MS) commences, and once the measurement is recording, then the procedure continues by slowly moving the sensor head from the back to the front of the measurement volume (MV). When this has been completed, and recording is finished, then the user deactivates the recording operation (e.g., by entering an input, which may include pressing a key of a keyboard, e.g., escape, clicking an icon, using a voice command or other mechanism). According to some embodiments, the recording may be set to capture an image at the front, and image at the back, and one between the front and the back. Once the system has completed adding images, the system utilizes the information collected by the images and sensors, and processes the images to adjust the acquisition parameters for tracking of components based on the calibration procedures.

An exemplary depiction of one type of suitable calibration procedure that may be used to calibrate the imaging components and the projectors, may be implemented using the information provided in expressions (1) through (14) above (although other suitable procedures, including known calibration procedures may be used to calibrate the imaging components and projectors). The completion of the image collection may display an option for continuing, which, for example, according to an exemplary embodiment, may involve pressing or actuating a RVATCalib1 Script macro. The process then exports the necessary stages, with the implementation of the script setting the correct parameters for the acquisition, which, for example, may include acquisition parameters, measurement series, and component. For example, parameters for acquiring information may specify acquisition parameters, such as: unknown size, a radius (e.g., 8 pixels), an ellipse quality (e.g., 0.6), may specify a measurement series: e.g., no depth limitation, and may specify a component parameter (ID threshold 250 mm).

Once the steps have been carried out and the RVAT calibration process is complete, the system may generate an indication that it has completed the RVAT calibration, or, if the calibration has not been successfully completed, the system may generate further indicia on the display to provide instructions on the steps or information that are required to complete the RVAT calibration.

In this example, system and method involve the production of a library of component data which preferably is constructed to represent the components of the assembly. This may be carried out using a three dimensional scanning technique to digitize the object scan and generate a mesh of the object. According to some embodiments, commercially available digitizing software may be utilized to provide the mesh data for a component (e.g., ATOS supplied from GOM GmbH).

RVAT Scanning Of Components

According to the implementation of the RVAT system and method, each component may be scanned, or alternatively, where a plurality of the same component are to be assembled, and any variation is within acceptable tolerances, only one image scan may be generated from an actual component, and used to each other of the same components. In yet other embodiments, scanning of one or more components may be carried out, while some other components may not be scanned, and may be related to the one or more scanned components.

According to embodiments of the system and method, the object is scanned by placing a plurality of indicia on the component to be scanned. The indicia preferably may comprise dots (removably provided adhesive backed dot labels). The dots are placed on the component object, preferably in a plurality of locations. The component object is scanned using the image devices which have been calibrated, and using the RVAT system. An actual mesh of the component object is created.

According to some embodiments, the scan may be polygonised to create the actual mesh of the object. The object preferably has a representative CAD model, and the method also involves importing the CAD model of the object (i.e. the nominal mesh). The RVAT system implements an alignment procedure which in this example is a three-point alignment, to carry out the alignment of the actual mesh to the nominal mesh. In this example, alignment may be based on a local best fit that is generated to complete the alignment process. A point component based on the reference points (target dots) is created. Preferably, the minimum identification points are used, which may be those suitable to provide accurate rendering of the object. For example, according to some embodiments, this may involve setting the minimum identification point to a value of 3. The actual mesh is duplicated, which may be done by a command or other mechanism (e.g., ctrl C+ctrl V), and the actual mesh duplicate is renamed. Preferably, a tacking step is carried out. The duplicated mesh is tacked to the point component. The duplicate of the point component is created (e.g., ctrl C+ctrl V) and renamed (e.g., "xxx_nominal"). The conversion of the duplicated mesh tacked to the point component (xxx_nominal) is carried out. The xxx_nominal component is selected, and the conversion process initiated. The user may select indicia on the display screen that designates the conversion to a nominal element (selection of menus or indicia re: Operation/Element/Convert to Nominal Element). The linking of the nominal component to the actual element is carried out.

An inspection step is carried out to determine and confirm the associations between the actual mesh and the nominal mesh. The inspection step may include an inspection routine that may be implemented to process the information so as to compare associations between the actual mesh and the nominal mesh. The inspection may be carried out by the user to inspect one or more points of reference, and make comparisons, which may be done by the user inspecting, mapping and making or designating comparisons to be generated. Alternatively or in addition, suitable commercially available software for conducting an inspection routine may be utilized, one example of which is I-Inspect (GOM, GmbH), which provides suggestions of suitable measurement principles and inspection criteria for a given element. The nominal component is linked to the actual component by selecting the xxx_nominal component (ctrl+ Right Click), and then selecting the instruction to link the component to the actual element (Measuring Principle/Link to Actual Element), and selecting the actual point component originally created. A file export step is carried out, which may be done by selecting the actual point component and performing the export step by selecting an option "File/Export with Dependencies". According to preferred embodiments, this results in the export of a file which, according to an exemplary embodiment depicted, is a .gelement file type.

In this example, upon generating the RVAT component files for the actual components, a structure may be produced utilizing the real-time virtual assembly tooling. Preferably, the RVAT is selected on a display media or button. The RVAT software components of the system are provided on a computer and are operable with an arrangement of one or more cameras, sensors and projectors. The RVAT system and software may operate in conjunction with acquisition software that is designed to capture and process image information. For example, according to an exemplary embodiment, the RVAT system may operate in conjunction with ARAMIS software, where the ARAMIS software implements acquisition of the image data with the sensors. The RVAT system may utilize the acquired information, and through the RVAT system applications, including RVAT calibration applications and the alignment and linking of the imaged object components with CAD file data, transform the information to provide real-time tracking of components used to construct an assembly. With the RVAT and image collecting software operating (e.g., such as ARAMIS imaging software), the RVAT set up is initiated. This may be done by selecting set up indicia on a display designating the commencement of the set up process. The RVAT method proceeds with the setting of the Reference Component (RC). First, the sensor head is pointed at the work space which preferably is the assembly area, making sure the line of sight can see the Reference Component (RC) clearly, and preferably without obstruction. The work space also needs to meet the parameters, so that the space is within the measurement volume. The imaging software operating as part of or in conjunction with the RVAT system, is further initiated, which for example, where the ARAMIS system is used to image the imaging devices, is actuated by a user selecting an RVAT option for a New Project. Upon selection of the New Project, the CAD of the assembly is imported. In this example, the .gelement file that was exported from the digitizing procedure using the digitizing software (e.g., ATOS, etc.) also is imported. According to preferred embodiments, the .gelement file is configured to include the mesh, the point component, and the nominal point component. According to some preferred embodiments, the RVAT is configured to generate a file, such as for example, a ".gelement" file, that includes the mesh, the point component, and the nominal point component, as well as the fastening locations (e.g., Click-Bond® and drill point locations), which preferably are from the engineering file or CAD. Preferably, the locations are generated and made part of the file, (e.g., the .gelement file) automatically. According to some embodiments, the scan of the component includes reference indicia, such as tracking dots, which are scanned and whose locations are included as part of the .gelement file. The RVAT system is configured with instructions to generate the file and produce a database of locations. The locations may be associated with one or more components, steps or assembly operations. The RVAT preferably automatically obtains and adds the fastening locations (e.g., Click-Bond® locations or drill point locations) to the current .gelements from the engineering file or CAD, stored in the RVAT database.

Once the CAD and .gelement file are imported, the next step is to take a reference shot to provide a reference image of the work space field and the assembly or components within the field of view. The RVAT system is configured to generate and display the information from the .gelement files, by having those files go to their associated locations on the reference image. Alternatively, a further command may be required to populate the reference image with the .gelement data of the representative .gelement files, so that once the .gelement files are imported, the user may actuate the association with the reference image (e.g., by pressing F4, F4 on the element in the menu, e.g., on the left of the screen, etc.).

According to implementation, the components may be named in accordance with their respective part identification, function or both. For example, naming of the components may be what they will be, such as whether the component is a reference component or a display plate, etc. A naming convention preferably is utilized and implemented to associate components by type. One example of a naming convention applied for use with implementations of the method and system may include the following:

RVAT Naming Conventions:

REF—Reference Component (REF); such as, for example, Fuselage

CAD or digitizing software (e.g., ATOS) scans for sensor/camera system (e.g., ARAMIS system) orientation;

DXF file for RVAT (or STEP; DXF is preferred);

DP—Display Plate (DP), which will display data;

CBnn—Click-Bond's (3-types, 01,02,03) with Clip-on RVAT Tool (3D printed cap with reference points) for tracking each into position;

DXF files for RVAT;

DPT—Drill Point Marking Tool (DPT), calibrated point, in ARAMIS, for RVAT tracking;

Component Name—Components, for assembly, such as bulkhead, winglet, stringer, etc.

CAD or digitizing software (e.g., ATOS) scans for sensor/camera system (e.g., ARAMIS system) orientation;

DXF file for RVAT;

P—Point on a component; REF-P01;

An inspection routine (e.g., I-Inspect) for Coordinates (X,Y,Z);

CS—Coordinate System (Local) for a component; REF-CS;

An inspection routine (e.g., I-Inspect) for 6-DOF;

The above are exemplary naming conventions, and alternative conventions may be used.

The components are associated with a local coordinate system. The RVAT system and method preferably includes setting a local coordinate system on the components. This may be done with the assistance of digitizing software, such as, for example, ATOS. The RVAT software is configured to provide an option to display a skin configuration for the display and image depiction. According to preferred embodiments, the RVAT system provides a user with the capability to select different skins for use and visualization of the components and structure being displayed. According to an exemplary embodiment, one configuration generates and provides an inspection skin. The inspection skin may be selected as an option by the user (such as, for example, by providing a button on the display screen that the user may select). In an exemplary depiction, the user may change the skin from a default skin by selecting a selection option, such as "Inspection" mode, which displays an inspection skin. The inspection skin provides the user with the ability to make selections of point inspections. In addition to providing a different skin, the Inspection mode provides an active interactive skin, where the user may make designations based on the generation of the skin indicia. The user preferably creates point inspections on the component and inspects these points for X, Y, Z based on the Global Coordinate System (Original Alignment). The user may carry out the point inspection by selecting a plurality of points on the component image appearing on the display. The RVAT system is configured to generate and display data for the component, as well as the points selected. The RVAT system also may generate a point data as the user moves the input tool, such as a mouse-driven cursor over the component image. According to preferred embodiments, the data displayed may include actual (the measurement), nominal (where it needs to be), and the difference between the two. The data may provide location based on an X,Y,Z coordinate system, and may provide the data relative to a reference point that has been designated, or relative to a point reference on the component image.

According to a preferred implementation, the user selects a reference component. The selection of the reference component preferably may be carried out using the graphic interface provided on the display. For example, the user may make a selection by clicking on a drop-down menu and selecting an appropriate reference component for the project. According to an alternate implementation, the reference point may be selected by designating a CAD file, where the CAD file provides the reference. After the reference point has been designated or selected, the points are renamed based on what they are. The renaming of the points may be based on a naming convention, such as, for example, a naming convention discussed herein. The points are tacked to an appropriate point component. This provides the information about the point data, which may, for example, include generation of a file that includes the information. The RVAT system involves selecting a reference component. According to a preferred implementation, the appropriate reference component was already renamed using the sensor system (such as for example, ARAMIS). The user has the option to select CAD if this option is needed. The device for imaging, which for example, may comprise the ARAMIS system, is designated to proceed using the original alignment (which may be specified). For example, "Original Alignment" is selected in the ARAMIS imaging device. The sensor device, such as an ARAMIS device, is actuated to commence tracking using the imaging devices. For example, the ARAMIS device may be actuated by selecting an option to Start Deformation Tracking, where process and settings are shown. The RVAT preferably provides an indication that the Reference Component is set. Preferably, the user checks the RVAT calibration.

The set up process further includes setting up the Display Plate. The user may select the set up tab on the display screen menu, and make selections to set up the Display Plate. The setup of the Display Plate provides the user with the capability to designate what information should appear, which may be coordinate positions, rotation, relative reference, differentials (from actual, nominal or CAD).

The RVAT system is configured by defining Reference Points. Preferably this may be implemented by making one or more selections. For example, the user may click on a drop menu and select a particular component. A spread sheet may be generated to appear below (or in another area of the screen display), which includes information about the component. The spreadsheet may designate the row corresponding to the selected component, such that when the component is selected, the sheet highlights or provides another indication of the relevant row or data corresponding with the component. For example, the user may click on the cell of the spreadsheet that has a star icon. According to an exemplary embodiment, this will highlight the entire row. The user then completes the data that is to correspond with the component, and the component point. This may be done by inputting the data on a designated space, e.g., the right hand side, and entering it. Alternatively, the user may update already existing data for an existing point. For example, if the user is updating an existing point, the user may highlight the appropriate cell or location, such as the row, and update the data. An update button may be provided for the user to select to enter the data, designating it as updated data. In addition, the user may delete a point, which may be done by a similar procedure, such as, for example, highlighting the cell or row and pressing Delete (or a button on the screen, keyboard, etc.).

The system is configured with job steps which are designated for assembly of components. The RVAT system includes software configured to generate job steps for component assembly and carrying out the assembly operation. Establishing job steps to be carried out in an assembly operation may be done using the display screen. For example, a user may highlight a row that the user desired to Add, Update, or Delete, and a menu or other window may provide selections for the user to designate. As an example, the user may use the right hand side to input the information. A user preferably designates and defines work instructions for carrying out the assembly operation. Preferably, the system is configured to display an input area for the user to designate and define instructions. According to some embodiments, a selection menu is provided. For example, a user may highlight a row that it wants to Add, Update, or Delete, and a menu or other window may provide selections for the user to designate, such as, for example, on the right hand side at which to input the information. Another step is to configure the operation. This may be done by selecting the "RVAT Operation tab". The screen display may be used to display information and provide the operation information. According to an exemplary embodiment, a reference component is selected, preferably by a user, to which the assembly operation will be carried out. The reference component preferably serves to identify relative positioning of the component, and to provide information during the assembly, including, preferably, in real-time as the component is being installed. In some instances, the reference component may be pre-designated for one or more particular components, so that the component is installed relative to a designated reference component. The RVAT system preferably is configured to provide a listing of components for selection by the user. Components may be provided individually, or in groups, such as, where an assembly operation of a particular sub-assembly involves installation of several components. The sub-assembly group of components may be provided. A user selects a component (or components). A job pack is selected, which preferably defines an operation for the component. For example, a component may be designated for an assembly step in more than one job pack (e.g., component fastening and component finishing).

The assembly operation may be carried out using the RVAT. The RVAT tracks the selected component in real-time as the component moves within the viewing area, which is the assembly operation area. Preferably, the RVAT system functions to track the component and does so in conjunction with the imaging device, such as, for example, the sensors/cameras and inputs captured (e.g., ARAMIS). The RVAT system tracks the component in accordance with the RVAT tracking configuration, which utilizes the image data obtained with the imaging devices and software that is used to capture the image data. The RVAT manipulates the image data so that the tracking of the component takes place in real-time with the RVAT calibration and other manipulations to assemble the actual components in real-time in the assembly field of view.

According to an exemplary embodiment, the RVAT tracking configuration takes the image data ascertained from the ARAMIS device (cameras and sensors) and manipulates the information to transform the data to associate the component selected for installation. The RVAT system identifies and associates the component and distinguishes the component from the structure, reference component and other components. Although the user may make changes to settings and adjustments, including calibration of the image sensing devices (such as, for example, the ARAMIS device or other imaging and sensing hardware), the RVAT is configured to direct the assembly operation. The RVAT system may display a particular work order or job, and preferably is configured to enable the user to switch between jobs. For example, where there are separate jobs to be carried out, and a job may be carried out step-wise, or intermittently with steps of another job, the user may use the display options to switch between jobs. The RVAT system preferably displays operations on the screen. Indicia is provided on the display screen to indicate what step of a multi-step assembly is being performed. A user may undertake a step and switch between jobs, either to perform a step of another job or to inspect or compare the real-time progress or status of components or work of the other job. For example, arrow buttons or other designations may be generated and displayed on the screen for the user to select (e.g., such as arrow buttons) to switch between current jobs. The display may provide a "Current Step" indication to display to the user which step is being performed.

The RVAT system preferably includes indicia, such as a prompt, to accept comments, so that a user may type information or notes about the current step. Preferably, the RVAT is configured to provide one or more designated areas into which the comments are placed. The comment information preferably is stored and is associated with the current step (or even a component, or both a step and component). The comment information may be accessed by personnel, such as for example, a user performing that step (in another assembly operation), or for another job, as well as others. For example, the comments also may be communicated or otherwise made available to engineering personnel or management of the assembly operation in order to address any potential issues regarding the assembly. The comments also may be utilized in conjunction with the RVAT evaluation and analysis functions. Table 1 of FIG. 1 is an example of fields provided by the RVAT system, which depicts comments that may be input by users.

The RVAT system provides an indication of the review of the assembly operation, which may be a review of the job or of a step. For example, quality ratings are generated and presented to the user so the user may determine the effectiveness and accuracy of the manufacturing process or step. The user, for example, may select a button on the display to review quality ratings, which provides information on the display that indicates how well the tolerances were during the manufacturing process. The user also may select a button or other indicia on the display to generate the displaying of assembly notes to see the notes written during each step of the assembly operation.

The RVAT may be implemented through one or more computing devices, such as a computer, which creates one or more images in a tangible medium of an assembly area and objects within the assembly area. The RVAT preferably is provided with software containing instructions that generate images within the assembly area via a projection device. The transformation of the pixel representations of the images obtained via imaging devices, such as cameras and sensors, is carried out with calibration instructions that the RVAT provides to identify and track components of an assembly within the assembly area. The RVAT preferably receives image data from the cameras and other sensors which preferably is made of pixels having discrete locations represented by a coordinate system, such as, an X,Y,Z coordinate system. The imaging devices, which may include cameras with lenses and adjustable apertures, as well as image sensors, are themselves calibrated to provide the optimal data. The RVAT system provides further transformation of the image data to capture objects within the assembly area, which is the assembly field of view, and the movement of objects. The RVAT takes the image information and implements transformations of the image data by defining a reference coordinate and assigning the reference coordinate to an object, such as a structure or component, within the assembly field of view. The assigned reference coordinate (RC) then serves as the master reference coordinate system (MRCS). The RVAT utilizes the information from the image devices and also obtains the data from the CAD file for the assembly, as well as CAD files that represent the components of the assembly. The CAD files typically are arranged within a CAD assembly drawing, which is the structure to be assembled. Individual components preferably have their own CAD file. The CAD assembly represents a single coordinate system where each component has the same reference point. The RVAT is used to carry out assembly operations in real-time, and as the assembly is taking place, the RVAT obtains the information for the components and structures. The RVAT generates a digital-twin of the as-built structure in real-time.

RVAT Interface

According to an exemplary embodiment, the RVAT system and method may be utilized in conjunction with computing devices. The RVAT system and method preferably include a user interface, which preferably comprises a software interface with user configurable options. The RVAT software includes instructions for receiving inputs from imaging devices and associated imaging software, and preferably, the RVAT software runs simultaneously on, and interfaces with, imaging systems and software, including for example, the various ARAMIS systems used for manufacturing operations. The RVAT system is configured with software containing instructions to maintain the RVAT Database with the real-time information needed for the manufacturing operations, such as the assembly of a structure. The RVAT preferably includes software containing instructions for creating and updating a Digital-Twin Database (DTD) from the RVAT database for documenting all of the information about the structure being assembled, such as a vehicle.

Figure 7:
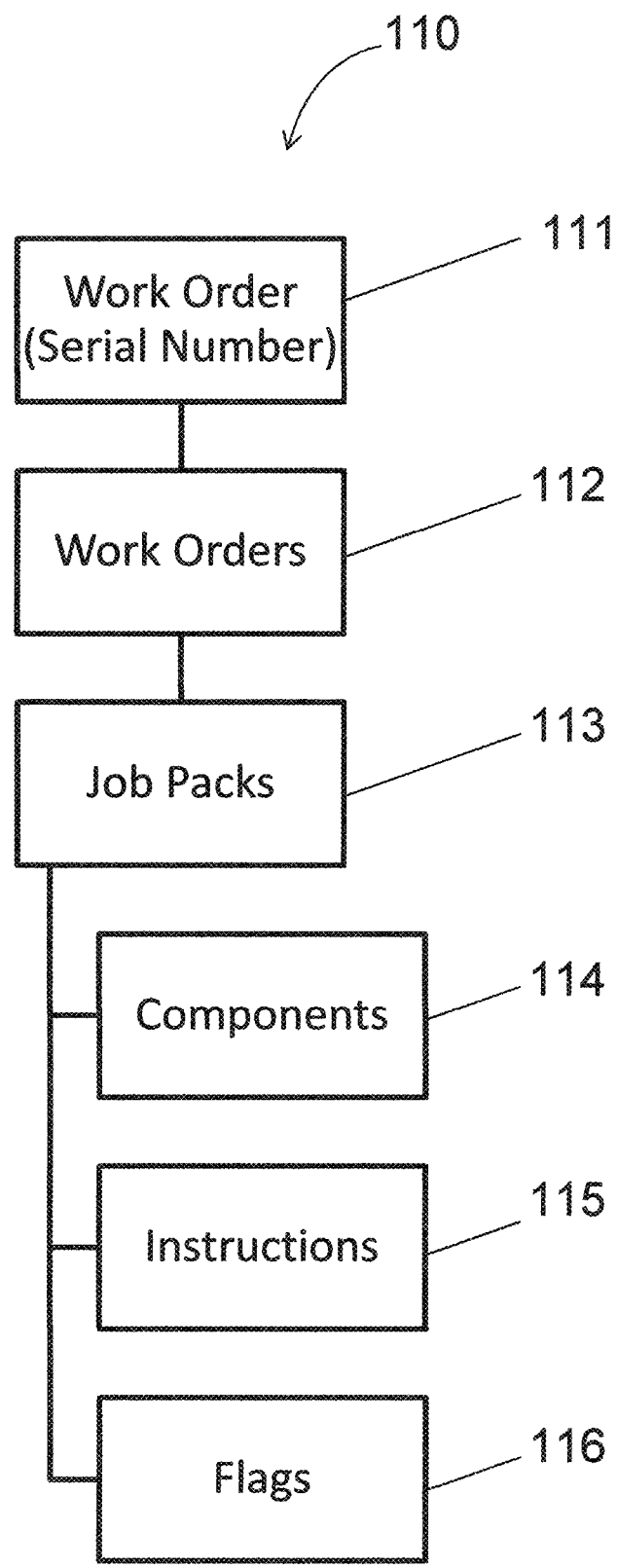
FIG. 7 is a flow diagram illustrating an exemplary embodiment of an RVAT software interface.

A depiction of the stepwise process 110 for implementing an RVAT operation is illustrated in FIG. 7. RVAT work preferably is defined under a Work Order (e.g., Serial Number—Tail Number) 111. Each Work Order 112 components are broken into multiple Job Packs 113 which define each step in the manufacturing operation. Each RVAT Job Pack 113 are the manufacturing steps. These are programmed by an engineer using the CAD design of the vehicle and the ATOS scans of the components. All data is maintained in vehicle coordinates. The engineer creates each manufacturing step with its components' gelements and installation instructions. As illustrated in FIG. 7, the Job Packs 113 are further comprised of Components 114 used to carry out the steps for the part of the assembly or Job Pack 113, as well as Instructions 115, and Flags 116. As depicted in FIGS. 9 to 13, preferred examples of screen displays and menus generated with the RVAT system are shown.

According to some preferred embodiments, the RVAT configuration may include three or more imaging systems (i.e., ARAMIS systems) imaging a work area, each with an ARAMIS stereo camera pair, and a digital projector with a Display Plate. For each step the imaging system (ARAMIS) tracks the Reference Component, the Display Plate and the component being assembled, in both Vehicle Coordinates and ARAMIS Coordinates (used by RVAT for precision projection). ARAMIS measures the 3D coordinates of the target dots on the components, referenced to the reference component, in order to provide the coordinates in vehicle coordinate space. ARAMIS exports that 3D coordinates of all components being tracked in real-time on its SCPI network feed to the RVAT interface. The RVAT system is configured to display these coordinates, and assembly instructions, on its monitors and projects to the Display Plate or directly onto the Reference Component surface, as programmed, from the best positioned projector. RVAT can also display to an AR display, if used, as well as on components, structures, or other displays.

According to one implementation, where an ARAMIS imaging system is used to provide imaging information to the RVAT system, an operator runs RVAT on the ARAMIS systems, which opens ARAMIS running the RVAT Script. Each ARAMIS Sensor and RVAT Projector are calibrated, if necessary. The operator opens the current Work Order and Job Pack, on the system that he is working on (all others follow the operational system). ARAMIS tracks the current components in real-time, in vehicle coordinates. For each manufacturing step, RVAT displays the distance to the designed location of the specific component being assembled, so that the operator can position the component accurately. The operator can see the real-time information on the Display Plate, on any of the RVAT Computer monitors, on the manufacturing surface (if chosen), or on his AR Display (if available). When the step is completed, the operator triggers Done, the component is documented As-Built, and the next Job Pack Step is displayed. The as-built information is then recorded into the Digital-Twin.

The RVAT system preferably is implemented by generating an RVAT database, as well as the utilization of an imaging system to capture image information (such as ARAMIS stereo photogrammetry technology), coupled with an image projector, and one or more of a display or AR glasses, as well as in some RVAT implementations, thermography NDT. The RVAT system preferably is configured to operate across computers in a distributed way, which according to preferred embodiments, operates with the same shared RVAT database and creates and updates the digital-twin database with all of the manufacturing steps and information about the vehicle being built and maintained.

Figure 8:
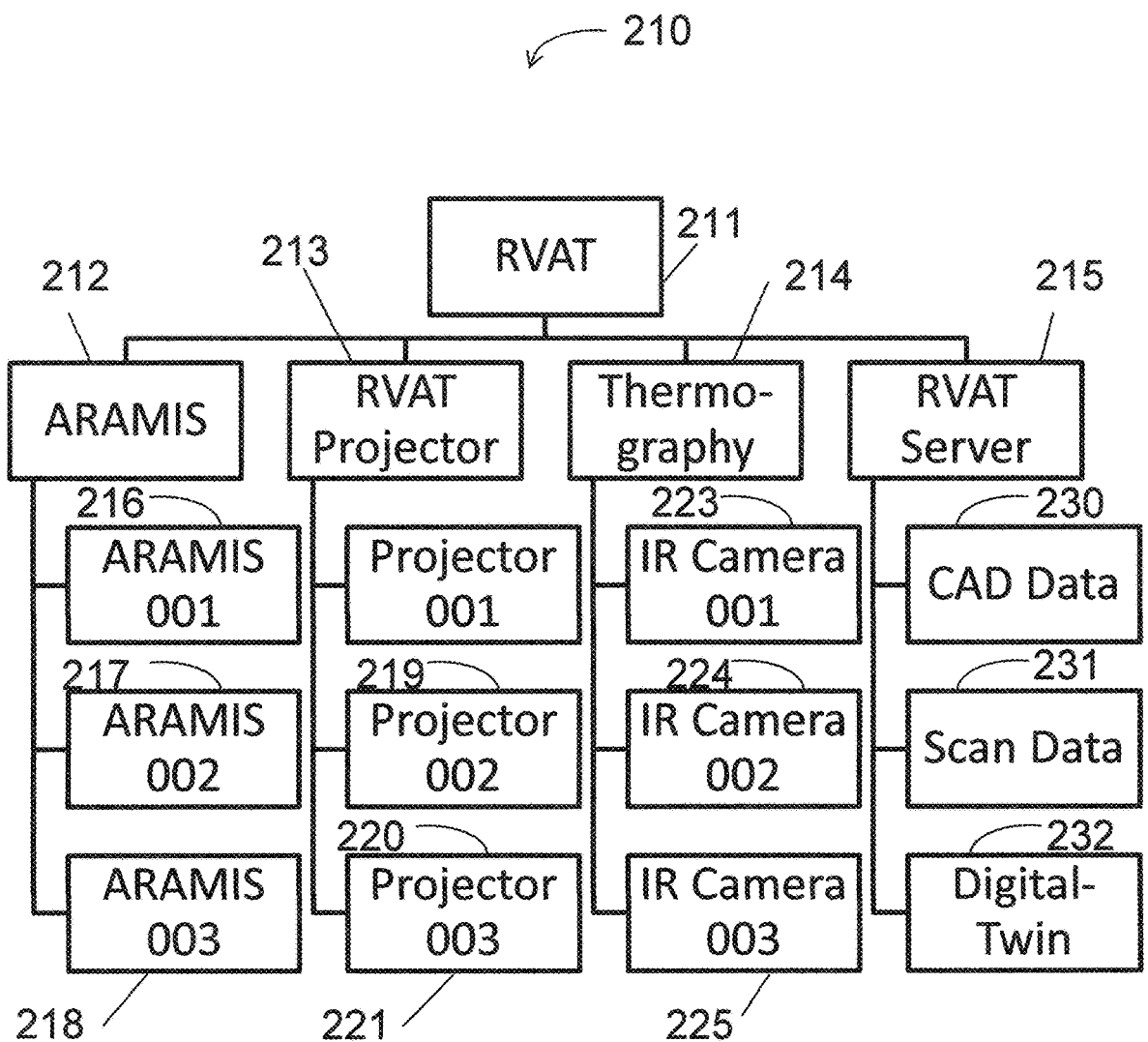
FIG. 8 is a diagram illustrating a preferred arrangement of an RVAT system implementation.
Figure 9:
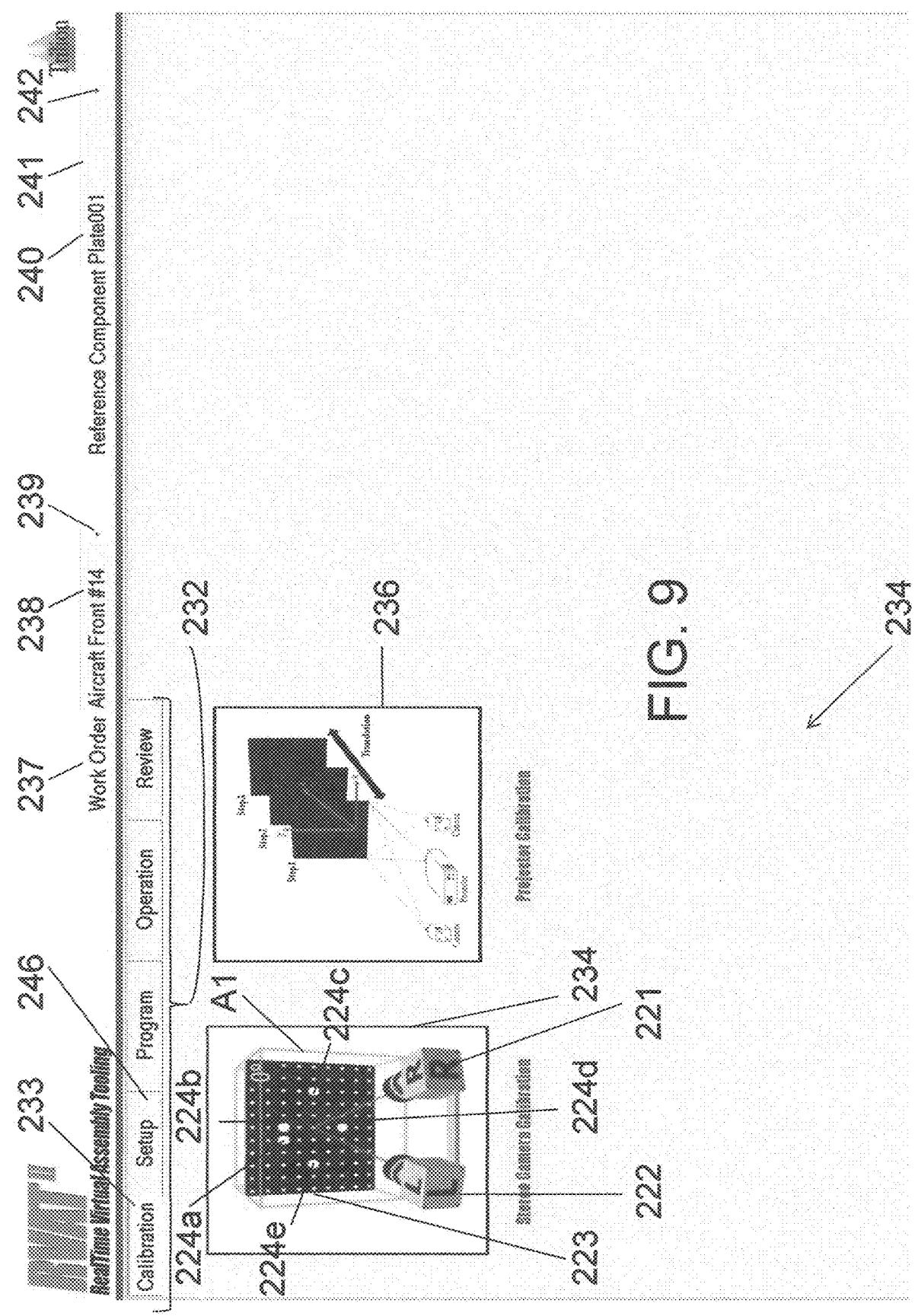
FIG. 9 is an example of an RVAT screen display showing an exemplary depiction of a calibration screen.

As illustrated in FIG. 8, a preferred arrangement of an RVAT system implementation 210 according to the invention is depicted. The RVAT represented by block 211, is configured to control multiple systems or subsystems, and preferably an RVAT database is generated and maintained, implementing distributed computing. The RVAT 211 receives information from processes, controls and directs operations of the other elements represented in FIG. 8. In FIG. 8, an imaging system (ARAMIS) is represented in block 212. An RVAT Projector, controlled by the RVAT system and RVAT software is represented by block 213. Thermography is represented by block 214, and an RVAT Server represented by block 215. According to preferred embodiments, the RVAT server may have a plurality of imaging systems imaging a work area, and preferably, three or more. In FIG. 8, the RVAT imaging systems are represented by ARAMIS systems (ARAMIS 001, block 216, ARAMIS 002, block 217, and ARAMIS 003, block 218) imaging a work area, each imaging system, e.g., ARAMIS system (216, 217, 218) having an associated imaging camera pair, and a respective digital projector, Projector 001, (block 219), Projector 002, (block 220), and Projector 003, (block 221). Each Projector 001 (block 219), Projector 002 (block 220), Projector 003 (block 221) preferably has an associated corresponding display plate. Optional display capabilities include display screens, and AR (augmented reality) display for presenting the RVAT information. FIG. 8 also depicts the optional measurement capabilities, which is depicted in this diagram to include thermography imaging cameras, IR Camera 001 (block 223), IR Camera 002 (block 224), and IR Camera 003 (block 225), each of which is respectively associated with an imaging system (e.g., respectively, ARAMIS 001, ARAMIS 002, or ARAMIS 003). The Thermography 214 represents an optional feature for measurement capabilities, such as, for example, for lay-up detection of voids and backing material using a thermal camera with a pulsed thermal source.

The RVAT Server 215 is depicted with the information and database that includes CAD data (block 230), Scan Data (block 231) and Digital-Twin (block 232). The RVAT 211 preferably implements the RVAT Server (block 215) to store the RVAT information across a distributed database, so that captures from the imaging components (such as stereo camera pairs), and projected information (alignment points and indicia, and the like), may be utilized for the assembly of the structure. According to preferred embodiments, the RVAT database may be a Sequel database that houses all information collected for the manufacturing process and for the ARAMIS systems control. The Digital-Twin database (block 232, FIG. 8), is a subset of the RVAT database documenting the as-built information of the vehicle (structure) as captured by RVAT.

The representation of the RVAT system 210 in FIG. 8 depicts the RVAT system, and in the field, structural health monitoring may be implemented based on the RVAT system database and analytics, and the imaging photogrammetry technology (e.g., ARAMIS stereo photogrammetry) coupled with Thermography (NDT).

The following is an exemplary depiction of the method and system, to demonstrate an example of the steps to assemble a component of a vehicle, which in this depiction is an aircraft, and wherein the RVAT system is exemplified with the use of display screens.

Example 3

According to an exemplary embodiment, the RVAT system includes software that processes inputs obtained from sensors. As shown in accordance with an exemplary depiction in FIG. 9, an example of an imaging area A1 is depicted and imaging components, shown comprising two cameras 221, 222 are directed to capture the imaging area A1. A calibration plate 223 is depicted, wherein the imaging identifies the calibration details, which, for example, comprise a set of calibration indicia, depicted as circles 224a, 224b, 224c, 224d, 224e, arranged on the calibration plate 223.

A calibration step is carried out to calibrate the stereo pair of cameras 221,222. The calibration may be carried out by a user, wherein selecting the calibration tab 233 from the menu 232, and the calibration icon 235 on the display screen 234, generates and displays a calibration screen, which shows inputs from the cameras, and provides the user with the ability to make adjustments to calibrate the cameras 221, 222. With the cameras calibrated, the user also may select the projector calibration icon 236 from the calibration menu 237 shown on the display screen 234. Projector calibration preferably is carried out, as discussed herein, and is depicted on the projector calibration icon 236 showing the establishment of the front of the frame imaging area (step 1), a location in the middle of the frame imaging area (step 2) and a location at the end of the imaging area (step 3). In the exemplary depiction illustrated, the Work Order 237 shows the "Aircraft Front #14" in the work order selection box 238 which indicates the work order being carried out. According to some embodiments, the selection box 138 may include a menu such as a drop down listing 239 of the available work orders, may designate work orders to be completed, and/or other work orders and their respective statuses). The selected reference component is "Plate 001" (indicating the calibration plate 223). The reference component selection box 241 may include a menu, such as a drop down listing 242, identifying the available reference components, and preferably the reference components involved in carrying out the corresponding work order (such as Aircraft Front #14 in this example).

Once the imaging components and projectors are calibrated, the system is operated to provide the set up for the assembly. In the depiction illustrated in FIG. 10, a screen display 245 is shown where the setup tab 246 has been selected from the menu 232. A Work Order "Aircraft Front #14 is shown in the Work Order selection box 238, and the reference component is indicated as "Plate001" in the Reference Component selection box 241. The display screen 245 depicts selection options for the setup, which in the exemplary depiction, comprise a create .gelement icon 247, a select reference and tracking components icon 250, and load components icon 257. In the exemplary embodiment, the system is depicted in operation with ATOS® and ARAMIS software. The user selects the create .gelement icon 247 to proceed with the creation of the .gelement file. The create icon 247 shows an exemplary depiction of an imaging components I1 and I2, and a projector J1, with a component part CP shown and depicted on the screen display D1 of the icon 247 (as the displayed component part CP'). The icon 247 preferably may be representative of the steps to be carried out (such as the creation of the .gelement file).

The next setup step depiction includes a selection icon 250 (FIG. 10), for carrying out the selection of the tracking of reference components. The icon 250, depicts examples of components (also referenced in the load components icon 257), which include a reference component 371, a tracking component 372, a drill point marking tool 374, and an installation tool 373 (comprising a drill). A display plate 370 is also depicted within the icons 250 and 257. The system preferably provides guides for the user to assign the reference component (which will serve as the base structure, in reference to which measurements are made). The components are loaded to provide information for the imaging program. In the exemplary depiction, an ARAMIS imaging program is used in conjunction with the system and the software of the system. The system is configured to select and store the component information in accordance with ARAMIS. As shown in the load components icon 257, the selection of the icon 257 provides the user with a further screen and indications of the components imaged, and the points and components detected with the imaging, so the user may load the selections of the marked reference and tracking components into ARAMIS.

Figure 11:
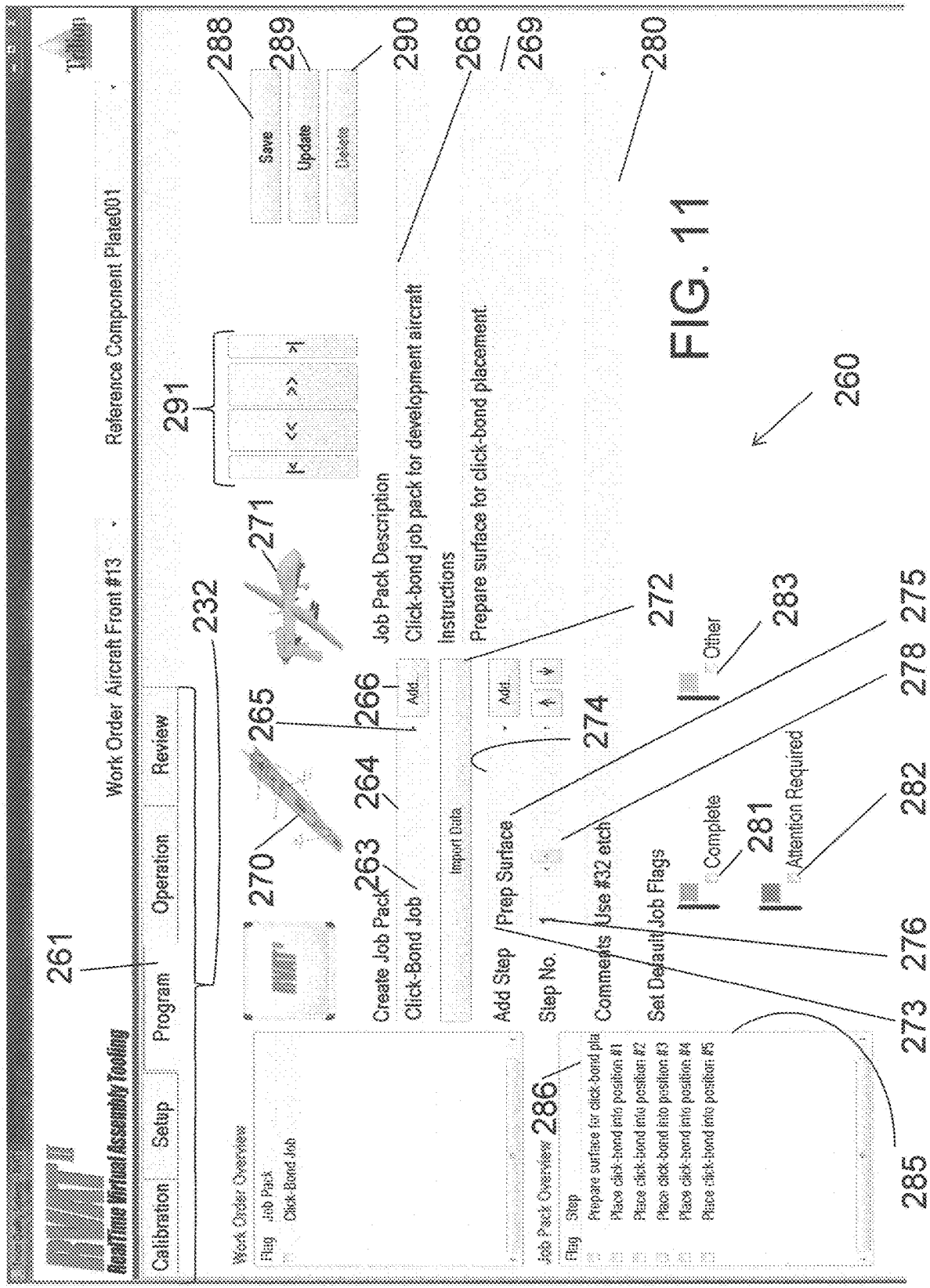
FIG. 11 is an example of an RVAT screen display showing an exemplary depiction of a program screen.

Referring to FIG. 11, the RVAT system is further depicted in reference to the display screen 260, which is generated in connection with the selection of the program tab 261 from the menu 232. The program selection provides the user, which may be a design engineer, with the capability of creating a job pack, which is associated with a work order. The job pack is created to determine the steps and structures to be handled by a particular operation. In the embodiment illustrated, the screen display 260 shows a plurality of menus and information options. The exemplary depiction illustrates a particular assembly operation, which in this example, is a Click Bond® job, wherein Click Bond® fasteners will be installed at a location of the aircraft. The user is provided with the capability to select (which may be from a menu of options) one or more designated tasks to be carried out in the job pack. In this example, the job pack is a Click Bond® job 263, selected from the job pack menu 264. A drop down menu 265 that includes selections of potential steps or operations to be carried out in regard to the vehicle build (which is an aircraft in this example), may be provided. The selection button 266 to add the click bod job is selected, and a "Job Pack Description" may be entered by the user in an input box 268 of the screen display 260. The instructions also are entered in conjunction with the generation of the job pack. In this example, the instruction box 269 is provided with an instruction entry that indicates to prepare the surface for Click Bond® placement. One or more graphic depictions pertaining to the assembly step as represented by the job pack also may be displayed. In the exemplary depiction, a graphic of the aircraft wing 270 is displayed along with a graphic of the aircraft 271. The Click Bond® job may be repeated for Click Bond fasteners already entered, and the system provides the user with the option to import data 272, which may be data relating to the Click Bond®, for example, from a prior Click Bond® step. In the exemplary depiction, the Click Bond® step is added by selecting the Click Bond® job in the create job pack window 264. This job pack also includes a step to add via the add step window 273, which depicts a drop down 274 for the steps to select to be added. In this example, the Click Bond® step associated with this assembly is to prep the surface 275, which is designated as step no. 1 (see box 276) for this Click Bond® assembly job.

A sliding graphic 278 is shown to provide the user with the ability to scroll through the job steps, and contains instructions for each of the respective associated steps for the Click Bond® assembly (Click Bond® job) that appear in the respectively associated description and instruction windows 268, 269. A comments window 280 is provided, and the user may provide comments for the assembly operation (or select comments from a drop down menu as an option), which in this example, is to use #32 etch. The information will appear to the assembly technician when the assembly operation is carried out.

The user programming the job pack also may be specify a job flag, which may indicate one or more conditions of the step, or job pack, which in this example, include complete 281, Attention Required 282, and Other 283.

Although the prep surface step is shown, the assembly of the Click Bond® also includes other steps, such as, for example, the steps 286 illustrated in the job pack overview box 285 appearing on the left side of the screen display 260. In this job pack, for example, the assembly includes five Click Bond® installations at five respective installation locations (see the listing of the steps 286).

The user programming the job pack may save the entries, update or edit them, or delete them, and corresponding selection buttons may be displayed for the selected operations (e.g., the save button 288, update button 289, and delete button 290). In addition, the display screen 260 includes a plurality of selection arrows 291, which enable a user to manipulate through steps and graphics for each respective job pack and/or job pack step.

Figure 12:
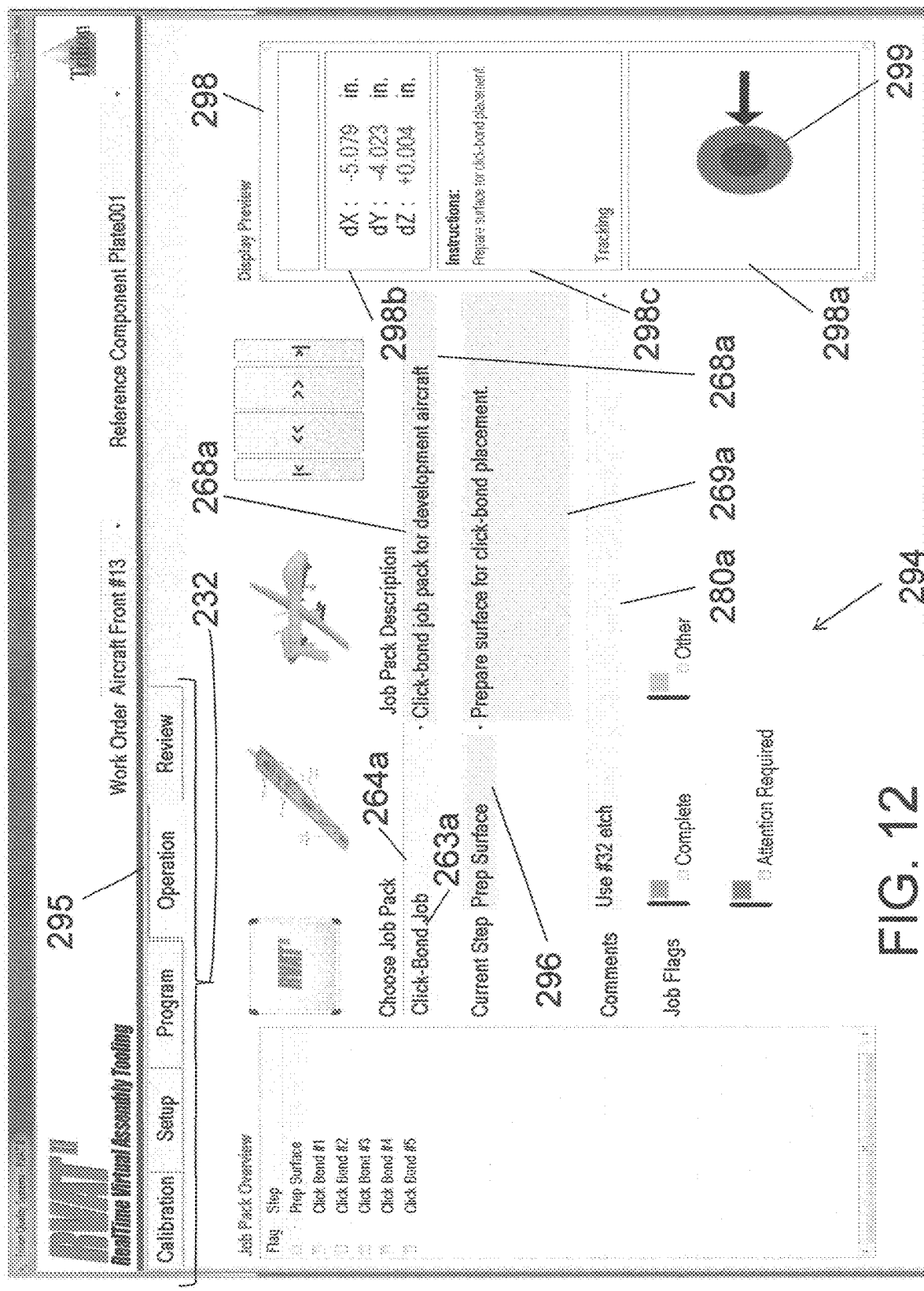
FIG. 12 is an example of an RVAT screen display showing an exemplary depiction of an operation screen.

In this example, the RVAT system also is used to assemble the aircraft. Referring to FIG. 12, the system software generates a menu of instructions as represented by the screen display 294. In the exemplary depiction, the instructions are provided through the selection of the operation tab 295 of the menu 232. The operator carries out the installation of the work order, and the job pack steps that comprise the work order. In this example, the Work Order is the Aircraft Front #13, and the reference component is indicated to be "Plate001". The job pack is the Click Bond® job 263a appearing in the job pack selection window 264a. The job pack description box 268a, and the instruction in an instruction box 269a, as well as the current step 296 ("Prep Surface" in this example), and comments 280a, are what the programmer of the job pack (Click Bond job) set up in the prior program steps (see FIG. 11). The operator carries out the assembly in accordance with the instructions. The system is configured to guide the operator, and, as depicted on the operation display screen 294, a display preview 298 is generated and includes tracking information for the position of the Click Bond installation. In the exemplary depiction, the tracking is represented by a tracking box 298a, which generates and displays indicia, the target circle 299, and provides an indication of the positioning coordinates 298b, as well as an instruction 298c. The surface prep area is located and the coordinates (box 298b) and target dot (box 298a) represent the Click Bond® installation location and the location of the component (aircraft wing in this example) on which the surface preparation will be required. The operator is guided by the system as the #32 etch surface prep (provided as an instruction in the comment window 280a, and in the instruction box 298c of the display preview 298) is carried out at the designated location (e.g., represented by 298b). The tools used also are tracked, as shown and described herein, so that the operator is able to identify the assembly location as well as the position of the tool or instrument used to carry out the step. The display preview box 298 may alternately display tool positions, or an additional display preview window or box may be generated and displayed providing location information for the tool to be used, as well as alignment indicia, such as a target for the tool position. For example, the drilling position may specify drilling into a blind hole location, and the tracking of the tool or drill is carried out so that the rotational angle of the drill, as well as drill depth may be indicated by the RVAT system to guide the operator to the precise drilling operation. In addition, the RVAT may measure the drill operation, including the depth and position of the drilling and store that information as part of the as-built data or digital twin.

Figure 13:
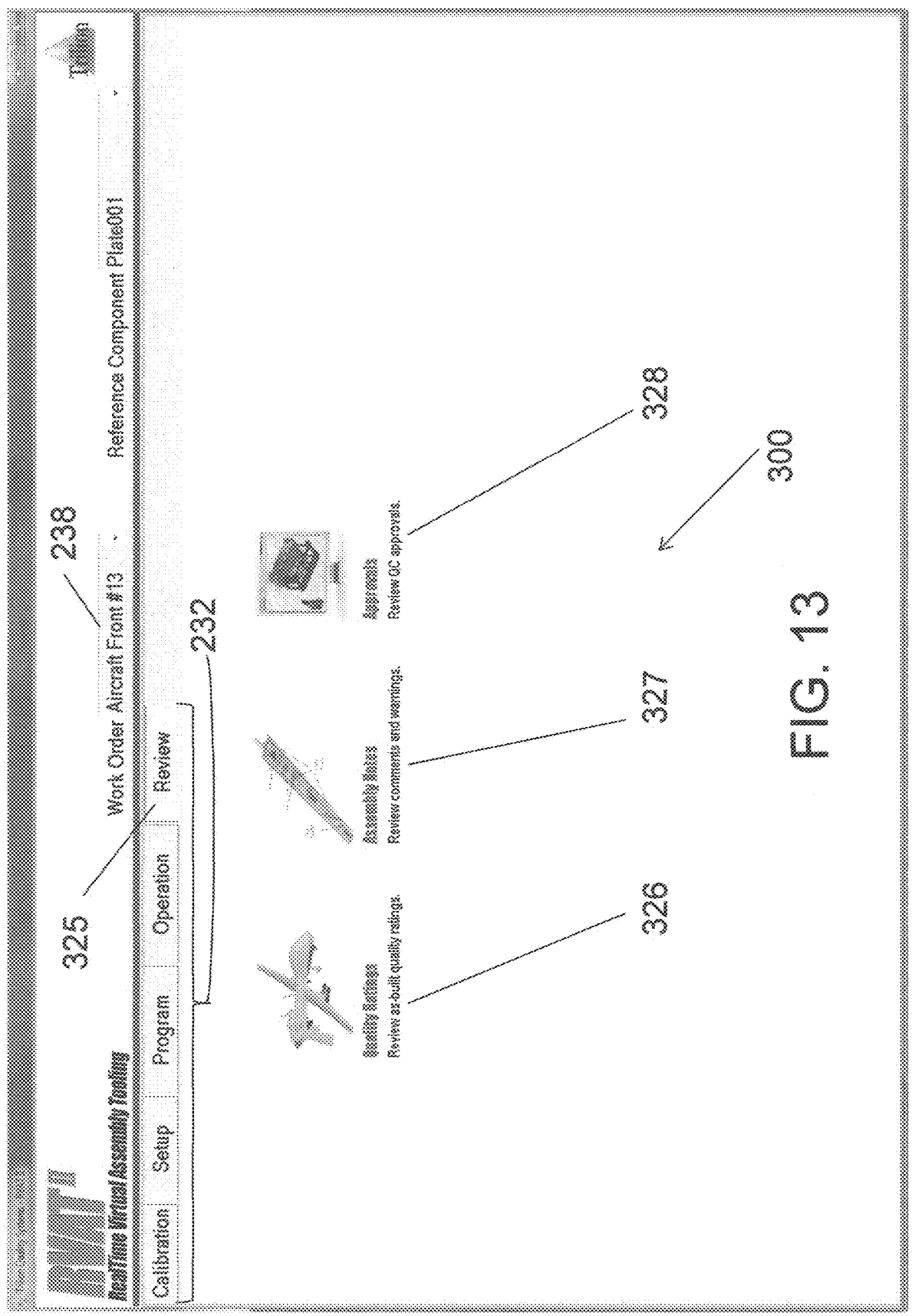
FIG. 13 is an example of an RVAT screen display showing an exemplary depiction of a review screen.

As depicted in the exemplary screen display 300 of FIG. 13, the system also includes a review tab 325 as part of the menu 232, which, in the exemplary depiction, shows selections comprising icons for quality ratings 326, assembly notes 327, and approvals 328. These selections may be made to review the assembly with regard to the particular work order (e.g., Work Order #13 in the Work Order window 238). The quality ratings preferably identify inputs that the programmer desires to track, and the as-built quality ratings may be displayed and reviewed by the system users. The system preferably is configured to generate assembly notes, which the users may review. An "assembly notes" selection icon 327 is shown. The assembly notes, when actuated by a selection, provides an area for user inputs to input notes of an assembly step, component, or other information, which may be made available for viewing by users. As discussed herein, the review and production of assembly notes may be categorized based on the job level of personnel, timing, and other factors. The assembly notes implementation may, for example, contain warnings (generated for display), and although the review tab 325 appears after the other tabs of the selection menu 332, according to some embodiments, the review tab 325, and assembly notes 327 also may be accessed prior to an assembly operation step (as well as after) to provide additional information to an operator (such as whether there is a preferred or peculiarity to carrying out a step). In the exemplary depiction, the review tab 325 also includes the "Approvals" icon 328 appearing on the display screen. Selection of the approvals icon 328 may generate information such as reviewing and inputting quality control approvals for a step or component.

The above description and screen displays are provided to depict an exemplary embodiment of the RVAT system, and features shown and described herein may also be provided as part of the interface. Other features shown and described herein also may be provided as part of the RVAT software and interface, and may be generated and displayed, for example, as additional tabs, screens, sub-menus, or combinations of these.

The system and method may include tools that may comprise existing tools tracked with the RVAT system, using the imaging components and the RVAT manipulation of the imaging information to identify and locate the tool within the assembly area (and field of view of one or more of the imaging devices). In addition, tool embodiments may be generated by providing tracking indicia on a tool (which may comprise tracking dots, for example) that the RVAT system may image and process to track the location of the component. A tracking tool, for example, is provided in an embodiment referenced as a faster locating tool for positioning the fasteners, such as, for example, Click-Bond® fasteners at the desired location for installation. The tool is shown to engage the fastener (the Click-Bond® in this example). The tool includes indicial, which indicia in preferred embodiments may comprise at least three tracking dots, and preferably may include more indicia or tracking dots. The tool carries or aligns with the fastener (the Click-Bond®) so that movements of the tool and fastener are consistent. The RVAT preferably is configured to relate the tool and CAD for the Click-Bond®. The RVAT processes the image information that identifies the location of the tool, and therefore, the fastener (Click-Bond®) that is associated with the tool, to generate indicia and/or other guidance that may be projected onto the actual surface or component to which the Click-Bond® is being installed (or a display, or combinations of these). The guidance may include a target represented by both coordinates (and the proximity in values to the proper installation location) and/or may generate other alignment indicia that is projected directly on the component or structure surface onto which the fastener is to be located. One example of an installation tool for a fastener is depicted in the icon of FIG. 10.

Figure 10:
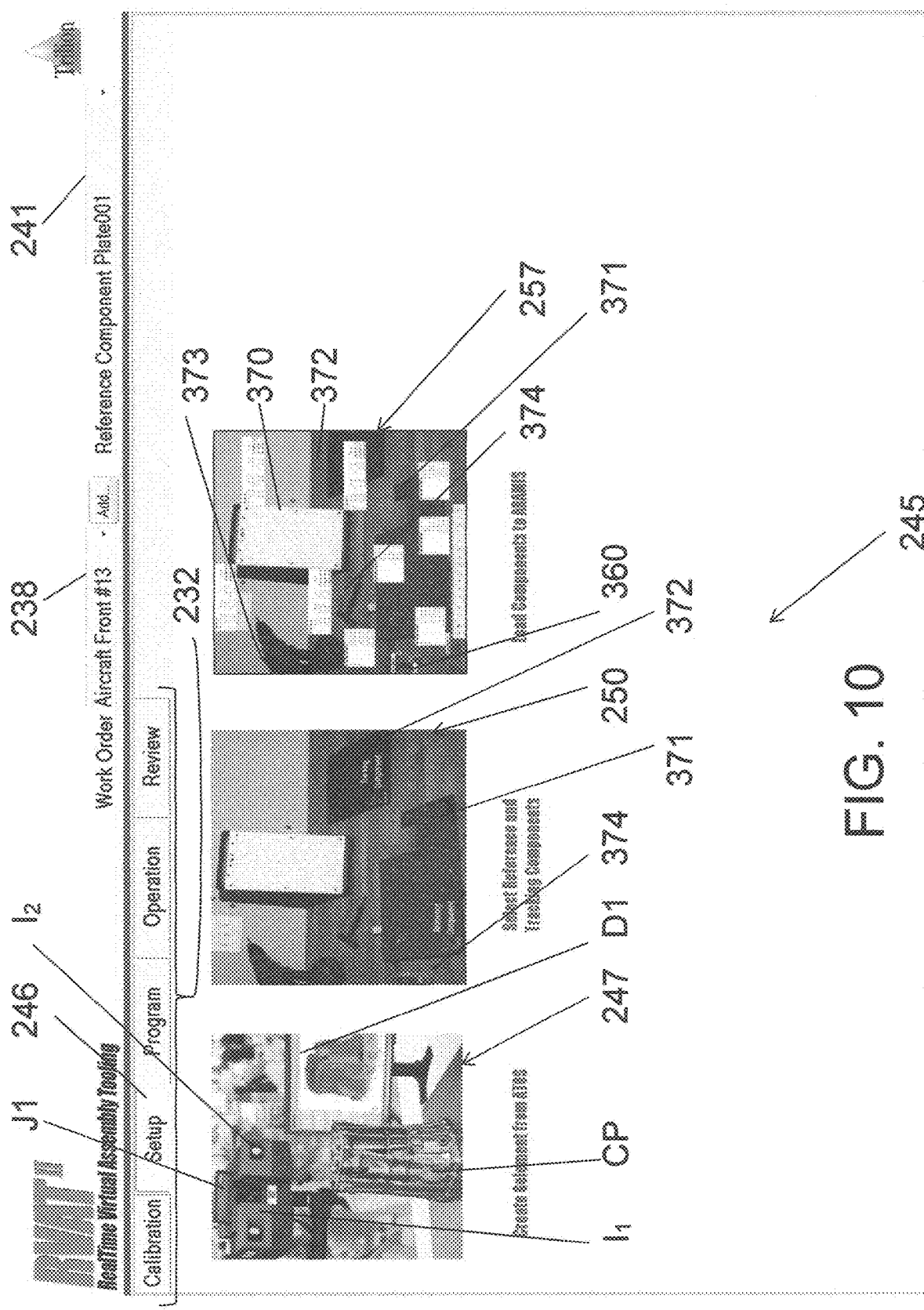
FIG. 10 is an example of an RVAT screen display showing an exemplary depiction of a setup screen.

In FIG. 10, as represented by a depiction in the load components icon 257, an exemplary depiction of a tool 360 is shown having a plurality of tracking dots on a surface thereof is shown. The tool 360 is designed to releasably hold or releasably secure to a Click-Bond®, so that the Click-Bond® location may be tracked with the RVAT for installation on a structure or component. The tool 360 may be removed once the Click-Bond® has been installed and set in place by curing or another suitable installation procedure.

The RVAT system is depicted with the Click-Bond® installation, and also may be sued to secure other components of the structure.

FIG. 10 also illustrates a display plate 370. The display plate 370 is shown in an exemplary depiction in the load components icon 257 with other items, including an exemplary reference component 371, an exemplary tracking component 372, Click-Bond® installation tool 360, a drill 373, and a drill point locating tool 374. The items may be provided with tracking indicia, such as tracking dots. According to some embodiments, one or more points on the structure itself may be designated to identify and track the structure.

Figure 14:
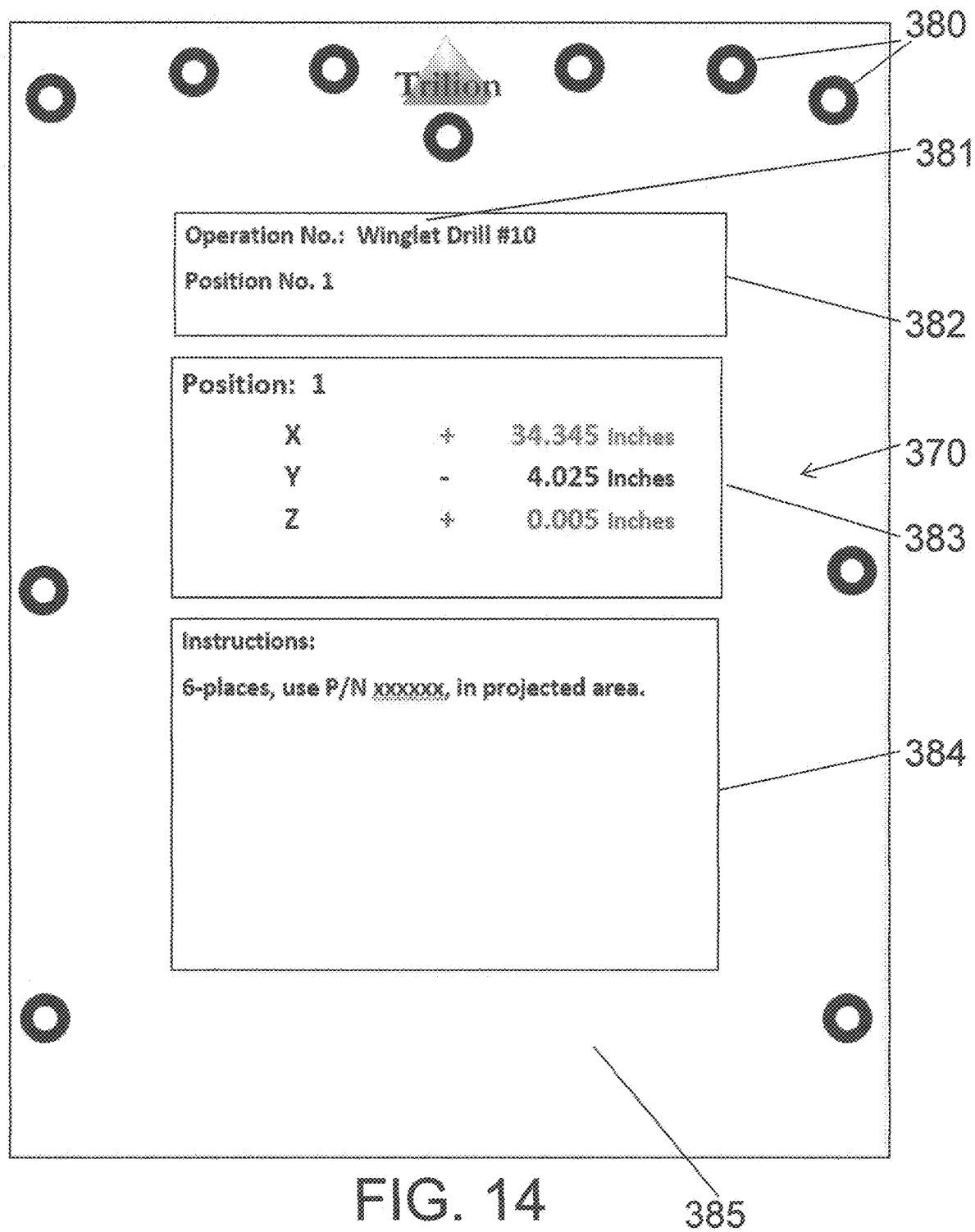
FIG. 14 is an example of an RVAT display plate, showing the front face thereof.

An example of a display plate 370 is depicted in FIG. 14. The display plate 370 may be used in connection with the RVAT system by placing it within the field-of-view of an imaging component (e.g., an image sensor, such as an ARAMIS sensor) and projector (e.g., ARAMIS projector), so that positioning information may be displayed to the operator. According to preferred embodiments, the display plate includes an area onto which a projected image, such as the boxes 382, 383 and 384 and information therein, may be projected from one of the projectors of the system. In the exemplary depiction of FIG. 14, the display plate 370 includes tracking indicia thereon so that the display plate 370 may be tracked within the field of view. The tracking indicia are shown comprising a plurality of tracking dots 380 arranged at different locations on the surface 385 of the display plate 370. The display plate 370 also is illustrated with a work order or step indication 381 in a work order box 382. The position of the drill location is also indicated, in the position indicator box 383, which shows the location in x, y, z, coordinates for the proposed drill operation, and the real time position of the drill also may be represented on the display to provide an indication of the proximity to the desired location for the drilling. Tracking indicia, such as a target, as well as dynamic color association for accurate positioning, audio or other indications, may be generated and displayed or provided to the operator to guide the operator during an assembly step. In this example, an instruction box 384 provides further information about this step, including, for example, the number of drill locations (6 in this example), and the part number to be used. According to embodiments of the system, the RVAT system may be configured to project one or more images (e.g., the work order, position and instructions) through one or more other displays, on the display plate, or on one or more multiple displays (e.g., monitor, glasses and display plate).

Example 4

According to another proposed example, the RVAT is configured to track an assembly, where components and a structure, as well as the tooling (e.g., such as a robotically or computer controlled mechanism) are or have the potential to be in motion (either through their own velocity with gravitational effects, or through their attachment to another object that is in motion, or from deflections by construction items or other nearby structures). The RVAT utilizes the cameras to track objects in a field of view in which an assembly operation it to take place. For example, a taping operation may be carried out by tracking a tool through which tape is dispensed. The RVAT tracks the tool, such as a tape laying head, and the material (e.g., tape) dispensed therefrom. In addition, the as built structure is also tracked and monitored, so that the RVAT has the information as to where each tape is placed. The RVAT therefore, using the instructions programmed for the work order, may provide additional taping steps, such as, for example, successive, adjacent, contiguous, or overlapping (or partially overlapping) rows. In addition, the RVAT may be arranged to provide tracking and imaging from each side of a plane (or other points of view), so that the application of one or more taping layers, may be tracked and their installation operation guided, even where the layers are stacked. The RVAT may be configured to provide real time guidance and operation of tooling mechanisms to carry out a taping step, including, for example, stacked layering, or where layers are assembled facing each other, as opposed to stacked. The RVAT may therefore monitor and track, as well as guide and control tooling operations (such as a taping head) to dispense rows of tape from opposite sides of the plane of the tape position. The RVAT may be used to repair or construct a structure through programming or through remote operation. Embodiments of the RVAT may provide for construction above the earth, and in space.

Embodiments of the RVAT also may be coupled with real time thermography, where an illumination source is projected into the assembly area, and where the thermography is captured using one or more image sensors (preferably compatible with the illumination source, such as, for example, infrared). The thermography may be used as part of the RVAT system to track real time progress and quality monitoring of the assembly operation. For example, in the assembly process of tape laying, the thermographic information may be processed to detect whether the tape laying has encountered any problems. If an artifact, such as debris, or a backing layer, or other impediment is present, such as, for example, under the tape, or attached to it, it may be detected by the thermography imaging, and the assembly process halted, an alert generated, or other action desired by the programmer or operator. The RVAT system identifies the locations of the components being assembled, in this example, the tape laying, and is able to coordinate the thermographic locations of detected defects. In addition, in some assembly operation steps, the RVAT may be programmed to react to the degrees of tolerance for a particular occurrence. For example, where a thermographic defect is detected but does not meet a minimum threshold (e.g., is within a tolerance), then the RVAT may do nothing, or process the defect and place it in the data for the structure being built (for future reference), or do something else that the programmer has requested.

RVAT Projector Calibration Example

The following is an exemplary implementation of a calibration procedure for the RVAT projector calibration. In this example, the RVAT Projector is calibrated to the ARAMIS Sensor, so that it projects precisely to the vehicle coordinate system. The steps may be carried out to calibrate the projector:

1. Turn on projector and make sure cameras are on
2. Open the RVAT program
3. Go into the Operation tab
4. Click on Step 3: Run RVAT
5. Click on the Calibration tab on the window that pops up
   a. This should display a dot pattern
6. In the Setup tab, click on Step 1: Calibrate RVAT Sensor
   a. There are 4 sub-steps under this step
7. Sub-step 1 is telling you to calibrate in ARAMIS if needed and to also set the correct coordinate system 8. Sub-step 2 is to align the RVAT Sensor with a calibration surface, i.e. something flat to project onto, like a wall
   a. Make sure the RVAT sensor is positioned in a way such that the pattern is projected in the center of the measurement volume
9. Sub-step 3 is to then move the sensor head to the back of the measurement volume
10. Go to ARAMIS and create a New Project
11. Initialize the sensors if you have not done so already
12. Check to see if the ARAMIS sensor is calibrated
    a. Is so, then proceed
    b. If not, recalibrate the ARAMIS sensor
13. Take a reference image looking at the projected pattern
14. Create a point component of these dots and rename it "RVAT"
15. Run a measurement sequence
    a. Record at 5 Hz and set the image limit to 1000
       i. There will be less than 1000 images
16. Wait for the system to prepare the measurement
17. Once the measurement is recording, slowly move the sensor head from the back to the front
18. When done recording, press escape
19. Once the system is done adding images, press the RVATCalib1 Script macro
    a. This will export the necessary stages
    b. This script should set the correct parameters for the acquisition i.e.:
       i. Acquisition parameters: Unknown size, Radius 8 pixels, Ellipse Quality 0.6
       ii. Measurement Series: No Depth Limitation
       iii. Component: ID Threshold 250 mm
20. Sub-step 4 tells you that the RVAT calibration is now complete
21. Click Finish The above calibration steps represent one method to calibrate the projector and imaging components. Other suitable calibration methods may be implemented.

RVAT Job Pack Programming Example

In this example, the RVAT is programmed by an engineer, who creates the Job Packs to complete Work Order assemblies. The Job Pack provides the component scan and .gelement file for each component to be used to the imaging system (e.g., ARAMIS and the imaging software) for this session. Each step of the Job Pack positions a component into position relative to the Reference Component, as per the CAD design. The RVAT Job Pack programming may be carried out according to the following steps, which in this example, involve steps of Click-Bond® installation and drilling.

1. Component programming: Choose Work Order
2. Name the Job Pack descriptively, like Bulkhead #32
3. Define Reference Component (.gelement)
4. Load Component information into the RVAT database
   a. CAD
   b. ATOS Scan (in vehicle coordinates)
   c. .gelement file (known point locations)
5. Choose or write assembly instructions.

Click-Bond Programming:Drill Point Programming:
1. Choose Work Order
2. Name the Job Pack descriptively, like Mid-Wing Drill Pattern
3. Define Reference Component (.gelement)
4. Choose Drill Point Tool information
5. Import Drill Point locations from CAD
6. Create Drill Point .gelement file from Reference Component or Component .gelement file, adding Drill Points to file.
7. Choose or write drilling instructions.

Complete Steps Guide:
1. Open RVAT and ARAMIS
2. In RVAT, make sure the Setup tab is selected
3. Click Step 2 Set Reference Component
   a. There are 4 sub-steps under this step
4. Sub-step 1 is to point the sensor head at the work space
   a. Make sure the line of sight can see your reference component clearly
   b. Make sure you are within the measurement volume
5. In ARAMIS, click on New Project
6. Import the CAD of the assembly
7. Import the .gelement file that was exported from ATOS
   a. This should contain the mesh, the point component, and the nominal point component
8. Take a reference shot
9. The imported .gelement files should go to their associated place on the reference image. If not, press F4 on the element in the menu on the left of the screen
10. Name the components what they will be i.e. if it is a Reference component or Display Plate etc.
    a. See the Appendix for the naming convention
11. Set a local coordinate system on the components /// take them through steps and easier in ATOS
12. Switch the skin in the top right corner to Inspection
13. Create point inspections on the component and Inspect these points for X, Y, Z based on the Global Coordinate System (Original Alignment)
    a. The data displayed will be actual (the measurement), nominal (where it needs to be), and the difference between the two
14. Sub-step 2 is selecting the reference component
15. Click on the drop menu and select the appropriate reference component for your project
    a. An alternative is selecting a CAD file
16. Rename the points based on what they are
    a. Again, reference the Naming Convention in the Appendix
17. Tack the points to the appropriate point component
18. In RVAT, Sub-step 2 says to select a reference component
    a. We already renamed the appropriate reference component in ARAMIS
    b. The option to Select CAD is also available if this option is needed
19. Sub-step 3 says to make sure "Original Alignment" is selected in ARAMIS
20. In ARAMIS, Start Deformation Tracking /// show process and settings
21. In RVAT, Sub-step 4 says the Reference Component is set
    a. Also use this step to check the RVAT calibration
22. Click Finish
23. The final step in the Setup tab is Setting up the Display Plate
24. Follow the 4 sub-steps in this step. /// take them through
25. The next tab in RVAT is Program
    a. There are 3 steps for this tab
26. First, Define Reference Points
27. Click on the drop menu and select your component
28. In the spreadsheet below, click on the cell that has a star icon
    a. This will highlight the entire row 29. Fill out the data on the right hand side and press Insert
30. If you are updating an existing point, highlight the appropriate row, update the data, and press Update
31. To delete a point, highlight the row and press Delete
32. Step 2 is to Establish Job Steps
33. As before, highlight the row you want to Add, Update, or Delete and use the right hand side to input the information
34. Step 3 is Define Work Instructions
35. As before, highlight the row you want to Add, Update, or Delete and use the right hand side to input the information
36. The third tab in RVAT is Operation
37. The first 2 steps are done on the current screen
38. Step 1 is Select the Component Reference component?
39. Step 2 is Choose the Job Pack
40. Finally, Step 3 is Run RVAT
41. In order for RVAT to track, ARAMIS needs to be tracking /// show procedure and settings in ARAMIS
42. Use the arrow buttons to switch between current jobs
43. The Current Step display shows you which step you are on
44. The Comments display allows you to type information or notes about the current step
45. The final tab in RVAT is Review
46. There are 2 sections under this tab
47. Click on Quality Ratings to see how well the tolerances were during the manufacturing process
48. Click on Assembly Notes to see the notes written during each step The RVAT programming example discusses examples of making drill point markings with the drill point tool, as well as steps to carry out drilling at designated locations, and for installation of Click Bond® fasteners at designated locations. The RVAT system may be configured to implement other steps and assembly components to assemble a structure. For example, tools such as clamps, rivets, drivers, welders, and others, may be tracked and the RVAT may provide instructions for the assembly of components using such clamps, and for riveting, welding and other operations involved in the construction of the structure. The RVAT may track the assembly area components and may generate and provide instructions to control robots for one or more assembly steps or operations.

The methods and systems discussed and depicted herein may be used in conjunction with constant illumination or pulsed illumination to provide illumination to the assembly area or the field of view area that the imaging components (e.g., cameras, sensors, thermal imaging components) capture. The RVAT system and method may be implemented with imaging detection features that monitor and detect imperfections or defects, such as for example, hot spots, voids, air gaps, or undesired material (such as fragments or backing material left on an object). The RVAT system and method control the data from all of the imaging systems (each of the ARAMIS imaging systems) and projectors, and thermography illumination sources and detectors. The RVAT includes set up configurations that facilitate programming of job steps by an engineer or other personnel that is setting up the assembly operation steps that are to be carried out by the assembly operation. The RVAT implementation of the digital-twin monitoring may detect and monitor a number of properties and characteristics, including strain and thermally detectible changes. The RVAT may detect barely visible damage, and may detect and identify internal damage (within a structure) such as for example, delamination, or shifting of an underlayment. The RVAT also may be configured to implement testing of components, the assembled structure or a portion of the structure (during the build or after assembly). For example, the wing may be loaded with fuel and emptied, and the RVAT system may be used to measure the loading, the changes in strain and whether any internal structural changes or damage have taken place. In addition, changes in a structure, which may be effected upon the movement of a structure (e.g., for maintenance), such as an aircraft (even where a flight has not taken place), may be monitored and detected with the RVAT system and methods. The RVAT may not only determine whether a change has occurred, but also identifies the location and extent of the change.

The above described methods may be performed, and the above described systems may be implemented, by a computer system, including a processor, by executing appropriate instructions stored in a memory. Apparatus for creating a virtual assembly image of components and reference structures have been described as including a processor controlled by instructions stored in a memory. The memory may be random access memory (RAM), read-only memory (ROM), flash memory or any other memory, or combination thereof, suitable for storing control software or other instructions and data. Some of the functions performed by the transformation methods and apparatus have been described with reference to flowcharts and/or block diagrams. Those skilled in the art should readily appreciate that functions, operations, decisions, etc. of all or a portion of each block, or a combination of blocks, of the flowcharts or block diagrams may be implemented as computer program instructions, software, hardware, firmware or combinations thereof. Those skilled in the art should also readily appreciate that instructions or programs defining the functions of the present invention may be delivered to a processor in many forms, including, but not limited to, information permanently stored on tangible non-transitory non-writable storage media (e.g. read-only memory devices within a computer, such as ROM, or devices readable by a computer I/O attachment, such as CD-ROM or DVD disks), information alterably stored on tangible non-transitory writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

While the invention is described through the above-described exemplary embodiments, it will be understood by those of ordinary skill in the art that modifications to, and variations of, the illustrated embodiments may be made without departing from the inventive concepts disclosed herein. For example, although some aspects of the RVAT system and method have been described with reference to a flowchart and/or screen display interfaces, those skilled in the art should readily appreciate that functions, operations, decisions, etc. of all or a portion of each block, or a combination of blocks, of the flowchart or interface displays may be combined, separated into separate operations or performed in other orders. In addition, features, operations, steps, and embodiments, although described or referenced in connection with one embodiment, may be combined or implemented in conjunction with one or more other features, operations, steps, or embodiments. The exemplary illustrations and depictions describe preferred embodiments, and variations of the embodiments, features, steps and operations may be implemented consistent with the invention. Moreover, while the embodiments are described in connection with various illustrative data structures, one skilled in the art will recognize that the system may be embodied using a variety of data structures. Furthermore, disclosed aspects, or portions of these aspects, may be combined in ways not listed above. Accordingly, the invention should not be viewed as being limited to the disclosed embodiments.

What is claimed is:

1. A computer-implemented method for real-time assembly of a structure that minimizes or eliminates tooling, where components are assembled from their respective CAD files, the method comprising; providing CAD drawings files that represent the structure and components thereof in a vehicle coordinate system; relating the one or more components to the CAD vehicle coordinate system; obtaining an actual mesh for said one or more components; assigning at least one of the components to be assembled to serve as a reference component; generating a master reference coordinate system; and tracking, with reference to the reference component, components to be assembled, and additional components represented by the CAD drawing files by imaging the components to be assembled, wherein imaging said components comprises imaging said components in a field of view, wherein tracking of components to be assembled is carried out during an assembly operation that includes assembling said one or more components and tracking the respective locations of said one or more components in the field of view by imaging the one or more components within the field of view.

2. The method of claim 1, wherein tracking, with reference to the reference component, components to be assembled, comprises tracking with 3D photogrammetry, wherein each of said one or more components to be assembled each has one or more surfaces, and wherein a plurality of photogrammetry dots are placed on said one or more surfaces of said one or more components to be assembled.

3. The method of claim 1, wherein tracking components to be assembled comprises tracking with 3D photogrammetry, or image of the component, or both.

4. The method of claim 1, wherein the tracking comprises tracking the components to be assembled in both reference coordinates and camera coordinates.

5. The method of claim 1, including scanning one or more of the real components and determining from the scan the actual dimensions of the one or more real components.

6. The method of claim 2, including generating for display on a display, on a component, or on a structure or on any one or more combinations of these, an indication of the position of a component to be assembled, wherein the indication of the position of a component to be assembled is projected from a projector.

7. The method of claim 6, including generating a dynamic guide that provides an indication when the component is in the proper position for assembly.

8. The method of claim 1, including capturing as-built dimensions and positioning of a vehicle build, and generating a digital-twin database that includes the CAD/as-built measurements and reference baseline for DIC measurements of deformations and strains.

9. The method of claim 7, including (i) generating a digital-twin database that includes the CAD/as-built measurements and reference baseline for DIC measurements of deformations and strains, the digital-twin database comprising at least one data set to serve as a previous result or baseline for the structure and one or more components comprising the structure, (ii) processing image information to obtain the real time positions of one or more components comprising the structure, or the structure, or one or more of the components comprising the structure and the structure, for alignment with at least one previous result, (iii) conducting a DIC measurement of the surface of one or more components or of the structure to determine deformation and strain, and (iv) obtaining thermography information for the one or more components or the structure, and (v) monitoring changes between the digital twin real-time database which contains historical measurements and real time measurements of the components or structure as represented by the real time positions of the one or more components comprising the structure, or the structure, or one or more of the components comprising the structure and the structure.

10. The method of claim 9, including:
 a) conducting thermography to measure local temperatures of a structure or component, for:
  i) thermal expansion correction of DIC strain measurement;
  ii) local structural temperatures in 3D coordinates;
  iii) or both i) and ii);
 b) conducting thermography NDT with thermal pulse to determine the presence of a defect.

11. A computer-implemented method for real-time virtual reality tooling for real-time assembly of a structure, where components are assembled from their respective CAD files, the method comprising:
 a) designating an assembly area;
 b) arranging photogrammetric imaging devices at locations around the assembly area, wherein each photogrammetric imaging device has a field of view (FOV), and wherein the assembly area is within the FOV;
 c) generating an assembly operation record, wherein the assembly operation record includes at least one reference component; wherein said at least one reference component has an associated CAD file that includes data for that component including coordinate data, wherein said reference component associated CAD file comprises a nominal mesh of said reference component;
 d) designating the at least one reference component in the field of view (FOV) as aligned to CAD coordinate system, wherein said at least one reference components has target points thereon;
 e) scanning the reference component with at least one photogrammetric imaging device to generate a scan of the reference component target points, and optionally the complete surface with structured light, to generate a scanned mesh of the reference component;
 f) receiving data from one or more 3D imaging devices including coordinates for pixels, wherein said pixel coordinates represent 3D coordinates of the at least one reference component;
 g) executing computer program instructions to:
  i) align the CAD file of the component designated to one or more critical dimensions of the reference component for the assembly to a component for the real-time virtual tooling and assembly production; and
  ii) track the component to be assembled into its designated CAD position; and iii) associate the actual scanned mesh to the point component and compare to the nominal mesh to produce as-built dimensions for the component assembly.

12. The method of claim 11, wherein executing computer program instructions to align the CAD file of the component designated to the reference component is carried out with 3D photogrammetry, and wherein executing computer program instructions to track the component into its designated CAD position is carried out with 3D photogrammetry.

13. The method of claim 12, including projecting onto the assembly area a graphic image representation of a component to be assembled, wherein the graphic image representation of the component to be assembled is projected into the assembly area at the location where the component is to be assembled.

14. The method of claim 13, including tracking the component to be assembled, and indicating when the component to be assembled is in a proper position.

15. The method of claim 14, wherein tracking the component within the assembly area is carried out by providing a detectable energy source that is not visible to a human, and wherein said imaging device includes a camera with a sensor that is configured to detect said energy source.

16. The method of claim 13, including carrying out an assembly operation on the component in the proper position.

17. The method of claim 13, including executing computer program instructions to generate the graphic image representation of a component to be assembled using a component mesh.

18. The method of claim 13, wherein the projection projects said graphic image representation of a component to be assembled on a projection plane, and including constructing in a memory device, a first calibration matrix to calibrate the projection plane to pixel coordinates and the projection plane to CAD coordinates; and executing computer program instructions to transform the CAD coordinates to camera coordinates.

19. The method of claim 18, including applying a projection matrix for transforming one or more projected images of components of the assembly generated from the respective converted CAD file for the respective one or more components, wherein the respective converted CAD file for the respective one or more components contains coordinates for the respective one or more components, and wherein the respective converted CAD file for the respective one or more components is transformed by converting the CAD file coordinates relative to the reference component coordinates.

20. The method of claim 11, including executing computer program instructions to:
i) track components and record the location of the components when assembled through the capture of information and inputs; and
ii) generate a digital-twin of the structure being assembled by producing an As-Built CAD file representative of the structure and an As-Built CAD file for each of the one or more components of the structure, the As-Built CAD file including dimensions aligned to vehicle coordinates and the reference component.

21. The method of claim 11, including imaging with said one or more imaging devices objects in the assembly area, generating on a display graphic image representations of the imaged objects in the assembly area, wherein imaging with said one or more imaging devices comprises a structured light scan or projected DIC pattern.

22. The method of claim 21, wherein the display comprises a monitor.

23. The method of claim 21, wherein the display comprises an augmented reality headset, wherein said graphic representations of the imaged objects include one or more graphic image representations of components of the assembly and their positions.

24. The method of claim 23, wherein said graphic image representation of at least one component to be assembled is displayed.

25. The method of claim 24, including tracking at least one component to be assembled, and indicating when the at least one component to be assembled is in a designated assembly position;
wherein an alignment graphic image representation of the at least one component to be assembled is displayed in the augmented reality headset display at the designated assembly position;
wherein the component graphic image representation is displayed in the augmented reality display and represents the position of the component at the time it is displayed; and
positioning the at least one component to be assembled in the designated assembly position, and displaying on the augmented reality display an indication when the component is located in the designated assembly position.

26. The method of claim 25, including assembling the at least one component to be assembled by conducting an assembly operation.

27. The method of claim 26, including executing computer program instructions to:
i) capture information and inputs from the assembly operation; and
ii) generate a digital-twin of the structure being assembled by generating an As-Built CAD file for the at least one component on which the assembly operation has been conducted.

28. The method of claim 11, including carrying out an assembly operation, wherein said assembly operation includes drilling with a drill to drill a hole or bore at a designated drilling location, the designated drilling location being a location defined by a CAD of the structure being assembled, wherein said drill is tracked in 3D coordinates by photogrammetry, or an image comprising a scan of the drill, or both, wherein said drill is tracked into alignment to the designated drilling location, and wherein when the drill is aligned at the designated drilling location, drilling a hole or bore at the designated drilling location.

29. The method of claim 28, wherein the designated drilling location comprises a location that is below the plane of a surface of a component or structure, and wherein said drill is aligned to the designated drilling location, and wherein drilling the hole or bore is carried out to drill into the designated drilling location and comprises blind hole drilling corresponding to the designated drilling location defined by the CAD.

30. The method of claim 11, including carrying out an assembly operation, wherein said assembly operation includes drilling to drill a hole or bore at a designated drilling location, the designated drilling location being a location defined by a CAD of the structure being assembled, wherein a drill guide tool is provided, including tracking into position the drill guide tool using 3D coordinates by photogrammetry or an image formed from a scan of the drill guide tool, wherein said drill guide tool is positioned to provide the designated drilling location, wherein said drill guide tool defines or marks the designated drilling location, and drilling a hole or bore at the designated drilling location defined or marked by the drill guide tool.

31. The method of claim 30, wherein said drill guide tool is fixed in the position to provide a designated drilling location using an adhesive, clamp or other securing means, wherein drilling is carried out to drill a hole or bore at the designated location defined by the drill guide tool, and, wherein after drilling, the drill guide tool is removed.

32. The method of claim 11, including carrying out an assembly operation, wherein said assembly operation includes installation of an adhesive bonded fastener to a structure at a designated adhesive bonded fastener installation location using an adhesive bonded fastener tool, wherein said adhesive bonded fastener tool is tracked in 3D coordinates by photogrammetry, or a scan of the adhesive bonded fastener tool image, or both, wherein said adhesive bonded fastener tool connects with said adhesive bonded fastener, and wherein said adhesive bonded fastener tool with said adhesive bonded fastener attached thereto is tracked into alignment to the designated adhesive bonded fastener click bond installation location, and wherein when the adhesive bonded fastener tool is aligned at the designated adhesive bonded fastener installation location, operating the adhesive bonded fastener to adhere to the structure at the designated adhesive bonded fastener installation location.

33. The method of claim 28, wherein drilling is carried out using a robot, and wherein real-time feedback is provided to said robot for real-time positioning to track said drill into said alignment to the said designated drilling location.

34. The method of claim 30, including after drilling, conducting a quality check of the drilled hole or bore using the drill guide tool, by aligning the drill guide tool with the drilled hole or bore, tracking the position of the drill guide tool when it is aligned with the drilled hole or bore using 3D coordinates by photogrammetry or a scanned image of the drill guide tool, and comparing the position of the drill guide tool when it is aligned with the drilled hole or bore with the location of the hole or bore as defined by the CAD.

* * * * *